(12) United States Patent  
Dohta

(10) Patent No.: US 8,214,167 B2
(45) Date of Patent: Jul. 3, 2012

(54) STORAGE MEDIUM STORING INFORMATION PROCESSING PROGRAM, AND INFORMATION PROCESSING APPARATUS

(75) Inventor: Takuhiro Dohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 404 days.

(21) Appl. No.: 12/504,185

(22) Filed: Jul. 16, 2009

(65) Prior Publication Data

US 2010/0286942 A1  Nov. 11, 2010

(30) Foreign Application Priority Data

May 7, 2009  (JP) .................... 2009-112523

(51) Int. Cl.
*G01P 21/00* (2006.01)
(52) U.S. Cl. ............................ 702/104
(58) Field of Classification Search ............ 702/104
See application file for complete search history.

(56) References Cited

U.S. PATENT DOCUMENTS

| 2005/0076161 | A1 | 4/2005 | Albanna et al. |
| 2005/0119036 | A1 | 6/2005 | Albanna et al. |
| 2006/0179915 | A1 * | 8/2006 | Bang et al. .................. 73/1.37 |
| 2008/0177497 | A1 | 7/2008 | Ohta |

FOREIGN PATENT DOCUMENTS

| JP | 6-190144 | 7/1994 |
| JP | 10-31553 | 2/1998 |

OTHER PUBLICATIONS

Office Action mailed Oct. 18, 2011 in co-pending U.S. Appl. No. 12/510,422 (20 pages).

* cited by examiner

*Primary Examiner* — Tung S Lau
(74) *Attorney, Agent, or Firm* — Nixon & Vanderhye P.C.

(57) ABSTRACT

A computer-readable storage medium storing an information processing program executed by a computer of an information processing apparatus that obtains, from an input device including an acceleration sensor for detecting acceleration and an angular velocity sensor for detecting an angular velocity, acceleration data indicative of the acceleration and angular velocity data indicative of the angular velocity, is provided. The information processing program causes the computer to perform data obtaining and acceleration correction. The data obtaining repeatedly obtains the acceleration data and the angular velocity data. The acceleration correction corrects, based on the magnitude of the angular velocity indicated by the angular velocity data, the acceleration indicated by the acceleration data.

21 Claims, 23 Drawing Sheets

F I G. 1
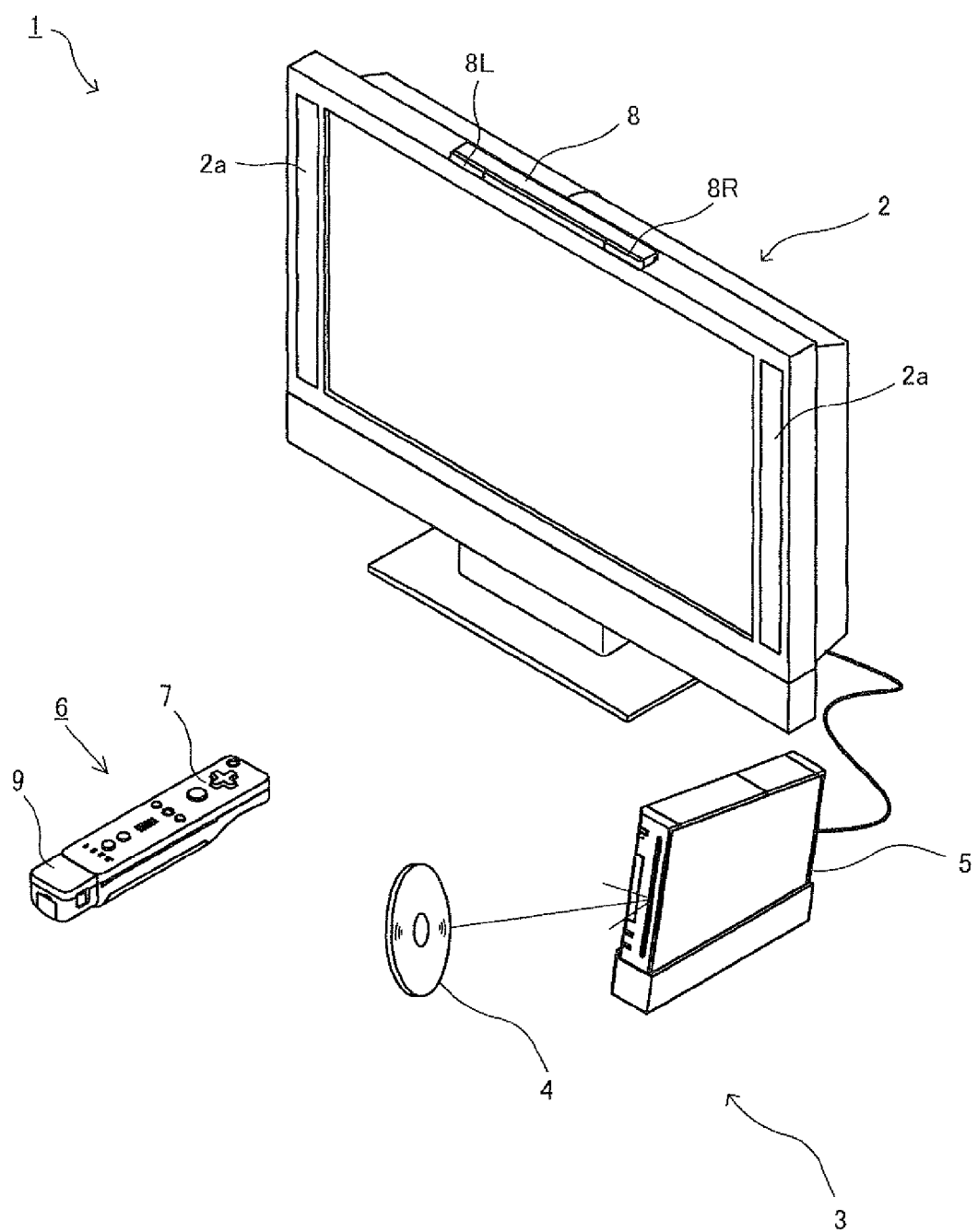

STORAGE MEDIUM STORING INFORMATION PROCESSING PROGRAM, AND INFORMATION PROCESSING APPARATUS

CROSS REFERENCE TO RELATED APPLICATION

The disclosure of Japanese Patent Application No. 2009-112523, filed on May 7, 2009, is incorporated herein by reference.

BACKGROUND AND SUMMARY

Field of the Invention

The technology presented herein relates to a storage medium storing an information processing program, and an information processing apparatus, and more particularly, to an information processing apparatus that detects motion of an input device provided with an acceleration sensor and executes a predetermined process based on the detected motion, and a storage medium storing an information processing program executed by the information processing apparatus.

Conventionally, for example, as disclosed in Japanese Patent Laid-Open Publication No. H06-190144 (hereinafter, referred to as Patent Document 1), there is known an apparatus in which an input device provided with an acceleration sensor detects motion of the entire input device and a process in accordance with the detection result is executed. A control key device disclosed in the above Patent Document 1 includes a three-axis acceleration sensor, and detects, in accordance with acceleration data obtained from the acceleration sensor, acceleration applied in three axial directions. The control key device determines orientation and motion of the entire device based on the acceleration applied in the three axial directions.

However, when orientation and motion of an entire input device are determined by using acceleration applied thereto in three axial directions as in the control key device disclosed in the above Patent Document 1, it is extremely difficult to instantaneously determine from what motion of the entire input device the acceleration is obtained. For example, it has been impossible to instantaneously determine, by using the acceleration applied in the three axial directions, whether the acceleration occurs by rotation of the input device or by a parallel movement of the input device.

Therefore, a feature of and example embodiment presented herein is to provide a storage medium storing an information processing program, and an information processing apparatus, which are capable of determining motion of an input device by using data obtained from an acceleration sensor provided in the input device.

The present embodiment has the following features to attain the above. It is noted that reference characters and step numbers in parentheses are merely provided to facilitate the understanding of the present embodiment in relation to later-described embodiments, rather than limiting the scope of the present embodiment in any way.

A first aspect of the present embodiment is a computer-readable storage medium storing an information processing program executed by a computer (10) of an information processing apparatus (5) that obtains, from an input device (6) including an acceleration sensor (701) for detecting acceleration and an angular velocity sensor (95, 96) for detecting an angular velocity, acceleration data (Db) indicative of the acceleration and angular velocity data (Da) indicative of the angular velocity. The information processing program causes the computer to function as data obtaining means (a CPU 10 executing step 41 and step 42; hereinafter, only step numbers are indicated) and acceleration correction means (S44 to S46). The data obtaining means repeatedly obtains the acceleration data and the angular velocity data. The acceleration correction means corrects, based on the magnitude (f) of the angular velocity indicated by the angular velocity data, the acceleration (a) indicated by the acceleration data (calculation of p).

According to the above, the acceleration detected by the acceleration sensor of the input device is corrected based on the magnitude of the angular velocity obtained from the angular velocity sensor of the input device. Thus, it is possible to correct the acceleration detected by the acceleration sensor, in view of acceleration generated by rotation of the input device.

Further, in the above first aspect, the information processing program may further cause the computer to function as process means (S47). The process means executes a predetermined process by using the acceleration (p) corrected by the acceleration correction means.

According to the above, it is possible to execute various processes by using the corrected acceleration, for example, it is possible to accurately determine motion of the input device by using the corrected acceleration.

Further, when the magnitude of the angular velocity is great, the acceleration correction means may correct, by a great amount (correction amount or correction rate), the acceleration indicated by the acceleration data.

According to the above, it is possible to subtract, from the acceleration detected by the acceleration sensor, acceleration generated by rotation of the input device, and hence it is possible to execute a process using acceleration generated by parallel movement of the input device.

Further, the acceleration correction means may include correction degree value calculation means (S44). The correction degree value calculation means calculates a correction degree value (f) that causes a degree of correcting the acceleration to be greater when the magnitude of the angular velocity indicated by the angular velocity data is greater. In this case, the acceleration correction means corrects, at a degree indicated by the correction degree value, the acceleration indicated by the acceleration data.

According to the above, it is possible to execute correction at a degree that acceleration generated by rotation of the input device is subtracted from the acceleration detected by the acceleration sensor, and hence it is possible to execute a process using acceleration generated by parallel movement of the input device.

Further, the acceleration correction means may further include correction degree value determination means (S66) and correction degree value update means (S67). The correction degree value determination means determines whether or not a correction degree value (f) calculated by the correction degree value calculation means in current processing is smaller than a correction degree value (f0) used in last processing. In an example, when the correction degree value determination means determines that the correction degree value calculated by the correction degree value calculation means in the current processing is smaller than the correction degree value used in the last processing, the correction degree value update means changes the correction degree value calculated by the correction degree value calculation means in the current processing, so as to at least approach the correction degree value used in the last processing, and updates a correction degree value to be used in the current processing with the changed correction degree value.

Further, the correction degree value update means may change the correction degree value calculated by the correction degree value calculation means in the current processing, so as to approach the correction degree value used in the last processing at a predetermined rate or by a predetermined amount, and may update the correction degree value to be used in the current processing with the changed correction degree value.

In another example, when the correction degree value determination means determines that the correction degree value calculated by the correction degree value calculation means in the current processing is smaller than the correction degree value used in the last processing, the correction degree value update means changes the correction degree value used in the last processing, so as to at least approach the correction degree value calculated by the correction degree value calculation means in the current processing, and updates a correction degree value to be used in the current processing with the changed correction degree value.

Further, the correction degree value update means may change the correction degree value used in the last processing, so as to approach the correction degree value calculated by the correction degree value calculation means in the current processing at a predetermined rate or by a predetermined amount, and may update the correction degree value to be used in the current processing with the changed correction degree value.

According to the above, when the correction degree value is smaller than the correction degree value used the last time, the speed of change in the correction degree value becomes slow. Here, the case when the correction degree value is smaller than the correction degree value used the last time is the case when an angular velocity generated in the input device is slow. In addition, when a user attempts to stop rotating the input device, acceleration for stopping the rotation is generated. Thus, even when the rotation is stopped, the acceleration for stopping the rotation may remain. According to the above, because such acceleration generated when stopping the rotation of the input device is suppressed, an acceleration component generated by parallel movement of the input device can be accurately recognized.

Further, when the correction degree value determination means determines that the correction degree value calculated by the correction degree value calculation means in the current processing is greater than the correction degree value used in the last processing, the correction degree value update means may update the correction degree value to be used in the current processing with the correction degree value calculated by the correction degree value calculation means in the current processing.

According to the above, when the correction degree value is greater than the correction degree value used the last time, the correction degree value can be immediately changed in accordance with a rotation amount of the input device and reflected to the correction of acceleration.

Further, the acceleration sensor may detect acceleration generated in the directions of a plurality of axes (X-axis, Y-axis, Z-axis) set with respect to the input device, and may output acceleration data (Db1, Db2, Db3) indicative of the acceleration. The angular velocity sensor may detect angular velocities about a plurality of axes (X-axis, Y-axis, Z-axis) set with respect to the input device, and may output angular velocity data (Da1, Da2, Da3) indicative of the angular velocities.

In this case, the acceleration correction means corrects, based on the magnitudes of the angular velocities about the plurality of axes that are indicated by the angular velocity data, the acceleration in the directions of the plurality of axes that are indicated by the acceleration data.

According to the above, because the acceleration obtained for each of the plurality of axes is corrected, it is possible to efficiently execute the correction based on the directions of the generated acceleration and the directions of the generated angular velocities.

Further, the plurality of axes with the directions in which the acceleration is detected by the acceleration sensor and the plurality of axes that are rotation axes about which the angular velocities are detected by the angular velocity sensor may be set wish respect to the input device so as to be the same. In this case, when correcting acceleration in the direction of a first axis included in the plurality of axes, the acceleration correction means corrects this acceleration based on the magnitude of an angular velocity about an axis different from the first axis included in the plurality of axes.

According to the above, because acceleration generated in a direction is corrected by using an angular velocity about a rotation axis whose direction is different from this direction, it is possible to execute correction of acceleration by using, as a target, only an angular velocity that influences the acceleration generated in this direction.

Further, when correcting the acceleration in the direction of the first axis included in the plurality of axes, the acceleration correction means may correct this acceleration based on a value obtained by summing the magnitudes of all angular velocities about axes different from the first axis included in the plurality of axes.

According to the above, because acceleration generated in a direction is corrected by using a value obtaining by summing the magnitudes of all angular velocities about rotation axes of directions other than this direction, it is possible to execute correction of acceleration by using, as targets, all angular velocities that influence the acceleration generated in this direction.

Further, the plurality of axes may include the first axis, a second axis, and a third axis that are mutually perpendicular to each other. In this case, when correcting the acceleration in the direction of the first axis, the acceleration correction means corrects the acceleration in the direction of the first axis based on the magnitude of the angular velocity about the second axis and the magnitude of the angular velocity about the third axis.

According to the above, because the acceleration generated in the direction of the first axis included in the mutually perpendicular three axes is corrected by using the angular velocities about the second and third axes, it is possible to correct the acceleration in the direction of the first axis by using, as targets, the angular velocities that influence the acceleration generated in the direction of the first axis.

Further, the acceleration correction means may include correction degree value calculation means. The correction degree value calculation means calculates, for each of the first to third axes, a correction degree value that causes a degree of correcting the acceleration to be greater when the magnitudes of the angular velocities about the first to third axes that are indicated by the angular velocity data are greater. In this case, when correcting the acceleration in the direction of the first axis, the acceleration correction means corrects the acceleration in the direction of the first axis at a degree indicated by a value obtained by summing the correction degree value for the second axis and the correction degree value for the third axis.

According to the above, because the acceleration generated in the direction of the first axis included in the mutually perpendicular three axes is corrected by using a value obtained by summing the magnitudes of the angular velocities about the second and third axes, it is possible to correct the acceleration in the direction of the first axis by using, as targets, all the angular velocities that influence the acceleration generated in the direction of the first axis.

Further, in the above first aspect, the information processing program may further cause the computer to function as gravitational acceleration calculation means (S43). The gravitational acceleration calculation means calculates, based on the acceleration indicated by the acceleration data, gravitational acceleration (g) inferred to be generated in the input device. In this case, the acceleration correction means corrects acceleration obtained by subtracting, from the acceleration indicated by the acceleration data, the gravitational acceleration calculated by the gravitational acceleration calculation means.

According to the above, because the acceleration from which the gravitational acceleration applied to the input device has been subtracted can be used, it is possible to execute a process using only acceleration generated by movement of the input device.

Further, the process means may include first process means and second process means. The first process means executes, as a part of the predetermined process, a first process in accordance with rotation of the input device that is obtained based on the angular velocity indicated by the angular velocity data. The second process means executes, as a part of the predetermined process, a second process in accordance with movement of the input device that is obtained based on the acceleration corrected by the acceleration correction means.

According to the above, it is possible to execute a process in accordance with rotation (e.g. an inclination angle) of the input device and movement (e.g. a parallel movement amount) of the input device.

Further, the process means may incline, in accordance with a rotation amount of the input device, an object (PC) appearing in a virtual world in a direction in which the input device rotates, and may display the object on a display device (2). The process means may move, in accordance with a movement amount of the input device, the object in a direction in which the input device moves, and may display the object on the display device.

According to the above, it is possible to control movement of an object in a virtual world, such as rotating the object in accordance with a rotation amount (an inclination angle) of the input device and moving the object in accordance with a movement amount (parallel movement amount) of the input device.

Further, the input device may include a first unit (7) and a second unit (76). The first unit includes the acceleration sensor and the angular velocity sensor. The second unit includes another acceleration sensor (762) different from the acceleration sensor and is provided independently of the first unit. In this case, the process means compares the magnitude of the acceleration corrected by the acceleration correction means with the magnitude of acceleration indicated by acceleration data outputted from the another acceleration sensor, and executes the predetermined process (S109 to S111) by using acceleration whose magnitude is smaller than that of the other.

According to the above, even when an input device consisting of two units is used, it is possible to obtain acceleration generated when the entire input device is moved in parallel.

Further, a second aspect of the present embodiment may be implemented in the form of an information processing apparatus including the above means.

According to the above first and second aspects, the acceleration detected by the acceleration sensor of the input device is corrected based on the magnitude of the angular velocity obtained from the angular velocity sensor of the input device. Thus, it is possible to correct the acceleration detected by the acceleration sensor, in view of acceleration generated by rotation of the input device.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 1 is an external view for explaining a game system 1 according to a first embodiment;

DESCRIPTION OF THE PREFERRED EMBODIMENTS

First Embodiment

Figure 2:
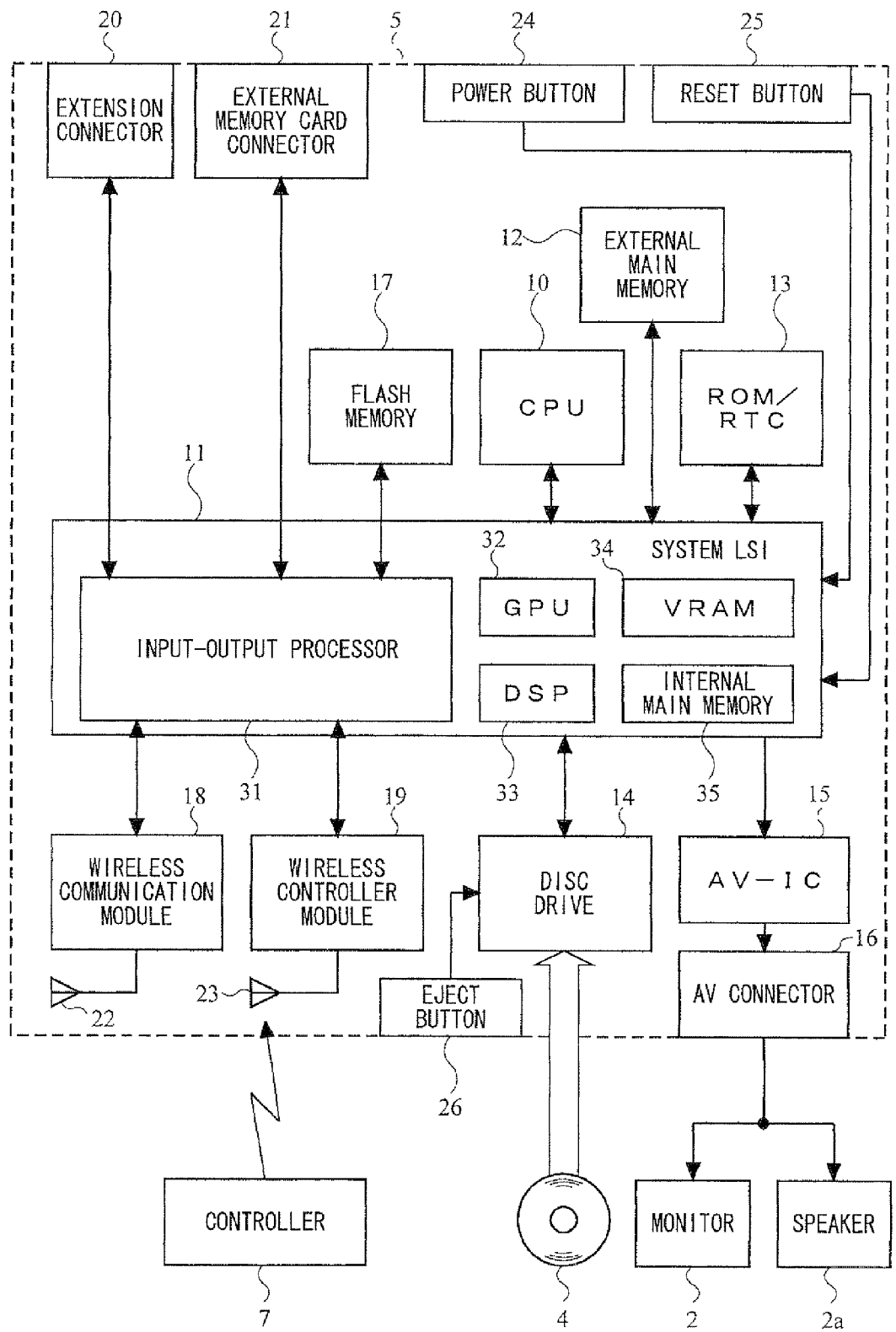
FIG. 2 is a functional block diagram of a game apparatus body 5 in FIG. 1.

With reference to FIG. 1, an information processing apparatus that executes an information processing program according to a first embodiment will be described. Hereinafter, in order to give a specific description, a game system including a stationary game apparatus body 5, which is an example of the information processing apparatus, will be described. FIG. 1 is an external view of a game system 1 including a stationary game apparatus 3, and FIG. 2 is a block diagram of the game apparatus body 5. The following will describe the game system 1.

Referring to FIG. 1, the game system 1 includes a home-use television receiver (hereinafter, referred to as monitor) 2 as an example of display means, and the stationary game apparatus 3 that is connected to the monitor 2 via a connecting cord. The monitor 2 includes a pair of speakers 2a for audio-outputting audio signals outputted from the game apparatus 3. The game apparatus 3 includes an optical disc 4 storing a game program that is an example of an information processing program of the present invention, the game apparatus body 5 provided with a computer for executing the game program in the optical disc 4 to display a game screen on the monitor 2, and an input device 6 for providing the game apparatus body 5 with operation information that is required for a game in which a character and the like displayed in the game screen is controlled.

The game apparatus body 5 includes a wireless controller module 19 (see FIG. 2). The wireless controller module 19 receives data transmitted wirelessly from the input device 6, and transmits data from the game apparatus body 5 to the input device 6, so that a controller 7 and the game apparatus main body 5 are connected to each other by wireless communication. Further, the optical disc 4 as an example of an exchangeable information storage medium is detachably mounted to the game apparatus body 5.

The game apparatus body 5 includes a flash memory 17 (see FIG. 2) that functions as a backup memory to store data such as saved data, and the like in a fixed manner. The game apparatus body 5 executes the game program and the like stored in the optical disc 4, and displays the result as a game image on the monitor 2. The game program and the like may be stored in advance in the flash memory 17 instead of the optical disc 4, and executed. Further, the game apparatus body 5 reproduces a game state, which has been executed previously, by using saved data stored in the flash memory 17, and displays a game image on the monitor 2. A player of the game apparatus 3 operates the input device 6 while watching a game image displayed on the monitor 2, and enjoys a progress of a game.

The input device 6 provides the game apparatus body 5 with operation data indicative of contents of operations performed with respect to the input device 6. In the present embodiment, the input device 6 includes the controller 7 and an angular velocity detection unit 9. Although described in detail later, the angular velocity detection unit 9 is detachably connected to the controller 7 in the input device 6.

By using the technology of, for example, Bluetooth (registered trademark), the controller 7 wirelessly transmits transmission data, such as the operation information and the like, to the game apparatus body 5 including the wireless controller module 19. The controller 7 includes a housing whose size is small enough to be held by one hand; and a plurality of operation buttons (a cross key, a stick, and the like) that are provided on surfaces of the housing. As described later, the controller 7 includes an imaging information calculation section 74 for taking an image viewed from the controller 7. As an example of targets whose images are to be taken by the imaging information calculation section 74, two LED modules (hereinafter, referred to as markers) 8L and 8R are provided in the vicinity of the display screen of the monitor 2. The markers 8L and 8R each emit infrared light forward from the monitor 2. Further, the controller 7 also receives at a communication section 75 transmission data transmitted wirelessly from the wireless controller module 19 of the game apparatus body 5, and produces sound and vibration in accordance with the transmission data.

The following will describe an internal configuration of the game apparatus body 5 with reference to FIG. 2. FIG. 2 is a block diagram showing a configuration of the game apparatus body 5. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 executes game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as: control of data transfer between the system LSI 11 and each component connected to the system LSI 11; generation of an image to be displayed; obtaining data from an external apparatus; and the like. An internal configuration of the system LSI 11 will be described later. The volatile external main memory 12 stores various data and programs such as the game program read from the optical disc 4; a game program read from a flash memory 17; and the like, and is used as a work region and a buffer region for the CPU 10. The ROM/RTC 13 includes a ROM (so-called boot ROM) that stores a program for starting up the game apparatus body 5, and a clock circuit (RTC) for counting time. The disc drive 14 reads program data and texture data from the optical disc 4, and writes these data into a later-described internal main memory 35 or the external main memory 12.

The system LSI 11 is provided with an input-output processor 31, a GPU (Graphics Processor Unit) 32, a DSP (Digital Signal Processor) 33, a VRAM 34, and the internal main memory 35. Although not shown in the drawings, these components 31 to 35 are connected to each other via an internal bus.

The GPU 32 forms a part of drawing means, and generates an image according to a graphics command (command for generating graphics) from the CPU 10. The VRAM 34 stores data (data such as polygon data, texture data, and the like) that are required for the GPU 32 to execute the graphics command. In generating an image, the GPU 32 generates the image data by using the data stored in the VRAM 34.

The DSP 33 functions as an audio processor, and generates audio data by using sound data and sound waveform (tone color) data that are stored in the internal main memory 35 and the external main memory 12.

The image data and the sound data generated thus are read by the AV-IC 15. The AV-IC 15 outputs the image data to the television 2 via an AV connector 16, and the sound data to the speakers 2a provided in the television 2. Thus, an image is displayed on the television 2, and sound is outputted from the speakers 2a.

The input-output processor (I/O processor) 31 performs transmission and reception of data to and from each component connected to the input-output processor 31, and downloads data from an external apparatus. The input-output processor 31 is connected to the flash memory 17, a wireless communication module 18, a wireless controller module 19, an extended connector 20, and an external memory card connector 21. An antenna 22 is connected to the wireless communication module 18, and an antenna 23 to the wireless controller module 19.

The input-output processor 31 is connected to a network via the wireless communication module 18 and the antenna 22, so that the input-output processor 31 is communicable with another game apparatus connected to the network and various servers connected to the network. The input-output processor 31 periodically accesses the flash memory 17 to detect whether there is data required to be transmitted to the network. If there is such data, the input-output processor 31 transmits the data to the network via the wireless communication module 18 and the antenna 22. The input-output processor 31 receives data transmitted from the other game apparatus and data downloaded from a download server via the network, the antenna 22 and the wireless communication module 18, and stores the received data in the flash memory 17. The CPU 10 reads the data stored in the flash memory 17 by executing the game program, and uses the data in the game program. In addition to the data transmitted or received between the game apparatus body 5 and the other game apparatus and various servers, the flash memory 17 may store saved data (result data or midstream data of the game) of the game played using the game apparatus body 5.

The input-output processor 31 receives operation data transmitted from the controller 7 via the antenna 23 and the wireless controller module 19, and stores (temporarily stores) the operation data in the buffer region of the internal main memory 35 or the external main memory 12. Similarly to the external main memory 12, the internal main memory 35 may store various data and programs such as the game program read from the optical disc 4; a game program read from the flash memory 17; and the like, and may be used as a work region and a buffer region for the CPU 10.

The extended connector 20 and the external memory card connector 21 are connected to the input-output processor 31. The extended connector 20 is a connector for an interface such as USB and SCSI, and the communication with the network is enabled by connecting a medium such as an external storage medium, a peripheral device such as another controller, or a wired connector for communication to the extended connector 20 instead of the wireless communication module 18. The external memory card connector 21 is a connector for connecting thereto an external storage medium such as a memory card. For example, the input-output processor 31 accesses the external storage medium via the extended connector 20 and the external memory card connector 21 for storing data in the external storage medium and reading data from the external storage medium.

On the game apparatus body 5 (e.g. on a front main surface), a power button 24 of the game apparatus body 5, a reset button 25 for game processing, an insertion slot for mounting the optical disc 4 in a detachable manner, an eject button 26 for ejecting the optical disc 4 from the insertion slot of the game apparatus body 5, and the like are provided. The power button 24 and the reset button 25 are connected to the system LSI 11. When the power button 24 is turned on, electric power is supplied to each component of the game apparatus body 5 via an AC adaptor (not shown). When the reset button 25 is pressed, the system LSI 11 re-executes the boot program of the game apparatus body 5. The eject button 26 is connected to the disc drive 14. When the eject button 26 is pressed, the optical disc 4 is ejected from the disc drive 14.

Figure 3:
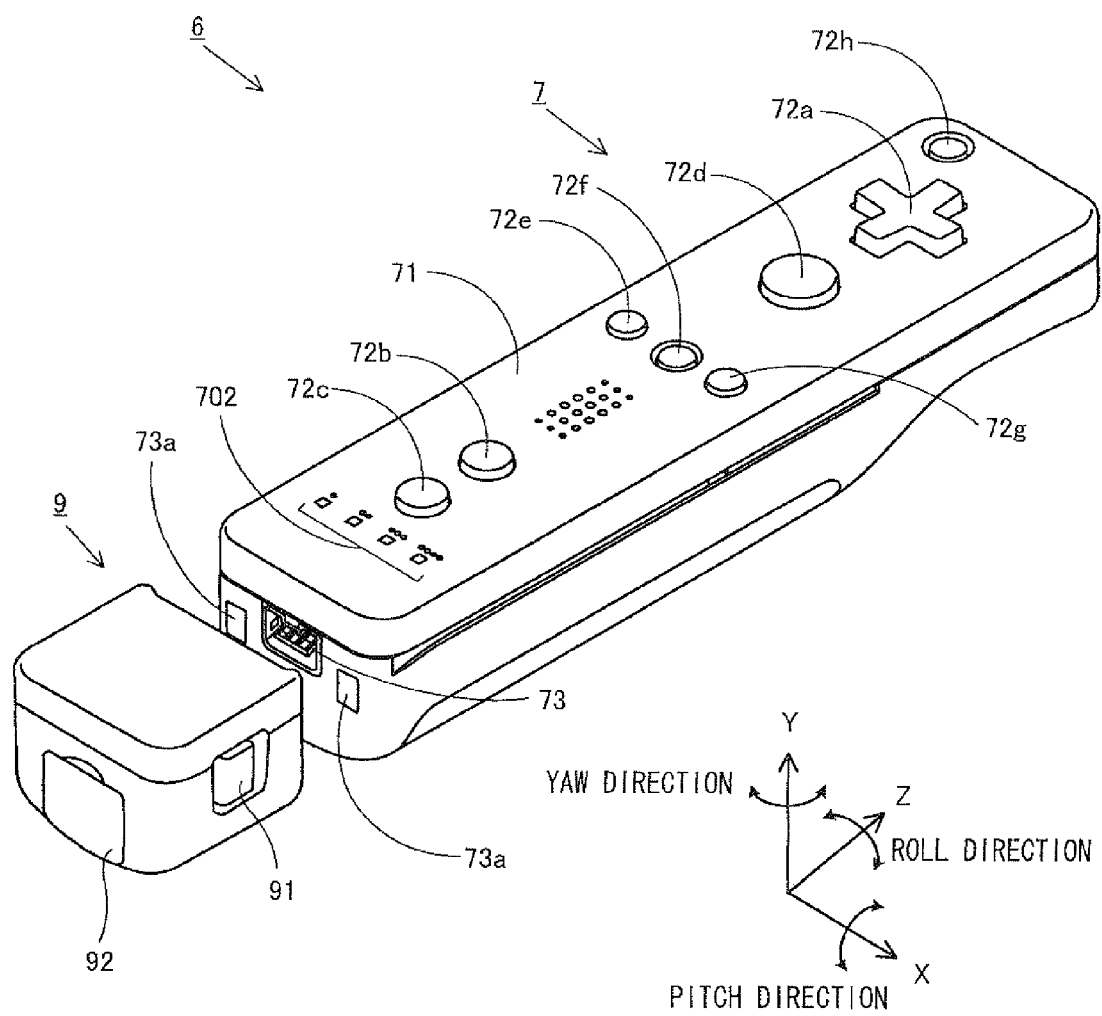
FIG. 3 is a perspective view of an input device 6 seen from a top rear side thereof.
Figure 4:
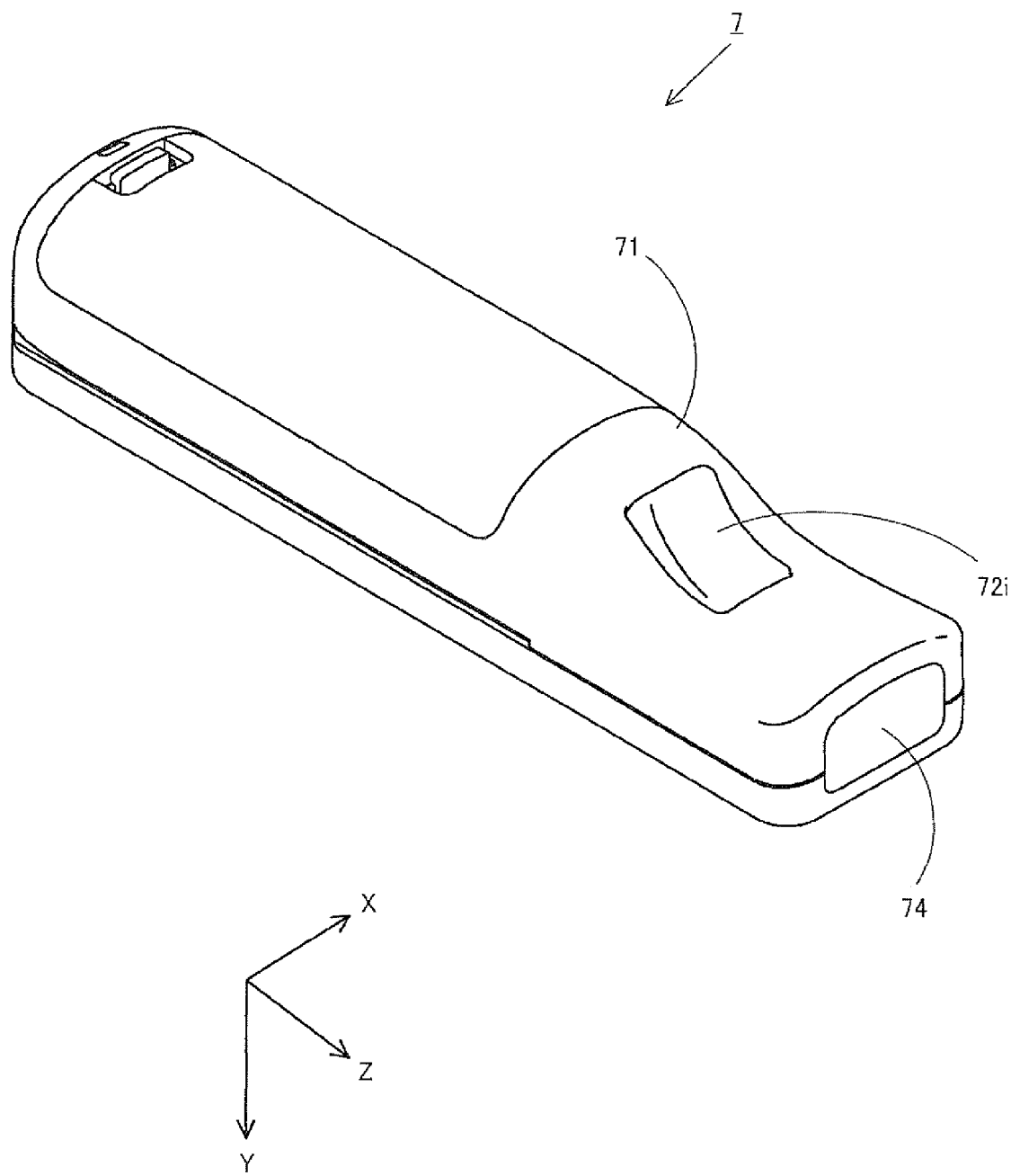
FIG. 4 is a perspective view of a controller 7 seen from a bottom front side thereof.

The following will describe the input device 6 with reference to FIGS. 3 and 4. FIG. 3 is a perspective view of the input device 6 seen from a top rear side thereof, and FIG. 4 is a perspective view of the controller 7 seen from a bottom front side thereof.

Referring to FIGS. 3 and 4, the controller 7 includes: a housing 71 formed, for example, by plastic molding; and an operation section 72 including a plurality of operation buttons which are provided on surfaces of the housing 71. The housing 71 has a generally parallelepiped shape extending in a longitudinal direction from front to rear, and the overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions (front, rear, right, and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, perform an instruction of a direction in which a player character or the like appearing in a virtual game world is to move, or select an option from a plurality of options.

The cross key 72a is an operation section for outputting an operation signal in accordance with the above-described direction input operation performed by the player. Such an operation section may be provided in another form. For example, the cross key 72a may be replaced with an operation section that includes four push switches arranged in a square and that outputs an operation signal in accordance with the push button pressed by the player. In addition to the four push switches of the operation section, a center switch may be provided at the center of the four push switches to form a composite operation section including the four push switches and the center switch. Alternatively, the cross key 72a may be replaced with an operation section that includes an inclinable stick (or joystick) projecting from the top surface of the housing 71 and that outputs an operation signal in accordance with an inclining direction of the stick. Still alternatively, the cross key 72a may be replaced with an operation section that includes a disc-shaped and horizontally slidable member and that outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a number one button, a number two button, and an A button are assigned to the operation buttons 72b to 72d, respectively. Also, functions as a minus button, a home button, and a plus button are assigned to the operation buttons 72e to 72g, respectively. The operation buttons 72a to 72g are assigned with operation functions in accordance with the game program executed by the game apparatus body 5. In an exemplary arrangement shown in FIG. 3, the operation buttons 72*b* to 72*d* are arranged on the top surface of the housing 71 in a line at the center in a front-rear direction. The operation buttons 72*e* to 72*g* are arranged on the top surface of the housing 71 in a line in a left-right direction between the operation buttons 72*b* and 72*d*. The operation button 72*f* has a top surface thereof buried in the top surface of the housing 71, so as not to be inadvertently pressed by the player.

In front of the cross key 72*a* on the top surface of the housing 71, an operation button 72*h* is provided. The operation button 72*h* is a power switch for turning on and off the power to the game apparatus body 5 by remote control. The operation button 72*h* also has a top surface thereof buried in the top surface of the housing 71, so as not to be inadvertently pressed by the player.

Behind the operation button 72*c* on the top surface of the housing 71, a plurality of LEDs 702 are provided. Here, a controller type (number) is assigned to the controller 7 such that the controller 7 is distinguishable from other controllers 7. For example, the LEDs 702 are used for informing the player of the controller type that is currently set for the controller 7. Specifically, a signal for lighting up one of the plurality of LEDs 702, which corresponds to the controller type of the controller 7, is transmitted from the wireless controller module 19 to the controller 7.

In the top surface of the housing 71, a plurality of holes is formed between the operation button 72*b* and the operation buttons 72*e* to 72*g* for outputting sound from a later-described speaker (a speaker 706 in FIG. 5) to the outside therethrough.

On a bottom surface of the housing 71, a recessed portion is formed. The recessed portion on the bottom surface of the housing 71 is formed in a position in which an index finger or middle finger of the player is located when the player holds the controller 7 so as to point a front surface thereof to the markers 8L and 8R. On a slope surface of the recessed portion, an operation button 72*i* is provided. The operation button 72*i* is an operation section acting as, for example, a B button.

In the front surface of the housing 71, an image pickup element 743 constituting a part of the imaging information calculation section 74 is provided. The imaging information calculation section 74 is a system for analyzing image data of an image taken by the controller 7, thereby identifying an area having a high brightness in the image and detecting the position of the center of gravity, the size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. In a rear surface of the housing 71, a connector 73 is provided. The connector 73 is, for example, an edge connector, and is used for engaging and connecting the controller 7 with a connection cable. In an example of the input device 6 shown in FIGS. 1 and 3, an angular velocity detection unit 9 is detachably connected to the controller 7 at its rear surface via the connector 73.

In order to give a specific description, a coordinate system set with respect to the input device 6 (the controller 7) will be defined. As shown in FIGS. 3 and 4, mutually perpendicular X-axis, Y-axis, and Z-axis are defined with respect to the input device 6 (the controller 7). Specifically, the longitudinal direction of the housing 71 or the front-rear direction of the controller 7 corresponds to Z-axis, and the direction toward the front surface of the controller 7 (the surface in which the imaging information calculation section 74 is provided) is a positive direction of Z-axis. The up-down direction of the controller 7 corresponds to Y-axis, and the direction toward the top surface of the housing 71 (the surface on which the operation button 72*a* is provided) is a positive direction of Y-axis. The left-right direction of the controller 7 corresponds to X-axis, and the direction toward the right side surface housing 71 (the side surface which is shown in FIG. 3) is a positive direction of X-axis.

Figure 7:
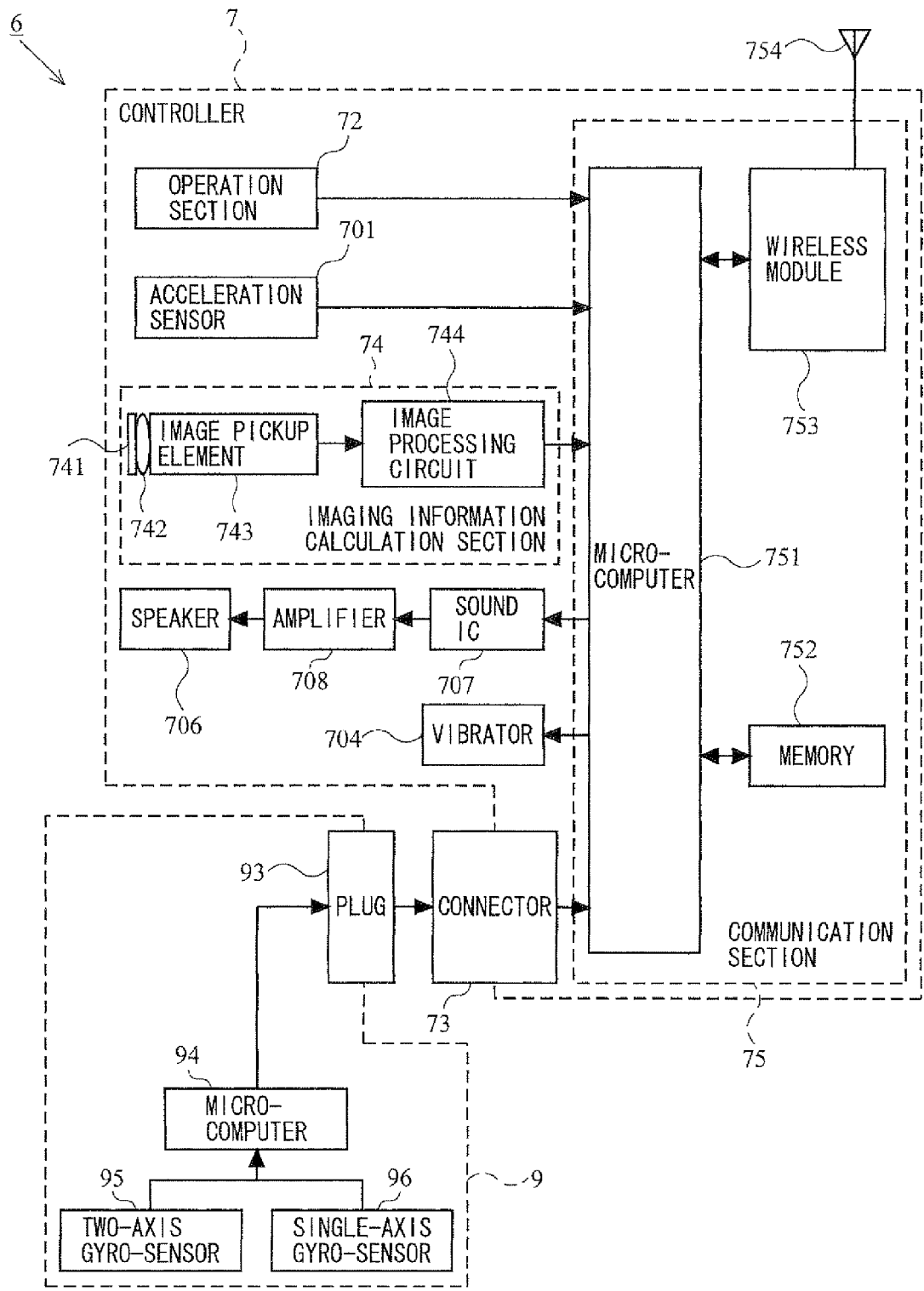
FIG. 7 is a block diagram showing a configuration of the input device 6 in FIG. 3.

The angular velocity detection unit 9 includes a gyro-sensor (a two-axis gyro-sensor 95 and a single-axis gyro-sensor 96 shown in FIG. 7) that detects angular velocity about three axes. On a front end (an end on the Z-axis positive direction side shown in FIG. 3) of the angular velocity detection unit 9, a plug (plug 93 shown in FIG. 7) connectable to the connector 73 is provided. Further, hooks (not shown) are provided on both sides of the plug 93. In a state where the angular velocity detection unit 9 is mounted to the controller 7, the plug 93 is connected to the connector 73 and the hooks engages engagement holes 73*a* of the controller 7. Thus, the controller 7 and the angular velocity detection unit 9 are firmly fixed to each other. Further, the angular velocity detection unit 9 has two buttons 91 on both side surfaces (surfaces on the X-axis positive and negative direction sides shown in FIG. 3), respectively. The button 91 is configured such that when the button 91 is pressed, the engaging state of the hooks with respect to the engagement holes 73*a* is released. Thus, by pulling the plug 93 from the connector 73 with the button 91 pressed, the angular velocity detection unit 9 is detached from the controller 7.

On a rear end of the angular velocity detection unit 9, a connector 97 (see FIG. 18) with the same shape as that of the above connector 73 is provided. Thus, another device (e.g. a later-described subunit 76) attachable to the controller 7 (connector 73) is also attachable to the rear connector 97 of the angular velocity detection unit 9. In FIG. 3, a cover 92 for the rear connector 97 is detachably mounted to the angular velocity detection unit 9.

Figure 5:
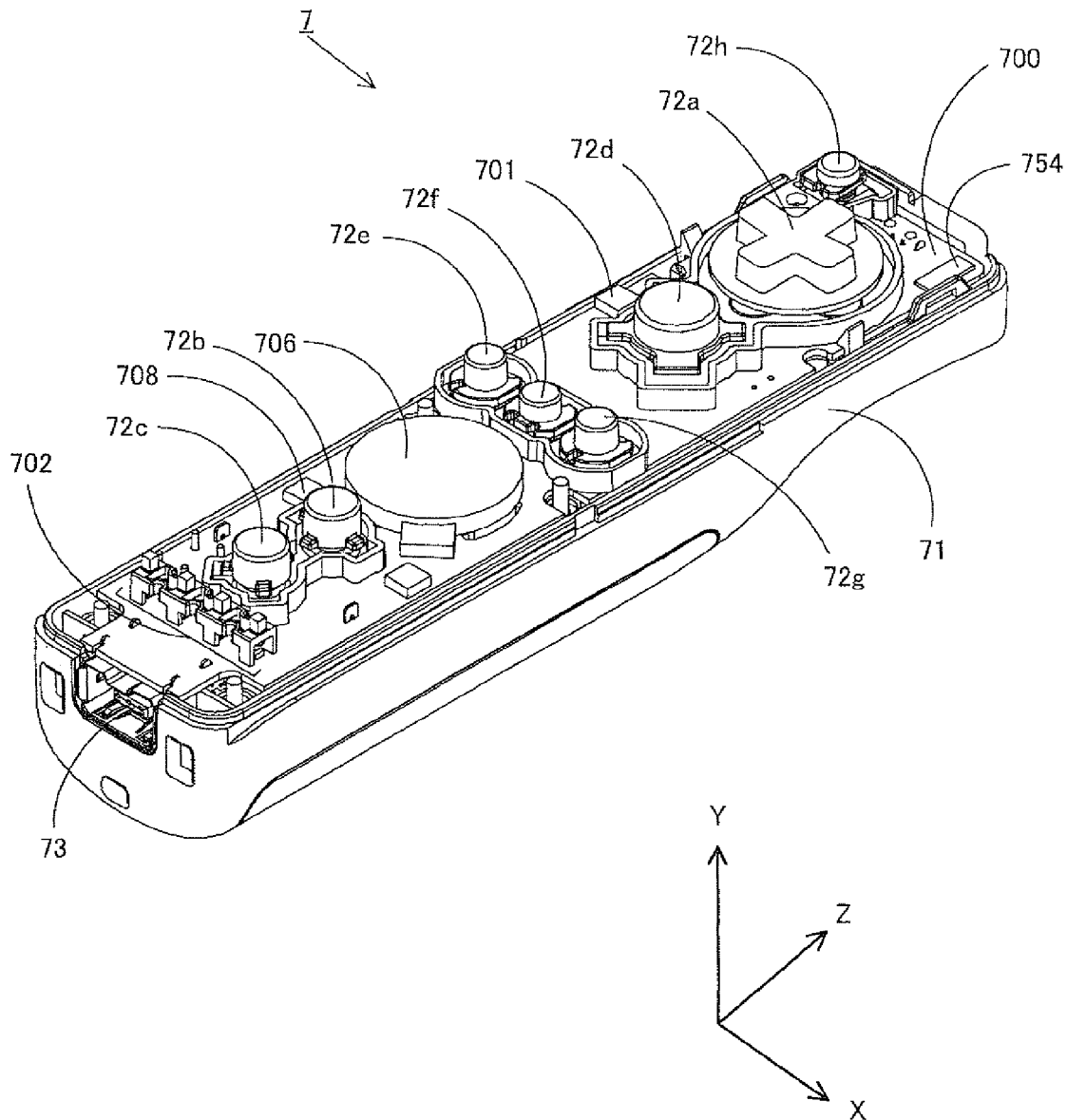
FIG. 5 is a perspective view of the controller 7 in FIG. 3 in a state where an upper housing thereof is removed.
Figure 6:
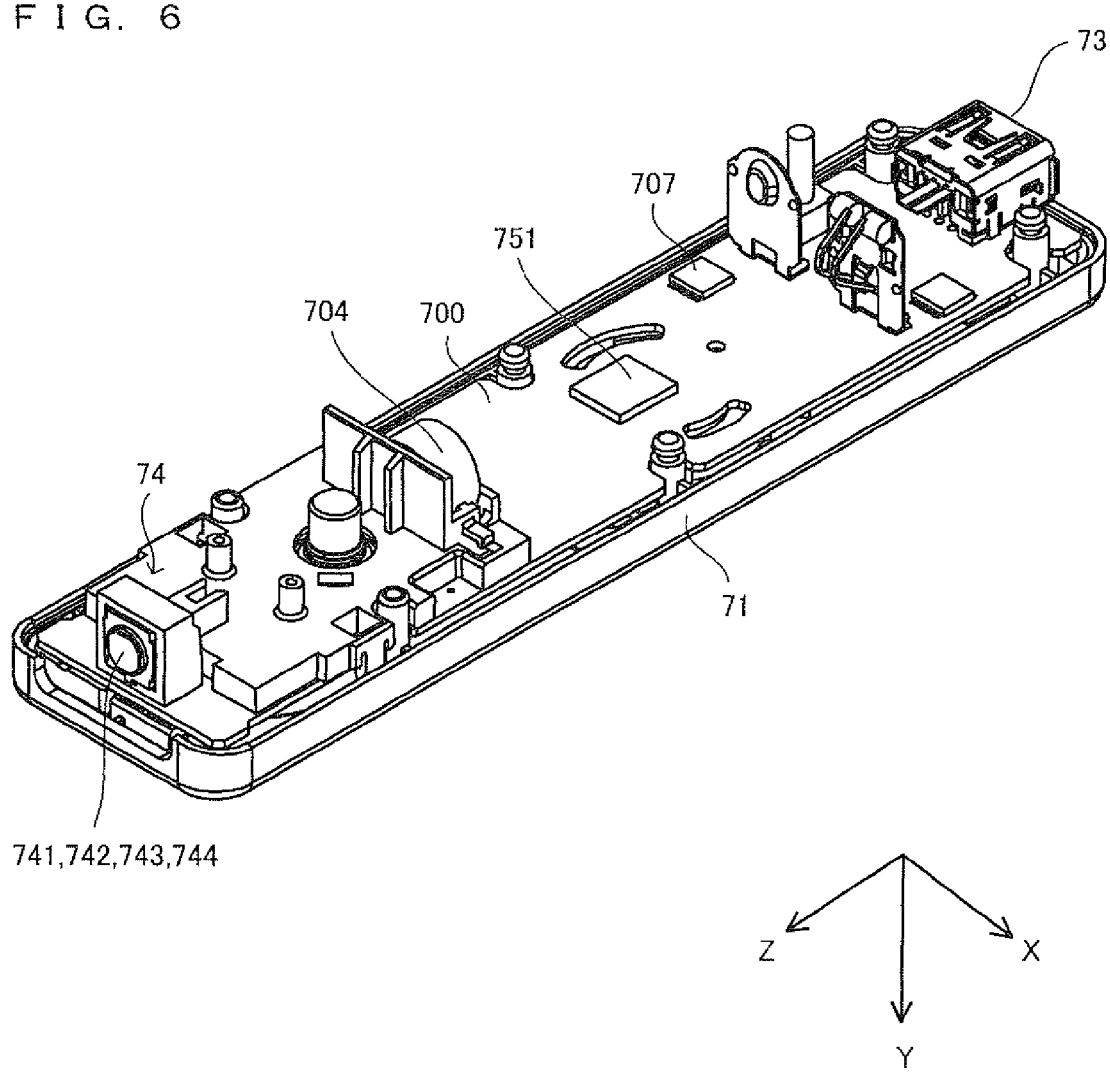
FIG. 6 is a perspective view of the controller 7 in FIG. 4 in a state where a lower housing thereof is removed.

The following will describe an internal configuration of the controller 7 with reference to FIGS. 5 and 6. FIG. 5 is a perspective view of the controller 7 seen from a rear side thereof, in a state where an upper housing thereof (a part of the housing 71) is removed. FIG. 6 is a perspective view of the controller 7 seen from a front side thereof, in a state where a lower housing thereof (a part of the housing 71) is removed. FIG. 6 shows a reverse side of a substrate 700 shown in FIG. 5.

Referring to FIG. 5, the substrate 700 is fixed inside the housing 71. On a top main surface of the substrate 700, the operation buttons 72*a* to 72*h*, an acceleration sensor 701, the LEDs 702, and an antenna 754 and the like are provided. These components are connected to a microcomputer 751 and the like (see FIGS. 6 and 7) by lines (not shown) formed on the substrate 700 and the like. The controller 7 functions as a wireless controller by a wireless module 753 (see FIG. 7) and the antenna 754. In the housing 71, a crystal oscillator (not shown) is provided for generating a basic clock of the later-described microcomputer 751. On the top main surface of the substrate 700, the speaker 706 and an amplifier 708 are provided. The acceleration sensor 701 is provided on the left side of the operation button 72*d* on the substrate 700 (i.e. on the periphery of the substrate 700, not on the center thereof). The acceleration sensor 701 is capable of detecting acceleration included in a component caused by a centrifugal force in accordance with rotation of the controller 7 about the longitudinal direction thereof, in addition to change of the direction of gravitational acceleration. Thus, the game apparatus body 5 or the like can be sensitive enough to determine the motion of the controller 7 from detected acceleration data using a predetermined calculation.

Referring to FIG. 6, at a front edge of a bottom main surface of the substrate 700, the imaging information calculation section 74 is provided. The imaging information calculation section 74 includes an infrared filter 741, a lens 742, the image pickup element 743, and an image processing circuit 744 which are located in this order from the front surface of the controller 7. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the game apparatus body 5.

On the bottom main surface of the substrate 700, a vibrator 704 is attached. The vibrator 704 is, for example, a vibration motor or a solenoid. The vibrator 704 is connected to the microcomputer 751 by a line formed on the substrate 700 and the like, and actuated or unactuated in accordance with vibration data transmitted from the game apparatus body 5. The controller 7 is vibrated by an actuation of the vibrator 704, and the vibration is conveyed to the player holding the controller 7. Thus, a so-called vibration-feedback game is realized. Because the vibrator 704 is located in the front portion of the housing 71, the housing 71 is vibrated substantially, and hence the player holding the controller 7 easily feels the vibration.

The following will describe an internal configuration of the input device 6 (the controller 7 and the angular velocity detection unit 9) with reference to FIG. 7. FIG. 7 is a block diagram showing the internal configuration of the controller 7.

Referring to FIG. 7, the controller 7 includes therein a communication section 75 in addition to the operation section 72, the imaging information calculation section 74, the acceleration sensor 701, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. The lens 742 converges the infrared light that has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light that has passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, detects an area of the image that has a high brightness, and outputs, to the communication section 75, process result data indicative of, e.g., the calculated coordinate position and the square measure of the area. The imaging information calculation section 74 is fixed to the housing 71 of the controller 7, and an imaging direction of the imaging information calculation section 74 can be changed by changing a facing direction of the housing 71.

The controller 7 preferably includes a three-axis (X-axis, Y-axis, and Z-axis) acceleration sensor 701. The three-axis acceleration sensor 701 detects linear acceleration in three directions, i.e., the up-down direction (Y-axis shown in FIG. 3), the left-right direction (X-axis shown in FIG. 3), and the front-rear direction (Z-axis shown in FIG. 3). In an alternative embodiment, accelerometers each of which detects linear acceleration at least along one axial direction may be used. As a non-limiting example, the acceleration sensor 701 may be of the type available from Analog Devices, Inc. or STMicroelectronics N.V. Preferably, the acceleration sensor 701 may be of electrostatic capacitance type (capacitance-coupling type) that is based on silicon micro-machined MEMS (micro Electro Mechanical Systems) technology. However, any other suitable accelerometer technology (e.g., piezoelectric type or piezo resistance type) now existing or later developed may be used to provide the acceleration sensor 701.

Accelerometers, as used in the acceleration sensor 701, are only capable of detecting acceleration along a straight line (linear acceleration) corresponding to each axis of the acceleration sensor 701. In other words, the direct output of the acceleration sensor 701 is limited to signals indicative of linear acceleration (static or dynamic) along each of the three axes thereof. As a result, the acceleration sensor 701 cannot directly detect movement along a non-linear (e.g. arcuate) path, rotation, rotational movement, angular displacement, inclination, position, attitude or any other physical characteristic.

However, through processing by a computer such as the processor of the game apparatus 3 (e.g. the CPU 10) or the processor of the controller 7 (e.g. the microcomputer 751) based on the acceleration signals outputted from the acceleration sensor 701, additional information relating to the controller 7 can be inferred or calculated, as one skilled in the art will readily understand from the description herein.

For example, when the processing is performed by the computer on the assumption that the controller 7 provided with the acceleration sensor 701 is in static state (i.e. when the processing is performed while only gravitational acceleration is detected by the acceleration sensor 701), if the controller 7 is actually in static state, the detected acceleration is used to determine whether or not the controller 7 is inclined relative to the direction of gravity or how many degrees the controller 7 is inclined relative to the direction of gravity. Specifically, when a state where the detection axis of the acceleration sensor 701 extends in a vertically-down direction is set as a reference state, it is possible to determine whether or not the controller 7 is inclined, only by determining whether 1G (gravitational acceleration) is applied in the direction of the detection axis of the acceleration sensor 701. It is also possible to determine how many degrees the controller 7 is inclined with respect to the vertically downward direction by determining the magnitude of the acceleration applied in the above detection axis direction. In addition, in the case where the acceleration sensor 701 is capable of detecting acceleration in multi-axis directions, it is possible to determine in detail how many degrees each axis is inclined relative to the direction of gravity through processing of a signal of acceleration detected for each axis. In this case, a processor may perform processing based on the output from the acceleration sensor 701 for calculating inclination angle data of the controller 7. Alternatively, processing may be performed so as to infer rough inclination of the controller 7 based on the output from the acceleration sensor 701 without calculating the inclination angle data. As described above, the acceleration sensor 701 is used in combination with the processor to determine inclination, attitude or position of the controller 7.

On the other hand, on the assumption that the acceleration sensor 701 is in dynamic state, the acceleration sensor 701 detects acceleration corresponding to motion of the acceleration sensor 701 in addition to a gravitational acceleration component. Thus, it is possible to determine the direction of the motion of the controller 7 by eliminating the gravitational acceleration component through predetermined processing. Specifically, various motions and/or positions of the controller 7 can be calculated through processing of the acceleration signal generated by the acceleration sensor 701 when the controller 7 provided with the acceleration sensor 701 is subjected to dynamic acceleration by the hand of the player. It is noted that even on the assumption that the acceleration sensor 701 is in dynamic state, it is possible to determine inclination of the controller 7 relative to the direction of gravity by eliminating acceleration corresponding to motion of the acceleration sensor 701 through predetermined processing.

In an alternative embodiment, the acceleration sensor 701 may include an embedded signal processor or other type of a dedicated processor for performing any desired processing of the acceleration signals outputted from accelerometers therein prior to outputting signals to the microcomputer 751. For example, the embedded or dedicated processor could convert the detected acceleration signal into a corresponding tilt angle (or another suitable parameter) when the acceleration sensor 701 is intended to detect static acceleration (i.e., gravitational acceleration). Data indicative of the acceleration detected by the acceleration sensor 701 is outputted to the communication section 75

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data that the wireless module 753 receives from the game apparatus body 5 via the antenna 754. The sound IC 707 processes the sound data and the like transmitted from the game apparatus body 5 via the communication section 75. The microcomputer 751 actuates the vibrator 704 in accordance with the vibration data (e.g. signals for actuating and unactuating the vibrator 704) transmitted from the game apparatus 3 via the communication section 75. The microcomputer 751 is connected to the connector 73. Data transmitted from the angular velocity detection unit 9 is inputted to the microcomputer 751 via the connector 73. The following will describe a configuration of the angular velocity detection unit 9.

The angular velocity detection unit 9 includes the plug 93, a microcomputer 94, the two-axis gyro-sensor 95, and the single-axis gyro-sensor 96. As described above, the angular velocity detection unit 9 detects angular velocities about three axes (X-axis, Y-axis, and Z-axis in the present embodiment), and outputs, to the controller 7, data (angular velocity data) indicative of the detected angular velocities.

The two-axis gyro-sensor 95 detects an angular velocity about X-axis and an angular velocity about Y-axis per unit time. The single-axis gyro-sensor 96 detects an angular velocity about Z-axis per unit time. In the present specification, as shown in FIG. 3, a direction of rotation about the longitudinal direction of the housing 71 (about Z-axis), which is the front-rear direction of the controller 7, is referred to as a roll direction, a direction of rotation about the up-down direction of the controller 7 (about Y-axis) is referred to as a yaw direction, and a direction of rotation about the left-right direction of the controller 7 (about X-axis) is referred to as a pitch direction. In other words, the two-axis gyro-sensor 95 detects angular velocities in the pitch direction (the direction of rotation about X-axis) and the yaw direction (the direction of rotation about Y-axis), and the single-axis gyro-sensor 96 detects an angular velocity in the roll direction (the direction of rotation about Z-axis).

In the present embodiment, the two-axis gyro-sensor 95 and the single-axis gyro-sensor 96 are used for detecting angular velocities about three axes. In an alternative embodiment, any number and any combination of gyro-sensors may be used as long as angular velocities about three axes are detected. The two-axis gyro-sensor 95 and the single-axis gyro-sensor 96 are one example of means for detecting an angular velocity in the present invention, and various types of angular velocity sensors can be used. For example, angular velocity sensors of a vibration type, a mechanical type, a fluid type, an optical type, and the like can be used. Specifically, as means for detecting an angular velocity, a vibration type gyroscope using Coriolis force applied to a vibrating object, an optical type gyroscope using Sagnac effect, and the like can be used. When the two-axis gyro-sensor 95 and the single-axis gyro-sensor 96 are collectively explained, they are described as gyro-sensors 95 and 96.

Data indicative of angular velocities detected by each of the gyro-sensors 95 and 96 is outputted to the microcomputer 94. This means that data indicative of angular velocities about the three axes, i.e. X-axis, Y-axis, and Z-axis is inputted to the microcomputer 94. The microcomputer 94 outputs, as angular velocity data, the data indicative of the angular velocities about the three axes to the controller 7 via the plug 93. The output from the microcomputer 94 to the controller 7 is performed at a predetermined time interval. Because game processing is generally performed at a cycle of $\frac{1}{60}$ sec. (every-one-frame time), the output from the microcomputer 94 to the controller 7 is preferably performed at a cycle shorter than $\frac{1}{60}$ sec. In one example, an operation of each of the gyro-sensors 95 and 96 detecting an angular velocity and outputting it to the controller 7 is performed at a cycle of $\frac{1}{200}$ sec.

Returning back to the explanation of the controller 7, data from the controller 7 including an operation signal (key data) from the operation section 72 provided in the controller 7, acceleration signals of the three axial directions (X-axis, Y-axis, and Z-axis direction acceleration data) from the acceleration sensor 701, the process result data from the imaging information calculation section 74, and the data (X-axis, Y-axis, and Z-axis angular velocity data) indicative of angular velocities about the three axes from the angular velocity detection unit 9 are outputted to the microcomputer 751. The microcomputer 751 temporarily stores the input data (the key data, the X-axis, Y-axis, and Z-axis direction acceleration data, the process result data, and the X-axis, Y-axis, and Z-axis angular velocity data) in the memory 752 as the transmission data that is to be transmitted to the wireless controller module 19. The wireless transmission from the communication section 75 to the wireless controller module 19 is performed periodically at a predetermined time interval. Because game processing is generally performed at a cycle of $\frac{1}{60}$ sec., data needs to be collected and transmitted at a cycle shorter than $\frac{1}{60}$. Specifically, the game processing unit is 16.7 ms ($\frac{1}{60}$ sec.), and the transmission interval of the communication section 75 configured using the Bluetooth (registered trademark) technology is 5 ms. At a transmission timing to the wireless controller module 19, the microcomputer 751 outputs the transmission data stored in the memory 752 as a series of operation information to the wireless module 753. The wireless module 753 uses, for example, the Bluetooth (registered trademark) technology to radiate a radio signal indicative of the operation data, using a carrier wave of a predetermined frequency from the antenna 754. Thus, the key data from the operation section 72 provided in the controller 7, the acceleration data of X-axis, Y-axis, and Z-axis directions from the acceleration sensor 701, the process result data from the imaging information calculation section 74, and the X-axis, Y-axis, and Z-axis angular velocity data from the angular velocity detection unit 9 are transmitted from the controller 7. The wireless controller module 19 of the game apparatus body 5 receives the radio signal, and the game apparatus body 5 demodulates or decodes the radio signal to obtain the series of operation information (the key data, the acceleration data of X-axis, Y-axis, and Z-axis directions, the process result data, and the X-axis, Y-axis, and Z-axis angular velocity data). Based on the obtained operation information and the game program, the CPU 10 of the game apparatus body 5 executes the game processing. In the case where the communication section 75 is configured using the Bluetooth (registered trademark) technology, the communication section 75 can have a function of receiving transmission data that is wirelessly transmitted from another device.

By using the input device 6, the player can perform operations of inclining the controller 7 at any angle and moving the controller 7 in any direction, in addition to a conventional and general game operation such as pressing each operation button. Further, according to the input device 6, the player can perform an operation of pointing to any position on the screen by pointing the input device 6.

Figure 8:
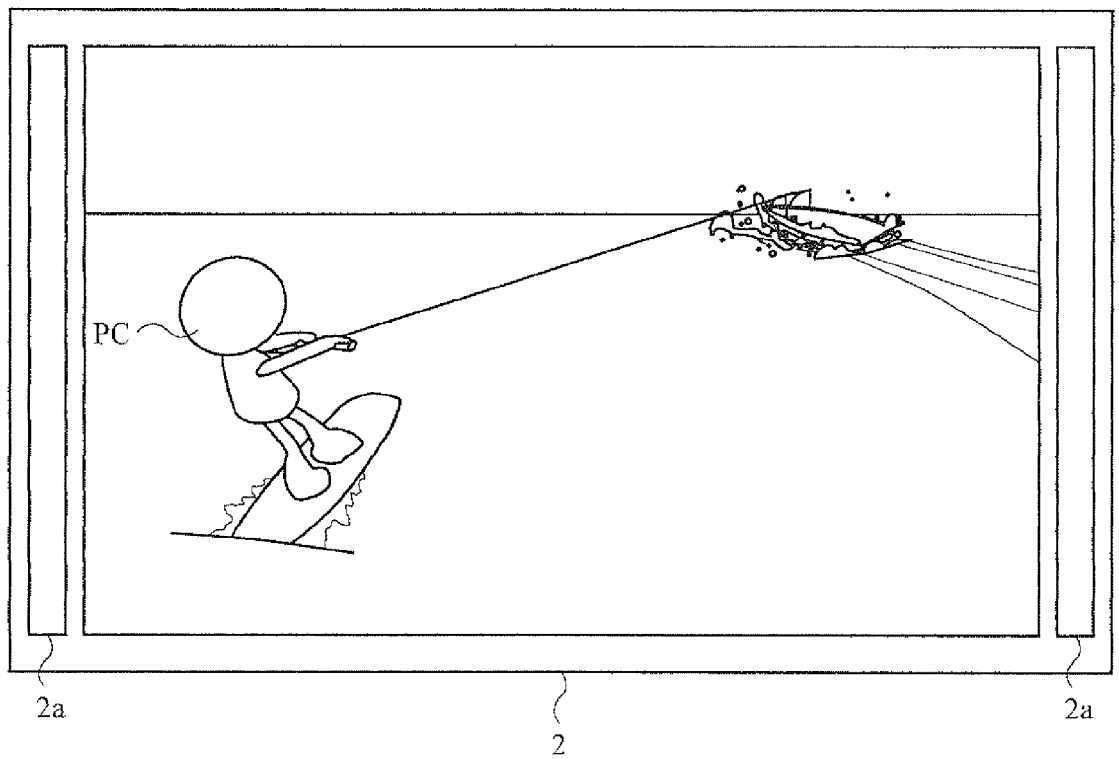
FIG. 8 shows an example of a game screen displayed on a monitor 2 when the input device 6 is operated so as to be maintained horizontally.
Figure 8:
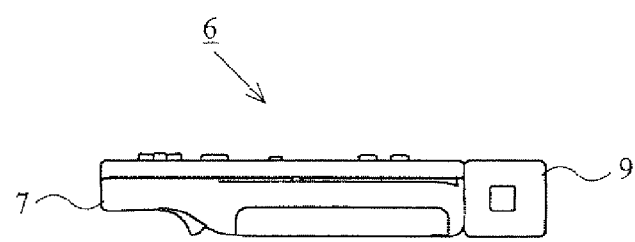
Figure 9:
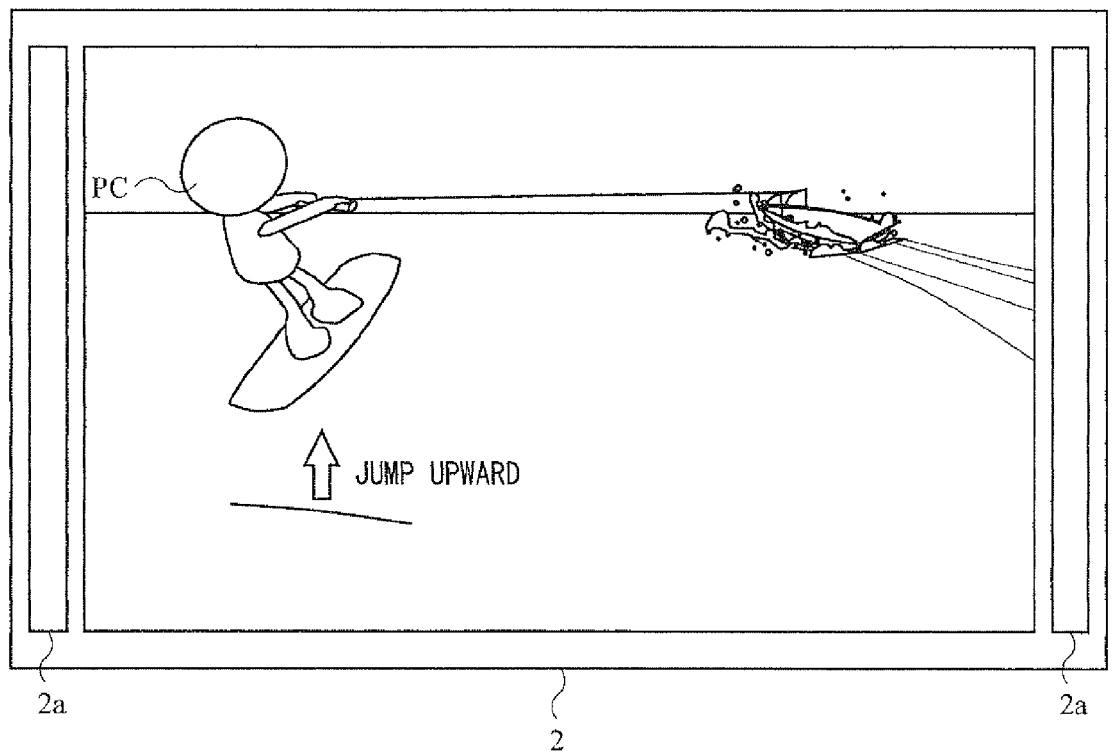
FIG. 9 shows an example of a game screen displayed on the monitor 2 when the input device 6 is operated so as to be moved in parallel upward.
Figure 9:
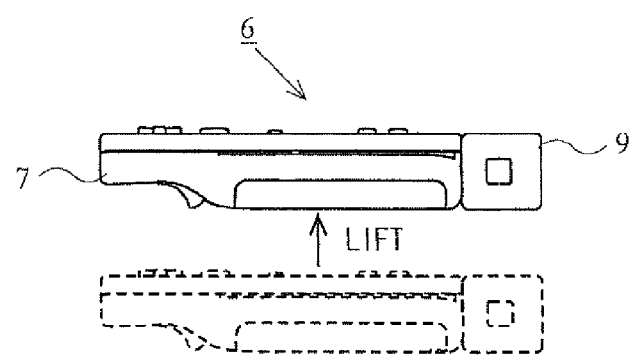
Figure 10:
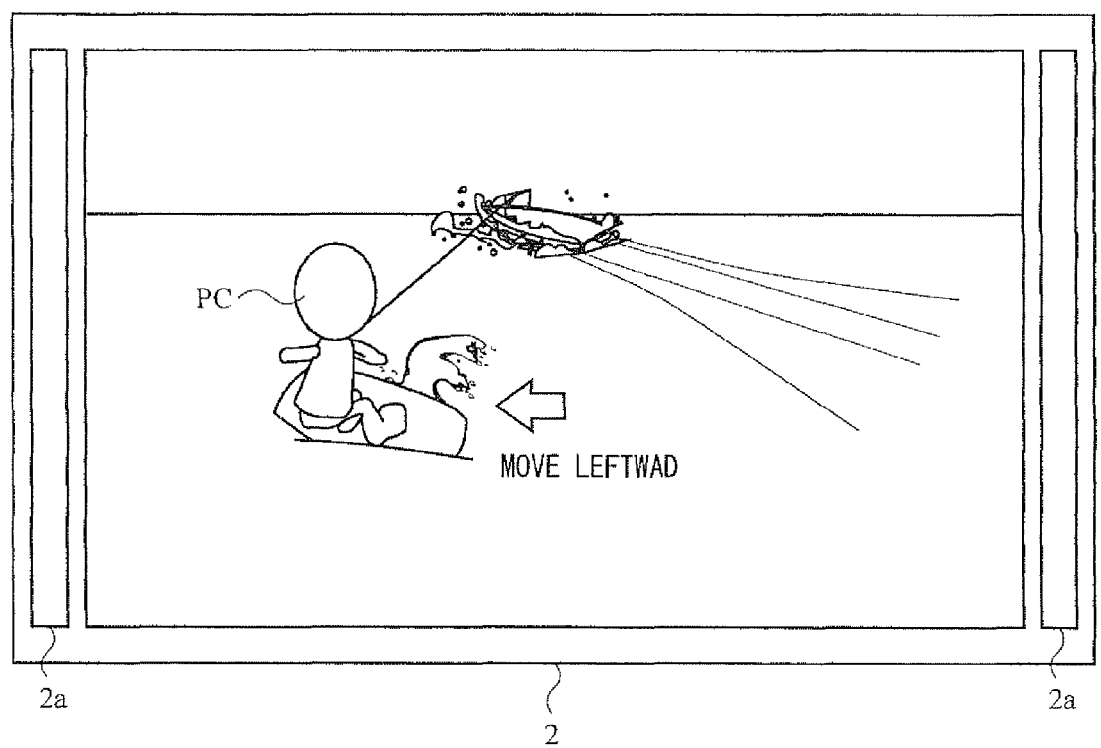
FIG. 10 shows an example of a game screen displayed on the monitor 2 when the input device 6 is operated so as to be inclined leftward.
Figure 10:
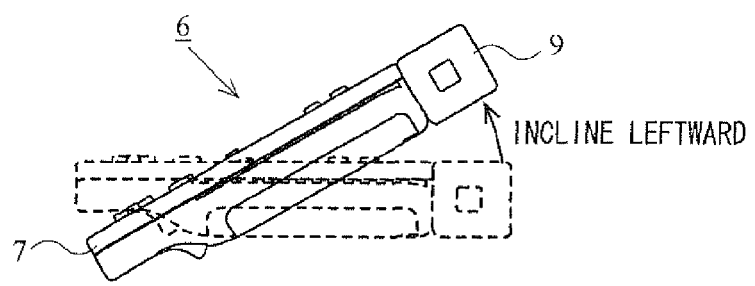

With reference to FIGS. 8 to 10, the following will describe an outline of processing executed by the game apparatus body 5, prior to detailed description of the processing executed by the game apparatus body 5. FIG. 8 shows an example of a game screen displayed on a monitor 2 when the input device 6 is operated so as to be maintained horizontally. FIG. 9 shows an example of a game screen displayed on the monitor 2 when the input device 6 is operated so as to be moved in parallel upward. FIG. 10 shows an example of a game screen displayed on the monitor 2 when the input device 6 is operated so as to be inclined leftward.

In FIGS. 8 to 10, a player character PC wakeboarding in a virtual game world is displayed on the monitor 2. Wakeboarding is a sport in which a rider with his or her feet fixed on a board is towed by a boat, thereby sliding over the surface of water. In wakeboarding in the virtual game space shown in FIGS. 8 to 10, the player character PC can be caused to turn or jump by the player, who operates the input device 6, inclining or moving the input device 6.

Specifically, as shown in FIG. 8, when the player operates the input device 6 so as to maintain the input device 6 horizontally, the player character PC performs a motion so as to slide straight toward a boat towing the player character PC in the virtual game space. In addition, as shown FIG. 9, when the player operates the input device 6 so as to moves the input device 6 in parallel upward, the player character PC performs a motion so as to jump upward from the water surface in the virtual game space. Further, as shown in FIG. 10, when the player operates the input device 6 so as to incline the input device 6 leftward, the player character PC performs a motion so as to slide turning left on the water surface in the virtual game space.

Figure 11:
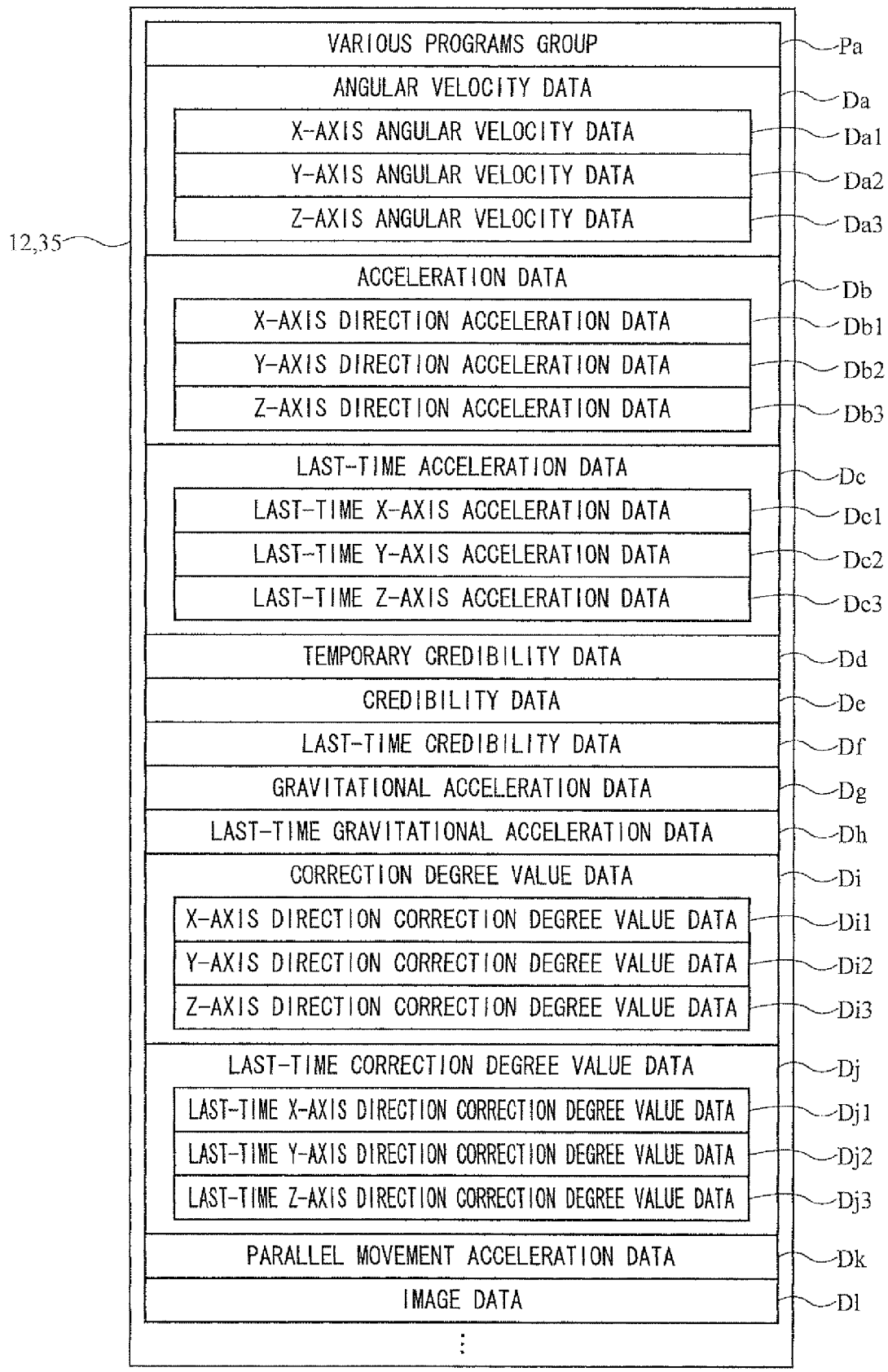
FIG. 11 shows an example of main data and programs that are stored in a main memory of the game apparatus body 5.

The following will describe game processing executed by the game system 1. First, main data used in the game processing will be described with reference to FIG. 11. FIG. 11 shows an example of main data and programs that are stored in the external main memory 12 and/or the internal main memory 35 (hereinafter, the two main memories are collectively referred to merely as the main memory) of the game apparatus body 5

As shown in FIG. 11, angular velocity data Da, acceleration data Db, last-time acceleration data Dc, temporary credibility data Dd, credibility data De, last-time credibility data Df, gravitational acceleration data Dg, last-time gravitational acceleration data Dh, correction degree value data Di, last-time correction degree value data Dj, parallel movement acceleration data Dk, image data Dl, and the like are stored in a data storage region of the main memory. In addition to the data shown in FIG. 11, data required for the game processing, such as image data of various objects appearing in a game and data indicative of various parameters of the objects, is stored in the main memory. Further, a various programs group Pa constituting the game program is stored in a program storage region of the main memory. At an appropriate timing after the power is applied to the game apparatus body 5, the various programs group Pa is partially or entirely read from the optical disc 4 or another storage medium and stored in the main memory.

The angular velocity data Da is data indicative of angular velocities detected by the gyro-sensors 95 and 96 of the angular velocity detection unit 9, and stored so as to be associated with each input device 6 to be used. For example, the angular velocity data Da is data that is indicative of angular velocities generated in the input device 6 (the gyro-sensors 95 and 96), and angular velocity data included in a series of pieces of operation information transmitted as transmission data from the input device 6 is stored therein. The angular velocity data Da includes X-axis angular velocity data Da1 indicative of an angular velocity ωx about X-axis, Y-axis angular velocity data Da2 indicative of an angular velocity ωy about Y-axis, and Z-axis angular velocity data Da3 indicative of an angular velocity ωz about Z-axis, the angular velocities ωx, ωy, and ωz being detected by the gyro-sensors 95 and 96. The wireless controller module 19 of the game apparatus body 5 receives the angular velocity data included in the operation information transmitted from the controller 7 at a predetermined interval (e.g. every 1/200 sec.), and the angular velocity data is stored in a buffer (not shown) provided in the wireless controller module 19. Then, for example, every one frame that is a game processing cycle, data stored during the frame, among the angular velocity data stored in the above buffer, is read and the angular velocity data Da in the main memory is updated therewith.

The acceleration data Db is data indicative of acceleration generated in the controller 7, and acceleration data included in a series of pieces of operation information transmitted as transmission data from the controller 7 is stored therein. The acceleration data Db includes X-axis direction acceleration data Db1 indicative of acceleration ax detected by the acceleration sensor 701 with respect to an X-axis component; Y-axis direction acceleration data Db2 indicative of acceleration ay detected by the acceleration sensor 701 with respect to a Y-axis component; and Z-axis direction acceleration data Db3 indicative of acceleration az detected by the acceleration sensor 701 with respect to a Z-axis component. Similarly to the above angular velocity data Da, the wireless controller module 19 of the game apparatus body 5 receives the acceleration data included in the operation information transmitted from the controller 7 at a predetermined interval (e.g. every 1/200 sec.), and the acceleration data is stored in the buffer (not shown) provided in the wireless controller module 19. Then, every one frame (e.g. every 1/60 sec.) that is the game processing cycle, the acceleration data stored in the above buffer is read and the acceleration data Db in the main memory is updated therewith.

As described above, pieces of operation information received at multiple timings are stored in the above buffer because the cycle of receiving operation information is different from the processing cycle. In the description of later-described processing, an embodiment, in which processing is executed at each later-described step by using only the latest piece of operation information among the operation information received at the multiple timings and the processing proceeds to the next step, is used.

A flow of processing will be described later with an example where the angular velocity data Da and the acceleration data DL are updated every one frame that is the game processing cycle. However, the angular velocity data Da and the acceleration data Db may be updated at a different processing cycle. For example, the angular velocity data Da and the acceleration data Db may be updated at a cycle of transmission from the controller 7, and the updated angular velocity data Da and the updated acceleration data Db may be used in each game processing cycle. In this case, the cycle of updating the angular velocity data Da1 to Da3 stored in the angular velocity data Da and the acceleration data Db1 to Db3 stored in the acceleration data Db is different from the game processing cycle.

In the last-time acceleration data Dc, the acceleration data used in the last processing is stored. Specifically, the last-tine acceleration data Dc includes X-axis direction acceleration data Dc1 indicative of acceleration a0x of an X-axis component used in the last processing, Y-axis direction acceleration data Dc2 indicative of acceleration a0y of a Y-axis component used in the last processing, and Z-axis direction acceleration data Dc3 indicative of acceleration a0z of a Z-axis component used in the last processing.

In the temporary credibility data Dd, credibility (temporary credibility d) temporarily indicative of whether or not acceleration applied to the controller 7 is credible as the gravitational acceleration when the gravitational acceleration applied to the controller 7 is inferred, is stored. In the credibility data De, final credibility (credibility t) indicative of whether or not the acceleration applied to the controller 7 is credible as the gravitational acceleration, is stored. In the Last-time credibility data Df, data indicative of final credibility (credibility t0) used in the last processing is stored.

In the gravitational acceleration data Dg, data indicative of gravitational acceleration inferred to be applied to the controller 7 is stored. Specifically, data indicative of a gravitational acceleration vector g indicating the magnitude and the direction of the gravitational acceleration inferred Lo be applied to the controller 7 is stored in the gravitational acceleration data Dg. In the last-time gravitational acceleration data Dh, data indicative of a gravitational acceleration vector (gravitational acceleration vector g0) inferred to be applied to the controller 7 in the last processing, is stored.

In the correction degree value data Di, data indicative of a correction degree value f representing a degree of correcting acceleration obtained from the controller 7, is stored. Specifically, the correction degree value data Di includes X-axis direction correction degree value data Di1 indicative of a correction degree value fx for an X-axis component, Y-axis direction correction degree value data Di2 indicative of a correction degree value fy for a Y-axis component, and Z-axis direction correction degree value data Di3 indicative of an correction degree value fz for a Z-axis component. In the last-time correction degree value data Dj, data indicative of a correction degree value (correction degree value f0) calculated in the last processing. Specifically, the last-time correction degree value data Dj includes X-axis direction correction degree value data Dj1 indicative of a correction degree value f0x for an X-axis component that is used in the last processing, Y-axis direction correction degree value data Dj2 indicative of a correction degree value f0y for a Y-axis component that is used in the last processing, and Z-axis direction correction degree value data Dj3 indicative of a correction degree value f0z for a Z-axis component that is used in the last processing.

In the parallel movement acceleration data Dk, data indicative of parallel movement acceleration representing acceleration obtained by a parallel movement of the controller 7 among acceleration obtained from the controller 7, is stored. Specifically, in the parallel movement acceleration data Dk, data indicative of a parallel movement acceleration vector p representing the acceleration obtained by the parallel movement of the controller 7, is stored.

In the image data Dl, data for positioning the player character PC (see FIGS. 8 to 10), other objects, backgrounds, and the like in the virtual game space to generate images is stored.

Figure 12:
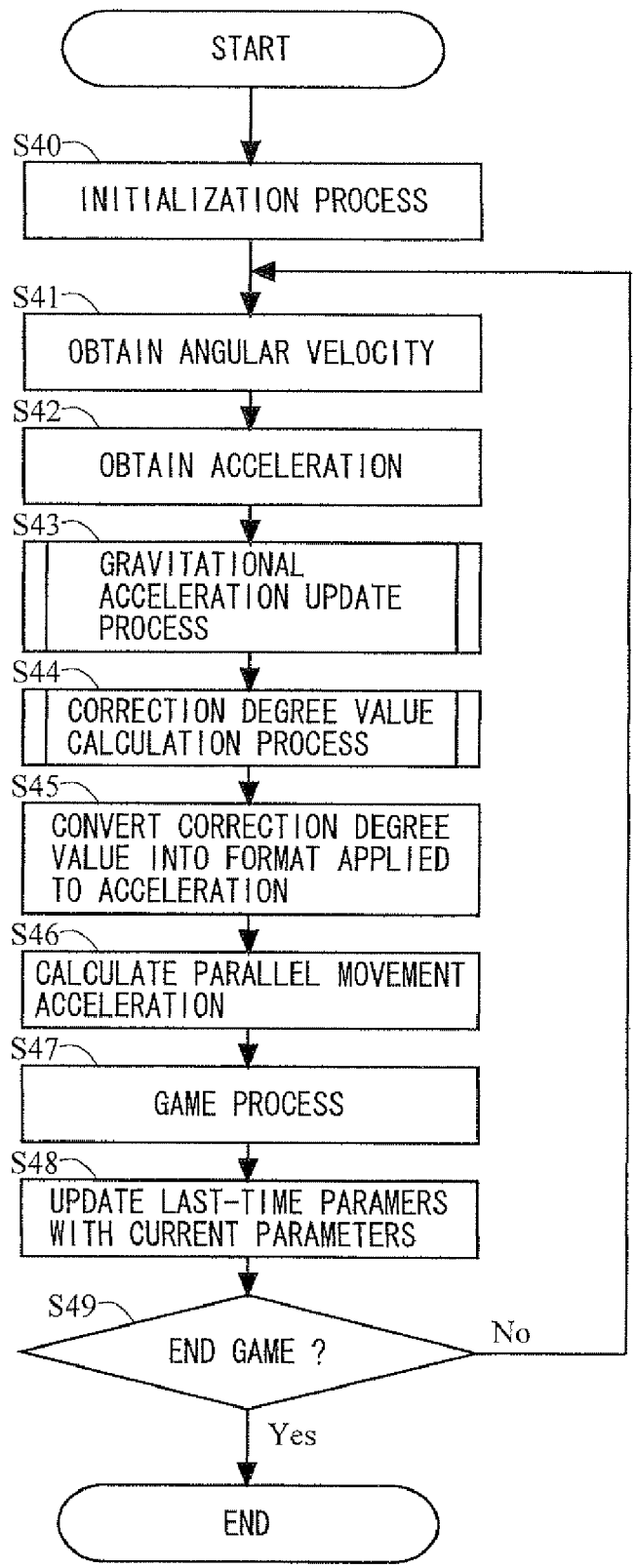
FIG. 12 is a flow chart showing an example of game processing according to the first embodiment, which is executed by the game apparatus body 5.
Figure 13:
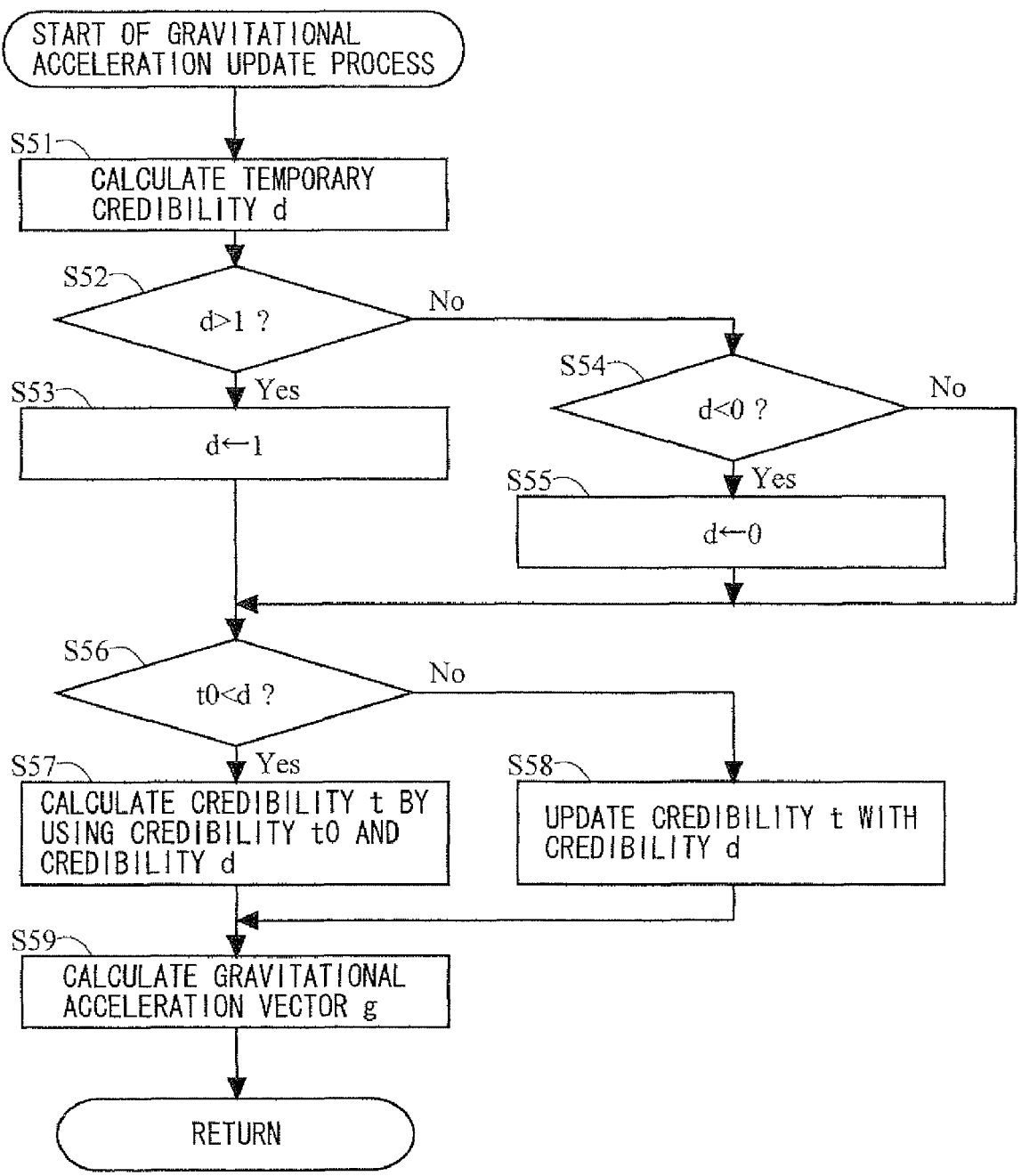
FIG. 13 is a flow chart of a subroutine showing an example of a gravitational acceleration update process at step 43 in FIG. 12.
Figure 14:
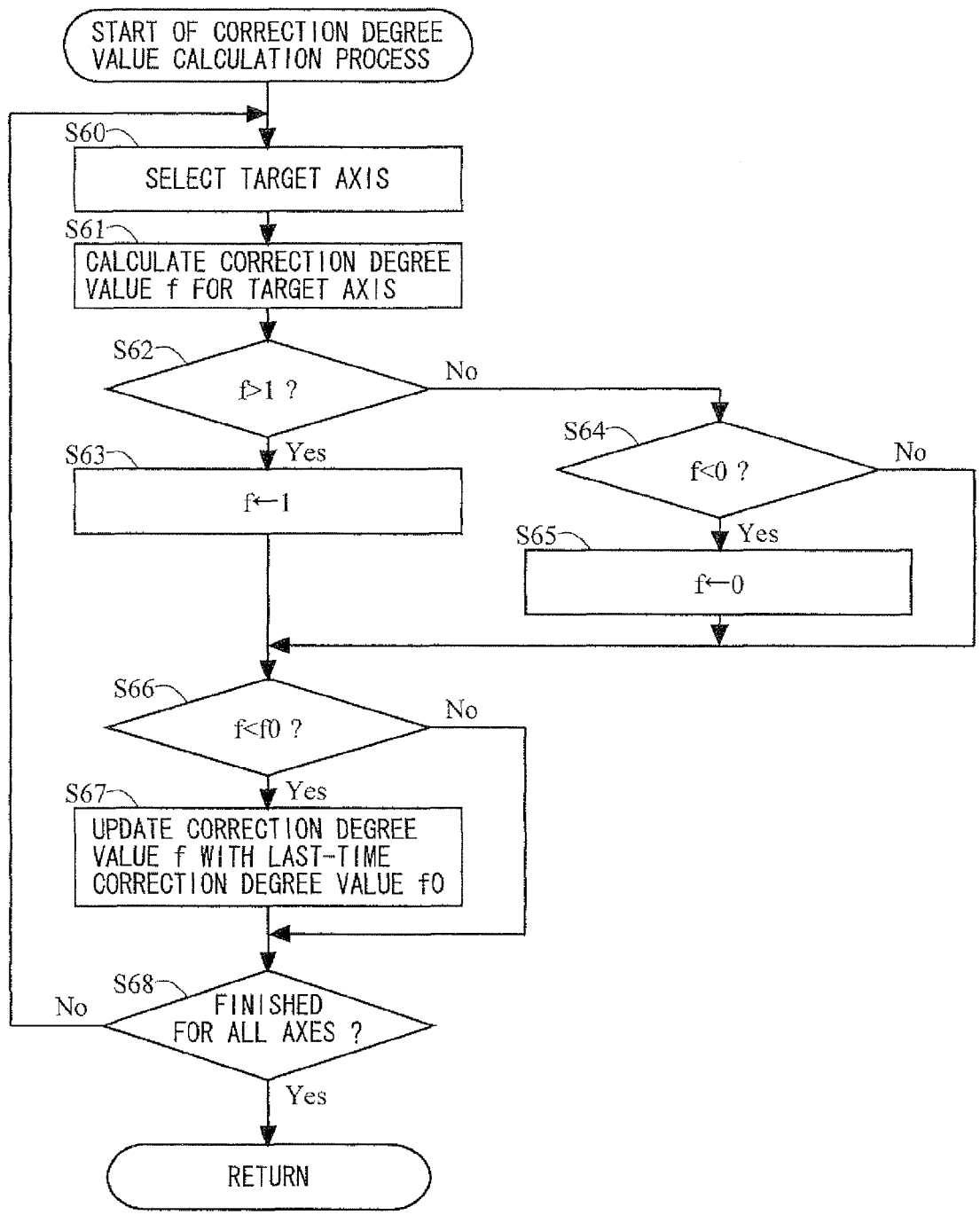
FIG. 14 is a flow chart of a subroutine showing an example of a correction degree value calculation process at step 44 in FIG. 12.

The following will describe in detail the game processing executed by the game apparatus body 5 with reference to FIGS. 12 to 14. FIG. 12 is a flow chart showing an example of the game processing according to the first embodiment, which is executed by the game apparatus body 5. FIG. 13 is a flow chart of a subroutine showing an example of a gravitational acceleration update process at step 43 in FIG. 12. FIG. 14 is a flow chart of a subroutine showing an example of a correction degree value calculation process at step 44 in FIG. 12. It is noted that among the game processing, an operation of correcting acceleration obtained from the controller 7 in accordance with the angular velocity data and an operation of inferring gravitational acceleration will be mainly described with reference to the flow charts shown in FIGS. 12 to 14, and other processes that are not directly relevant to the present invention will not be described in detail. In FIGS. 12 to 14, each step executed by the CPU 10 is abbreviated to "S".

When power is applied to the game apparatus body 5, the CPU 10 of the game apparatus body 5 executes the boot program stored in the ROM/RTC 13 to initialize each unit such as the main memory and the like. Then, the game program stored in the optical disc 4 is read by the main memory, and the CPU 10 starts to execute the game program. The flow charts shown in FIGS. 12 to 14 show the game processing that is executed after the completion of the above processing.

Referring to FIG. 12, the CPU 10 executes an initialization process of the game processing (step 40), and proceeds the processing to the next step. For example, in the initialization process at step 40, the CPU 10 executes initialization of each parameter for executing the game processing thereafter. Specifically, the CPU 10 sets, to initial values (e.g. 0), respectively, values indicated by the data, which are stored in the angular velocity data Da, the acceleration data Db, the last-time acceleration data Dc, temporary credibility data Dd, the credibility data De, the last-time credibility data Df, the gravitational acceleration data Dg, the last time gravitational acceleration data Dh, the correction degree value data Di, the last-time correction degree value data Dj, and the parallel movement acceleration data Dk.

Next, the CPU 10 obtains, from the input device 6, data indicative of angular velocities (step 41), and proceeds the processing to the next step. For example, the CPU 10 obtains operation information received from the input device 6 (controller 7), and stores, in the angular velocity data Da, angular velocities indicated by the latest angular velocity data included in the operation information. Specifically, the CPU 10 updates the X-axis angular velocity data Da1 with an angular velocity ωx indicated by X-axis angular velocity data included in the latest operation information received from the controller 7. The CPU 10 also updates the Y-axis angular velocity data Da2 with an angular velocity ωy indicated by Y-axis angular velocity data included in the latest operation information. Further, the CPU 10 updates the Z-axis angular velocity data Da3 with an angular velocity ωz indicated by Z-axis angular velocity data included in the latest operation information.

Next, the CPU 10 obtains, from the controller 7, data indicative of acceleration (step 42), and proceeds the processing to the next step. For example, the CPU 10 obtains operation information received from the controller 7, and stores, in the acceleration data Db, acceleration indicated by the latest acceleration data included in the operation information. Specifically, the CPU 10 updates the X-axis direction acceleration data Db1 with acceleration ax indicated by X-direction acceleration data included in the latest operation information received from the controller 7. The CPU 10 also updates the Y-axis direction acceleration data Db2 with acceleration ay indicated by Y-axis direction acceleration data included in the latest operation information. Further, the CPU 10 updates the Z-axis direction acceleration data Db3 with acceleration az indicated by Z-axis acceleration data included in the latest operation information.

Next, the CPU 10 executes a gravitational acceleration update process (step 43), and proceeds the processing to the next step. The following will describe the gravitational acceleration update process executed at step 43 with reference to FIG. 13.

Referring to FIG. 13, the CPU 10 calculates temporary credibility d, updates the temporary credibility data Dd with the calculated temporary credibility d (step 51), and proceeds the processing to the next step. Here, in the gravitational acceleration update process, a method is used in which when the difference between the acceleration currently applied to the controller 7 and the acceleration obtained in the last processing is equal to or smaller than a constant value, namely when the change amount of acceleration is equal to or smaller than a threshold value, the acceleration currently applied to the controller 7 is inferred to be the gravitational acceleration. The temporary credibility d is a parameter that, during calculation, is temporarily indicative of how much extent the acceleration currently applied to the controller 7 can be credited as the gravitational acceleration when the gravitational acceleration applied to the input device 6 (controller 7) is inferred. For example, when temporary credibility d=1, it indicates that the acceleration currently applied to the controller 7 is totally credible as the gravitational acceleration. On the other hand, when the temporary credibility d=0, it indicates that the acceleration currently applied to the controller 7 is not credible at all as the gravitational acceleration.

Specifically, the temporary credibility d is calculated by the following mathematical formula.

$$d=(|a-a0|-\text{admin})/(\text{admax}-\text{admin}) \quad (1)$$

Here, a denotes the magnitude of the acceleration currently applied to the controller 7, and is calculated by referring to the acceleration data Db; a0 denotes the magnitude of the acceleration used in the last processing, and is calculated by referring to the last-time acceleration data Dc; admax is a predetermined constant, which is a value that causes the acceleration currently applied to the controller 7 to be not credible at all as the gravitational acceleration when the difference between the acceleration magnitude a and the acceleration magnitude a0 is equal to or smaller than the constant admax, and admin is a predetermined constant, which is a value that causes the acceleration currently applied to the controller 7 to be totally credible as the gravitational acceleration when the difference between the acceleration magnitude a and the acceleration magnitude a0 is equal to or greater than the constant admin. As described above, according to the temporary credibility d calculated by using the above mathematical formula (1), the temporary credibility d approaches 1 when the change amount |a−a0| of acceleration is smaller, and hence the value of the temporary credibility d can indicate that the acceleration currently applied to the controller 7 is credible as the gravitational acceleration. On the other hand, the temporary credibility d approaches 0 when the change amount |a−a0| of acceleration is greater, and hence the value of the temporary credibility d can indicate that the acceleration currently applied to the controller 7 is not credible as the gravitational acceleration.

Next, the CPU 10 determines whether or not the temporary credibility d calculated at step 51 is greater than 1 (step 52). When the temporary credibility d is greater than X, the CPU 10 proceeds the processing to the next step 53. On the other hand, when the temporary credibility d is equal to or smaller than 1, the CPU 10 proceeds the processing to the next step 54.

At step 53, the CPU 10 sets the temporary credibility d to 1, updates the temporary credibility data Dd with the set temporary credibility d, and proceeds the processing to the next step 56. In other words, when the value of the temporary credibility d is greater than 1, the value is rounded down to 1.

On the other hand, when the temporary credibility d is equal to or smaller than 1, the CPU 10 determines at step 54 whether or not the temporary credibility d calculated at step 51 is smaller than 0. When the temporary credibility d is smaller than 0, the CPU 10 proceeds the processing to the next step 55. On the other hand, when the temporary credibility d is equal to or greater than 0, the CPU 10 proceeds the processing to the next step 56.

At step 55, the CPU 10 sets the temporary credibility d to 0, updates the temporary credibility data Dd with the set temporary credibility d, and proceeds the processing to the next step 56. In other words, when the value of the temporary credibility d is smaller than 0, the value is rounded up to 0.

At step 56, the CPU 10 refers to the last-time credibility data Df and determines whether or not the temporary credibility d calculated at step 51 is greater than credibility t0 calculated the last time. When the temporary credibility d is greater than the credibility t0 calculated the last time (i.e. t0<d), the CPU 10 proceeds the processing to the next step 57. On the other hand, when the temporary credibility d is equal to or smaller than the credibility t0 calculated the last time (i.e. d≦t0), the CPU 10 proceeds the processing to the next step 58.

At step 57, the CPU 10 calculates final credibility t by using the last-time credibility t0 indicated by the last-time credibility data Df and the temporary credibility d calculated at step 51, and proceeds the processing to the next step 59. Specifically, the CPU 10 calculates the final credibility t by using the following mathematical formula:

$$t=t0*(1-T)*d \quad (2),$$

and updates the credibility data De with the calculated credibility t. Here, T is a predetermined constant satisfying that 0<T<1. As is obvious from the above mathematical formula (2), the speed at which the credibility t is updated from the last-time credibility t0 can be adjusted in accordance with the magnitude of the constant T. The greater the constant T is, the slower the speed of change in the credibility t is.

On the other hand, at step 58, the CPU 10 updates the final credibility t with the temporary credibility d calculated at step 51, updates the credibility data De with the updated final credibility t, and proceeds the processing to the next step 59.

As is obvious from the processes at step 56 to step 58, when the temporary credibility d is lower (smaller) than the credibility to calculated the last time, the temporary credibility d is immediately reflected to the final credibility t. On the other hand, when the temporary credibility d is higher (greater) than the credibility to calculated the last time, the temporary credibility d is not immediately reflected to the final credibility t, and the speed of change in the final credibility t becomes slow. Here, according to the characteristics of the acceleration sensor provided in the controller 7, acceleration caused by inertia when a motion of the controller 7 is stopped changes so as to decrease gradually from the acceleration obtained the last time, and the difference of this acceleration does not become a great value. Thus, if the calculated temporary credibility d is immediately reflected to the final credibility t, the acceleration caused by the inertia may be handled as stable acceleration (gravitational acceleration). In order to avoid such false recognition, when the temporary credibility d changes so as to be higher than the credibility t0 calculated the last time, the final credibility t is updated so as to change gradually from the last-time credibility t0. On the other hand, when the temporary credibility d changes so as to be lower than the credibility t0 calculated the last-time, the temporary credibility d is immediately reflected to the credibility t.

At step 59, the CPU 10 calculates the gravitational acceleration based on the final credibility t indicated by the credibility data De, and ends the processing of this subroutine. For example, the CPU 10 calculates a gravitational acceleration vector g by using the credibility t stored in the credibility data De and the acceleration ax, ay, and az stored in the acceleration data Db, and updates the gravitational acceleration data Dg with the calculated gravitational acceleration vector g. Specifically, the gravitational acceleration vector g is calculated by normalizing, to the length (e.g. 1) of the gravitational force, a vector calculated by the following mathematical formula.

$$g = an*t + g0*(1-t) \quad (3)$$

Here, an is a vector obtained by normalizing (e.g. normalizing to a length of 1) an acceleration vector (ax, ay, az) currently generated in the controller 7. Further, g0 is a gravitational acceleration vector calculated in the last processing, namely, a gravitational acceleration vector g0 stored in the last-time gravitational acceleration data Dh. By the mathematical formula (3), the gravitational acceleration vector g becomes a vector obtained by linearly interpolating, at a rate of the credibility t, the current acceleration vector an and the gravitational acceleration vector g0 calculated the last time.

Referring back to FIG. 12, after the gravitational acceleration update process at step 43, the CPU 10 executes the correction degree value calculation process (step 44), and proceeds the processing to the next step. With reference to FIG. 14, the following will describe the correction degree value calculation process executed at step 44.

Referring to FIG. 14, the CPU 10 selects a target axis for calculating a correction degree value f, from X-axis, Y-axis Z-axis that are set with respect to the input device 6 (step 60). Then, the CPU 10 refers to the angular velocity data Da, calculates a correction degree value f for the target axis, updates the correction degree value data Di with the calculated correction degree value f (step 61), and proceeds the processing to the next step. Specifically, when the target axis is X-axis, a correction degree value fx is calculated by the following mathematical formula:

$$fx = (|\omega x| - F\min)/(F\max - F\min),$$

and the X-axis direction correction degree value data Di1 is updated with the calculated correction degree value fx. Here, $|\omega x|$ is the absolute value of an angular velocity $\omega x$ about X-axis that is currently generated in the input device 6, and obtained by referring to the angular velocity $\omega x$ stored in the angular velocity data Da1. Further, when the target axis is y-axis, a correction degree value fy is calculated by the following mathematical formula:

$$fy = (|\omega y| - F\min)/(F\max - F\min),$$

and the Y-axis direction correction degree value data Di2 is updated with the calculated correction degree value fy. Here, $|\omega y|$ is the absolute value of an angular velocity $\omega y$ about Y-axis that is currently generated in the input device 6, and obtained by referring to the angular velocity $\omega y$ stored in the angular velocity data Da2. Further, when the target axis is Z-axis, a correction degree value fz is calculated by the following mathematical formula:

$$fz = (|\omega z| - F\min)/(F\max - F\min),$$

and the Z-axis direction correction degree value data Di3 is updated with the calculated correction degree value fz. Here, $|\omega z|$ is the absolute value of an angular velocity $\omega z$ about Z-axis that is currently generated in the input device 6, and obtained by referring to the angular velocity $\omega z$ stored in the angular velocity data Da3. Here, Fmax is a predetermined constant, which is a value that causes the correction degree values fx, fy, and fz to be equal to or greater than 1 when the magnitudes of the angular velocities $\omega z$, $\omega y$, and $\omega z$ generated in the input device 6 are equal to or greater than the constant Fmax. Fmin is a predetermined constant, which is a value that causes the correction degree values fx, fy, and fz to be equal to or smaller than 0 when the magnitudes of the angular velocities $\omega z$, $\omega y$, and $\omega z$ generated in the input device 6 are equal to or smaller than the constant Fmax.

Next, the CPU 10 determines whether or not the correction degree value f calculated at step 61 is greater than 1 (step 62). Then, when the correction degree value f is greater than 1, the CPU 10 proceeds the processing to the next step 63. On the other hand, when the correction degree value f is equal to or smaller than 1, the CPU 10 proceeds the processing to the next step 64.

At step 63, the CPU 10 sets the correction degree value f for the currently selected target axis to 1, updates the corresponding correction degree value data Di with the set correction degree value f, and proceeds the processing to the next step 66. In other words, when the value of the correction degree value f is greater than 1, the value is rounded down to 1.

On the other hand, when the correction degree value f is equal to or smaller than 1, the CPU 10 determines at step 64 whether or not the correction degree value f calculated at step 61 is smaller than 0. Then, when the correction degree value f is smaller than 0, the CPU 10 proceeds the processing to the next step 65. On the other hand, when the correction degree value f is equal to or greater than 0, the CPU 10 proceeds the processing to the next step 66.

At step 65, the CPU 10 sets the correction degree value f for the currently selected target axis to 0, updates the corresponding correction degree value data Di with the set correction degree value f, and proceeds the processing to the next step 66. In other words, when the value of the correction degree value f is smaller than 0, the value is rounded up to 0.

As described above, the value of the correction degree value f approaches 1 when the magnitude of the angular velocity currently generated in the input device 6 is greater, and approaches 0 when the magnitude of the angular velocity is smaller. Thus, the correction degree value f can be used as a parameter indicative of the level of the magnitude of the angular velocity generated in the input device 6, by using a value of 0 to 1.

At step 66, the CPU 10 refers to the last-time correction degree value data Dj and determines whether or not the correction degree value f calculated through step 61 to step 65 is smaller than the correction degree value f0 calculated the last time for the same target axis. Then, when the correction degree value f is smaller than the correction degree value f0 calculated the last time (i.e. f<f0), the CPU 10 proceeds the processing to the next step 67. On the other hand, when the correction degree value f is equal to or greater than the correction degree value f0 calculated the last time (i.e. f0≦f), the CPU 10 proceeds the processing to the next step 68.

At step 67, the CPU 10 updates the correction degree value f by using the correction degree value f calculated at step 61 and the last-time correction degree value f0 for the same target axis that is indicated by the last-time correction degree value data Dj, and proceeds the processing to the step 68. Specifically, when the target axis is X-axis, the CPU 10 calculates the correction degree value fx by the following mathematical formula:

$$fx \leftarrow fx*S+(1-S)*f0x,$$

and updates the X-axis direction correction degree value data Di1 with the calculated correction degree value fx. Here, f0x is a correction degree value calculated the last time for an X-axis component, and obtained by referring to the X-axis direction correction degree value data Dj1. Further, S is a predetermined constant satisfying that 0<S<1. As is obvious from the above mathematical formula, the speed at which the correction degree value fx updated from the last-time correction degree value f0x can be adjusted in accordance with the magnitude of the constant S. The smaller the constant S is, the slower the speed of change in the correction degree value fx is. Further, when the target axis is Y-axis, the CPU 10 calculates the correction degree value fy by the following mathematical formula:

$$fy \leftarrow fy*S+(1-S)*f0y,$$

and updates the Y-axis direction correction degree value data Di2 with the calculated correction degree value fy. Here, f0y is a correction degree value calculated the last time for a Y-axis component, and obtained by referring to the Y-axis direction correction degree value data Dj2. Further, when the target axis is Z-axis, the CPU 10 calculates the correction degree value fz by the following mathematical formula:

$$fz \leftarrow fz*S+(1-S)*f0z,$$

and updates the Z-axis direction correction degree value data Di3 with the calculated correction degree value fz. Here, f0z is a correction degree value calculated the last time for a Z-axis component, and obtained by referring to the Z-axis direction correction degree value data Dj3.

Here, at step 67, the correction degree value f calculated at step 61 is changed so as to approach the last-time correction degree value f0 at a predetermined rate (i.e. a rate of (S:1−S)), and set as a final correction degree value f. Or, the last-time correction degree value f0 is changed so as to approach the correction degree value f, calculated at step 61, at a predetermined rate (i.e. a rate of (1−S:S)), and set as a final correction degree value f. It is noted that the magnitude, by which, at step 67, the correction degree value f is made to approach the last-time correction degree value f0 or the last-time correction degree value f0 is made to approach the correction degree value f, may not be calculated by the above predetermined rate. For example, the correction degree value f calculated at step 61 may be changed so as to approach the last-time correction degree value f0 by a predetermined amount (typically, a constant amount), and set as the final correction degree value f. Or, the last-time correction degree value f0 may be changed so as to approach the correction degree value f, calculated at step 61, by a predetermined amount (typically, a constant amount), and set as the final correction degree value f.

At step 68, the CPU 10 determines whether or not the calculation of the correction degree values f for all of X-axis, Y-axis, and Z-axis set with respect to the input device 6 has been finished. Then, when the calculation of the correction degree values f for all of X-axis, Y-axis, and Z-axis has been finished, the CPU 10 ends the processing of this subroutine. On the other hand, when there is any of X-axis/Y-axis, and Z-axis for which the calculation of the correction degree value f has not been finished yet, the CPU 10 returns to step 60 to repeat the processing.

As is obvious form the processes at step 61 to step 67, when the correction degree value f is equal to or greater than the correction degree value f0 calculated the last time, the correction degree value f calculated through step 61 to step 65 is used without change. On the other hand, when the correction degree value f is smaller than the correction degree value f0 calculated the last time, the correction degree value f calculated through step 61 to step 65 is not used without change, and the speed of change in the correction degree value f becomes slow. In other words, the speed at which the value of the correction degree value f decreases is suppressed as compared to that at which the value of the correction degree value f increases.

Referring back to FIG. 12, after the correction degree value calculation process at step 44, the CPU 10 converts the correction degree values f into a format value e that is a format applied to X-axis, Y-axis, and Z-axis components of an acceleration vector (step 45), and proceeds the processing to the next step. For example, the CPU 10 converts the correction degree values fx, fy, and fz into the format value e by using the following mathematical formula.

$$e=(fy+fz, fx+fz, fx+fy)$$

Then, the CPU 10 rounds each component value of the format value e within the range of 0 to 1. Specifically, when any of the component values of the format value e is greater than 1, the CPU 10 rounds the component value down to 1. Further, when any of the component values of the format value e is smaller than 0, the CPU 10 rounds the component value up to 0.

Here, each component value of the format value e will be described. For example, acceleration applied to the input device 6 in the Z-axis direction (see FIG. 3) includes acceleration generated by rotation of the input device 6 about axes perpendicular to Z-axis, namely, about X-axis and Y-axis. Thus, when acceleration generated by parallel movement of the input device 6, among the acceleration applied in the Z-axis direction, is desired to be obtained, the acceleration generated by the rotation of the input device 6 about X-axis and Y-axis needs to be subtracted from the acceleration applied in the Z-axis direction.

The third component value of the format value e is a component value regarding Z-axis, and calculated by (fx+fy). Here, the correction degree value fx is a parameter whose value becomes greater when the magnitude of an angular velocity about X-axis that is currently generated in the input device 6 is greater. Further, the correction degree value fy is a parameter whose value becomes greater when the magnitude of an angular velocity about Y-axis that is currently generated in the input device 6 is greater. Specifically, the greater the angular velocities about X-axis and Y-axis are, the greater the component value of the format value e regarding Z-axis is. In other words, the third component value becomes a parameter whose value becomes greater when the acceleration generated by the rotation of the input device 6 about X-axis and Y-axis is greater. Thus, the component value of the format value e regarding Z-axis can be used as a parameter when the acceleration generated by the rotation of the input device 6 is subtracted from the acceleration applied to the input device 6 in the Z-axis direction.

Similarly, the first component value of the format value e is a component value regarding X-axis that is calculated by (fy+fz), and becomes a parameter whose value becomes greater when acceleration generated by rotation of the input device 6 about Y-axis and Z-axis is greater. Thus, the component value of the format value e regarding X-axis can be used as a parameter when the acceleration generated by the rotation of the input device 6 is subtracted from acceleration applied to the input device 6 in the X-axis direction. Further, the second component value of the format value e is a component value regarding Y-axis that is calculated by (fx+fz), and becomes a parameter whose value becomes greater when acceleration generated by rotation of the input device 6 about X-axis and Z-axis is greater. Thus, the component value of the format value e regarding Y-axis can be used as a parameter when the acceleration generated by the rotation of the input device 6 is subtracted from acceleration applied to the input device 6 in the Y-axis direction.

Next, the CPU 10 calculates parallel movement acceleration by using the format value e converted at step 45 (step 46), and proceeds the processing to the next step. For example, the CPU 10 calculates a parallel movement acceleration vector p indicative of parallel movement acceleration, by using the acceleration ax, ay, and az indicated by the acceleration data Db, the gravitational acceleration vector g indicated by the gravitational acceleration data Dg, and the format value e, and updates the parallel movement acceleration data Dk with data indicative of the parallel movement acceleration vector p. Specifically, the parallel movement acceleration vector p is calculated by the following mathematical formula.

$$p=(a-g)mul(1-e) \quad (4)$$

Here, a denotes an acceleration vector currently applied to the input device 6; g denotes a gravitational acceleration vector inferred to be currently applied to the input device 6; e denotes the format value calculated at step 45; and mul denotes multiplication for each of X-axis, Y-axis, and Z-axis components. Thus, when the X-axis, Y-axis, and Z-axis components of the parallel movement acceleration vector p are represented as (px, py, pz), the X-axis, Y-axis, and Z-axis components of the gravitational acceleration vector g are represented as (gx, gy, gz) and the X-axis, Y-axis, and Z-axis components of the format value e are represented as (ex, ey, ez), the above mathematical formula (4) is represented as the following mathematical formula of each of the X-axis, Y-axis, and Z-axis components.

$$px=(ax-gx)*(1-ex)$$

$$py=(ay-gy)*(1-ey)$$

$$pz=(az-gz)*(1-ez)$$

As described above, the parallel movement acceleration vector p is obtained by: calculating acceleration, from which the gravitational acceleration is excluded, by subtracting the gravitational acceleration from the acceleration currently applied to the input device 6; multiplying the calculated acceleration by (1−e). Here, as described above, each of the X-axis, Y-axis, and Z-axis component values of the format value e is a parameter that is indicative of the magnitude of an angular velocity influencing acceleration applied in each axial direction, is set in the range of 0 to 1, and is a parameter that approaches 1 when the angular velocity is greater. Thus, the multiplied (1−e) becomes a value in the rage of 0 to 1, which approaches 0 when the angular velocity influencing the acceleration applied in each axial direction is greater. In other words, by multiplying the acceleration, from which the gravitational acceleration has been subtracted, by (1−e), the parallel movement acceleration vector p becomes a parameter, in which the gravitational acceleration and the acceleration generated by the rotation of the input device 6 are subtracted from the acceleration currently applied to the input device 6. Thus, the parallel movement acceleration vector p can be used as a vector indicative of acceleration generated by parallel movement of the input device 6.

Next, the CPU 10 executes a game process by using the parallel movement acceleration vector p indicated by the parallel movement acceleration data Dk and the angular velocities ωx, ωy, and ωz indicated by the angular velocity data Da (step 47), and proceeds the processing to the next step. For example, the CPU 10 controls motion of the player character PC by using the parallel movement acceleration vector p and the angular velocities ωx, ωy, and ωz.

Specifically, when the parallel movement acceleration vector p has a magnitude equal to or greater than a predetermined value and has a direction upward from the input device 6, the CPU 10 causes the player character PC to jump in accordance with the magnitude of the parallel movement acceleration vector p (see FIG. 9). The direction of the parallel movement acceleration vector p in the real space may be calculated by any method. In one example, the direction (the direction of the gravitational acceleration vector g) of the currently generated gravitational acceleration is regarded as the vertical direction in the real space, and the direction of the parallel movement acceleration vector p in the real space is calculated by using the vertical direction as a reference. In another example, the direction of the parallel movement acceleration vector p in the real space is calculated by using the orientation of the input device 6 as a reference, as described later.

Further, the CPU 10 calculates a movement direction of the player character PC in accordance with the orientation of the input device 6. For example, when the angular velocities ωx, ωy, and ωz indicates that the input device 6 is inclined leftward or rightward, the CPU 10 causes the player character PC to turn in the direction, in which the input device 6 is inclined, in accordance with the orientation (e.g. an inclination angle) of the input device 6 (see FIG. 10). In addition, when the angular velocities ωx, ωy, and ωz indicates that the input device 6 is maintained horizontally, the CPU 10 causes the player character PC to move straight (see FIG. 8). The orientation (angle) of the input device 6 can be calculated by using the angular velocities ωx, ωy, and ωz, and the method for calculating the orientation (angle) of the input device 6 from the angular velocities ωx, ωy, and ωz may be any method. For example, there is a method in which the angular velocities ωx, ωy, and ωz (per unit time) are sequentially added to an initial orientation of the input device 6. In other words, the current orientation of the input device 6 can be calculated by integrating the angular velocities ωx, ωy, and ωz outputted sequentially from the gyro-sensors 95 and 96; and calculating, from the integration result, the change amount (change amount of angle) in orientation from the initial orientation.

Next, the CPU 10 updates the last-time parameters with the parameters calculated by the processes at step 41 to step 47 (step 48), and proceeds the processing to the next step. Specifically, the CPU 10 updates the acceleration a0x, a0y, and a0z with the acceleration ax, ay, and az indicated by the acceleration data Db, respectively, and updates the last-time acceleration data Dc with the updated acceleration a0x, a0y, and a0z. The CPU 10 updates the last-time credibility to with the credibility t indicated by the credibility data De, and updates the last-time credibility data Df with the updated credibility t0. The CPU 10 updates the last-time gravitational acceleration vector g0 with the gravitational acceleration vector g indicated by the gravitational acceleration data Dg, and updates the last-time gravitational acceleration data Dh with the updated gravitational acceleration vector g0. Then, the CPU 10 updates the last-time correction degree values f0x, f0y, f0z with the correction degree values fx, fy, and fz indicated by the correction degree value data Di, respectively, and updates the last-time correction degree value data Dj with the updated correction degree values f0x, f0y, f0z.

Next, the CPU 10 determines whether or not to end the game (step 49). The game is to be ended, for example, when conditions to make the game over are satisfied, or when the player has performed an operation for ending the game. When not ending the game, the CPU 10 returns to step 41 to repeat the processing. On the other hand, when ending the game, the CPU 10 ends the processing of the flow chart.

As described above, according to the game processing of the first embodiment, for determining orientation and motion of the input device 6 by using the acceleration applied in each of the three axial directions, the rotation of the input device 6 is determined by using the angular velocity generated in the input device 6, and the acceleration generated when the input device 6 is moved in parallel is obtained. Whereby, in the game processing, the acceleration obtained by the parallel movement of the input device 6 can be determined instantaneously. Therefore, in the game processing, parallel movement of the input device 6, such as lifting the entire input device 6 and pushing the entire input device 6 forward, can be accurately recognized by using the acceleration obtained from the input device 6.

Second Embodiment

The following will describe an information processing apparatus executing an information processing program according to a second embodiment. A game system including a stationery game apparatus body 5, which is an example of an information processing apparatus according to the second embodiment, differs in the configuration of the input device 6 from that of the first embodiment, and is the same in the other configuration as that of the first embodiment. Thus, the same components as those in the first embodiment are designated by the same reference characters, and the detailed description thereof will be omitted.

Figure 15:
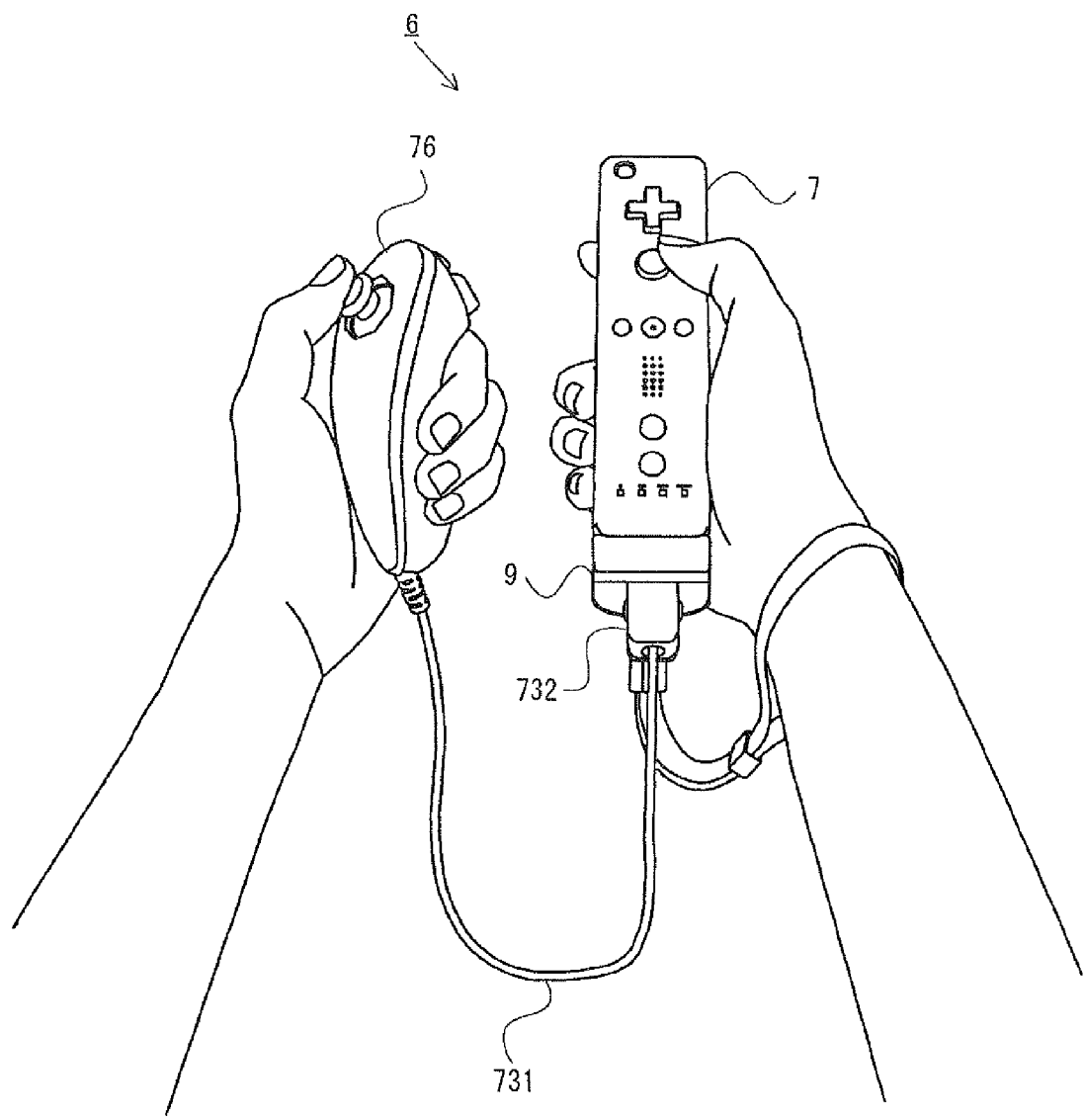
FIG. 15 is an external view of an input device 6 used in a second embodiment, showing an example where a player operates the input device 6.

With reference to FIG. 15, a configuration of an input device 6 used in the second embodiment will be described. FIG. 15 is an external view of the input device 6 used in the second embodiments showing an example where a player operates the input device 6.

Referring to FIG. 15, the input device 6 further includes a subunit 76. The subunit 76 is capable of being held with one hand, and is connected to an angular velocity detection unit 9 (controller 7) via a connection cable 731. A connector 732 is provided at an end of the connection cable 731 extending from the rear end of a subunit 76, and is connected to a connector 97 provided at the rear end of the angular velocity detection unit 9. By connecting the connector 732 to the connector 97, the subunit 76 is physically and electrically connected to the angular velocity detection unit 9 (controller 7).

Input data of the subunit 76 is provided to the controller 7 via the connection cable 731 and the angular velocity detection unit 9. The controller 7 transmits, to the game apparatus body 5, operation data including: input data of the controller 7; angular velocity data from the angular velocity detection unit 9; and the input data of the subunit 76. In this occasion, the above operation data may be transmitted at a time. However, when a data amount to be transmitted at a time is limited, both the angular velocity data of the angular velocity detection unit 9 and the input data from the subunit 76 can be transmitted by the angular velocity detection unit 9 outputting alternately, to the controller 7, the angular velocity data of the angular velocity detection unit 9 and the input data from the subunit 76. This data transmission control is performed by the angular velocity detection unit 9, and hence there is no need to change the design of the controller 7 and the subunit 76 because of the installation of the angular velocity detection unit 9.

Figure 16:
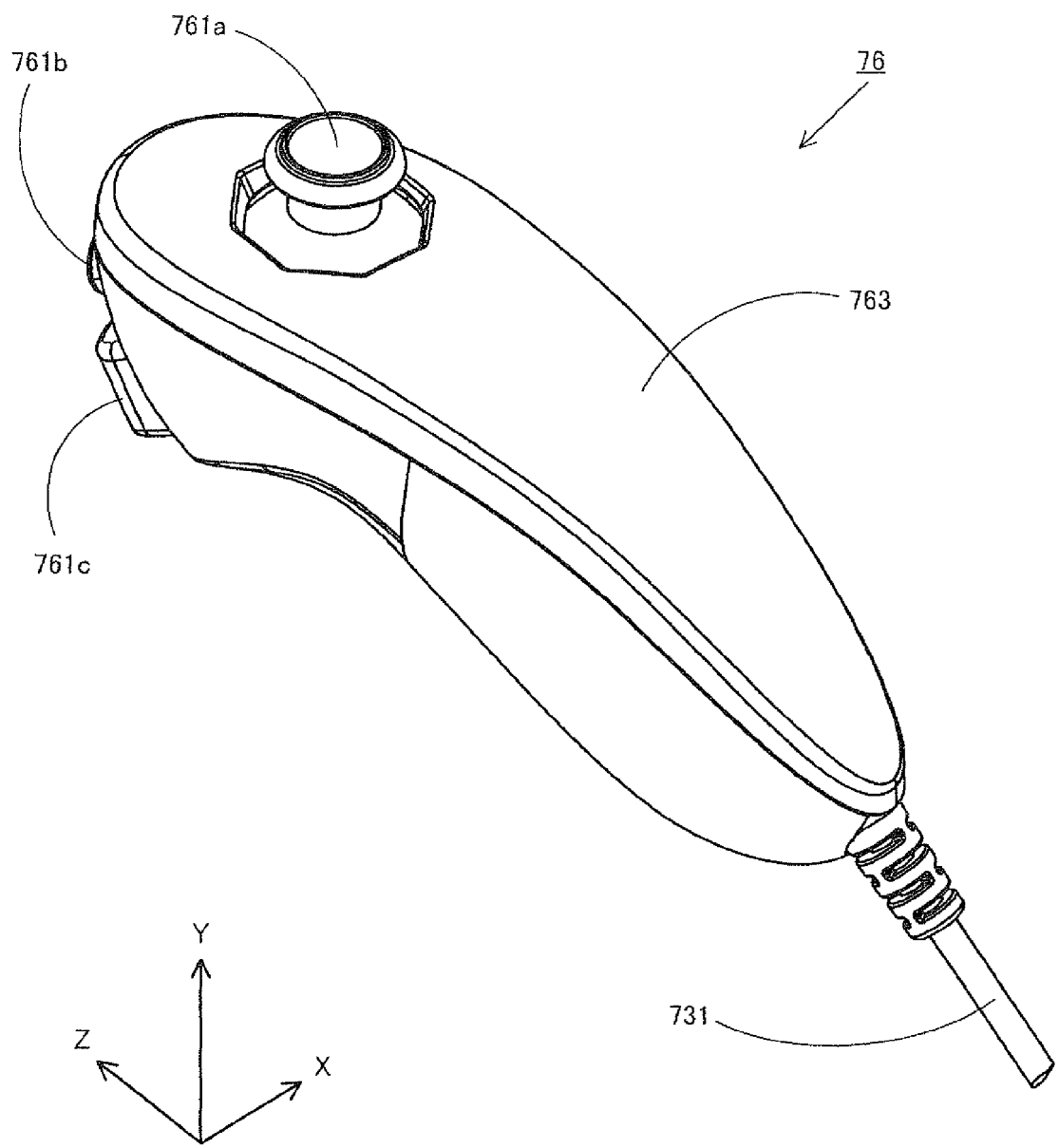
FIG. 16 is a perspective view showing an example of a subunit 76 in FIG. 15.
Figure 17:
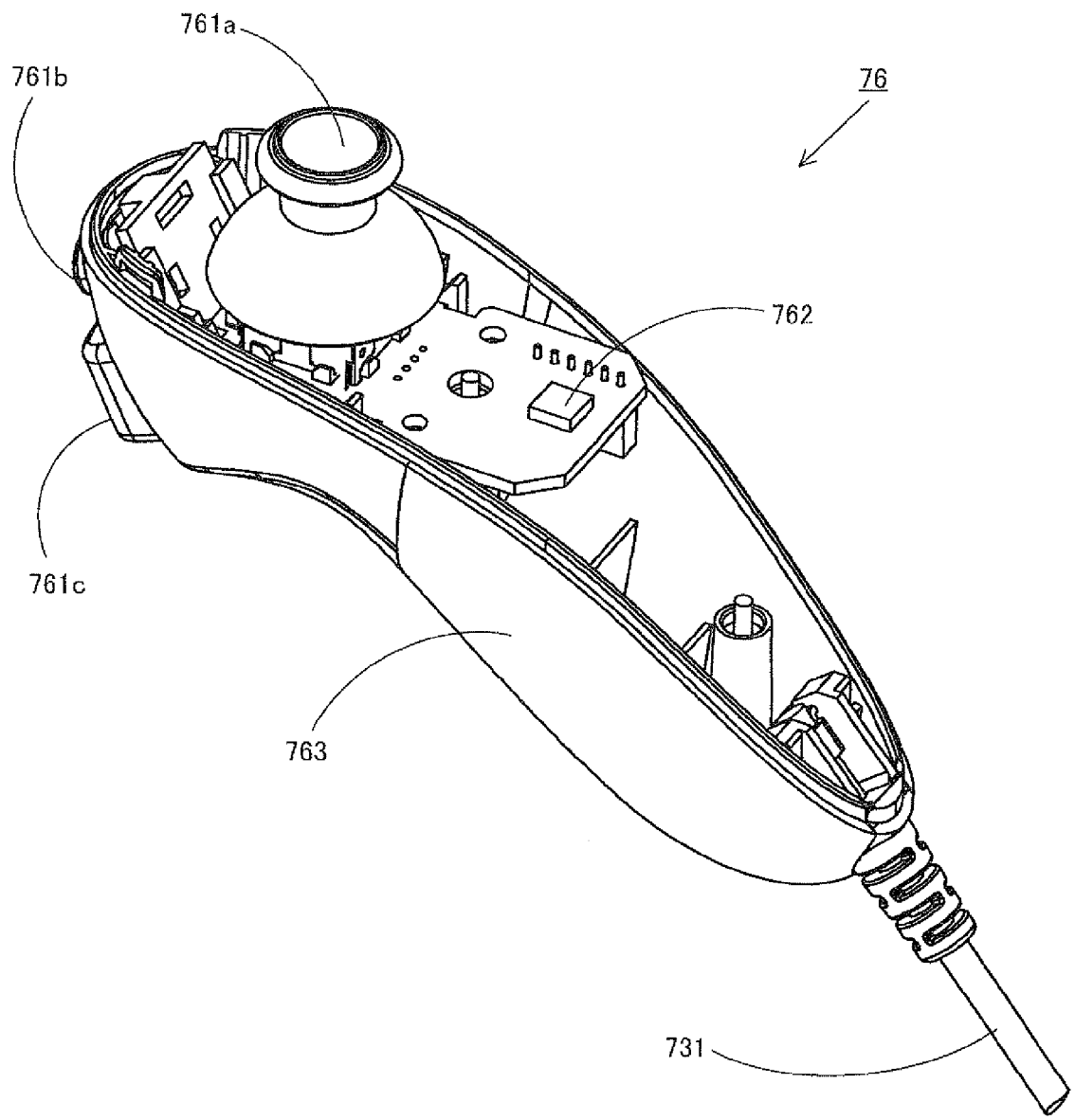
FIG. 17 is a perspective view of the subunit 76 in FIG. 15 in a state where an upper housing thereof is removed.

With reference to FIGS. 16 and 17, the subunit 76 will be described. FIG. 16 is a perspective view showing an example of the subunit 76. FIG. 17 is a perspective view of the subunit 76 in FIG. 16 in a state where an upper housing (a part of a housing 763) thereof is removed;

Referring to FIG. 16, the subunit 76 includes the housing 763 that is formed, for example, by plastic molding. The housing 763 extends in a longitudinal direction from front to rear, and has a streamline solid shape including a head that is a widest portion in the subunit 76. The overall size of the subunit 76 is small enough to be held by one hand of an adult or even a child.

On the top surface of the housing 763 and in the vicinity of the widest portion, the stick 761a is provided. The stick 761a is an operation section that includes an inclinable stick projecting from the top surface of the housing 763, and outputs an operation signal in accordance with the inclining direction by inclining the stick. For example, the player can optionally designate a direction and a position by inclining a stick tip in a direction of 0 to 360 degrees, thereby performing an instruction of a direction in which a player character or the like appearing in a virtual game world is to move, or performing an instruction of a direction in which a cursor is to move.

On the front surface of the housing 763 of the subunit 76, two operation buttons 761b and 761c are provided. The operation buttons 761b and 761c are each an operation section for, when the player presses ahead thereof, outputting a corresponding operation signal. For example, functions of an X button and a Y button are assigned to the operation buttons 761b and 761c, respectively. The operation buttons 761b and 761c are assigned with functions in accordance with a game program executed by the game apparatus body 5, but this will not be described in detail because the functions are not directly relevant to the present invention. In the exemplary arrangement shown in FIG. 16, the operation buttons 761b and 761c are arranged on the front surface of the housing 763 in a line in the up-down direction. When the operation sections (the stick 761a, and the operation buttons 761b and 761c) provided in the subunit 76 are described collectively, they may be described as the operation section 761 below.

Here, in order to give a specific description, a coordinate system set with respect to the subunit 76 will be defined. As shown in FIG. 16, mutually perpendicular X-axis, Y-axis, and Z-axis are defined with respect to the subunit 76. Specifically, the longitudinal direction of the housing 763 or the front-rear direction of the subunit 76 corresponds to Z-axis, and the direction toward the front surface of the subunit 76 (the surface on which the operation buttons 761b and 761c are provided) is a positive direction of Z-axis. The up-down direction of the subunit 76 corresponds to Y-axis, and the direction toward the top surface of the housing 763 (the direction in which the stick 761a projects) is a positive direction of Y-axis. The left-right direction of the subunit 76 corresponds to X-axis, and the direction toward the right side surface of the housing 763 (the side surface which is not shown in FIG. 16) is a positive direction of X-axis.

Referring to FIG. 17, a substrate is fixed inside the housing 763. On a top main surface of the substrate, the stick 761a, an acceleration sensor 762, and the like are provided. These components are connected to the connection cable 762 by lines (not shown) formed on the substrate and the like. Similarly to the controller 7, the subunit 76 preferably includes a three-axis acceleration sensor 762 that detects acceleration generated in the subunit 76 in the X-axis, Y-axis, and Z-axis directions. The acceleration sensor 762 has the same function and configuration as that of the acceleration sensor 701, and hence the detailed description thereof will be omitted.

Figure 18:
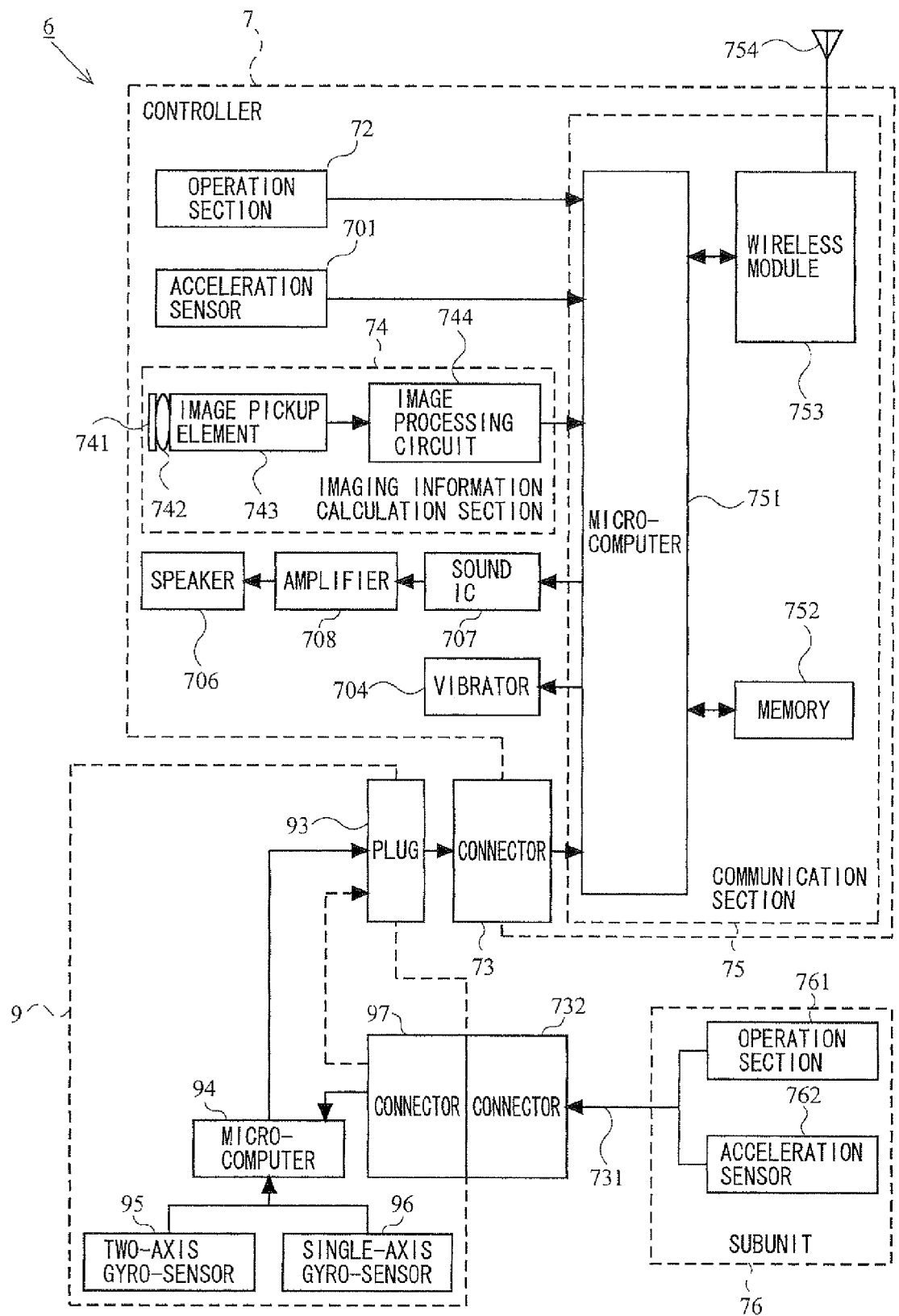
FIG. 18 is a block diagram showing an exemplary configuration of the input device 6 according to the second embodiment.

With reference to FIG. 18, the following will describe an internal configuration of the input device 6 according to the second embodiment. FIG. 18 is a block diagram showing an exemplary configuration of the input device 6 according to the second embodiment. Hereinafter, the angular velocity detection unit 9 and the subunit 76, which are the major different points from the first embodiment described with reference to FIG. 7, will be described mainly.

The connector 732 of the connection cable 731 extending from the subunit 76 is connected to the connector 97 of the angular velocity detection unit 9. The operation section 761 and the acceleration sensor 762 of the subunit 76 are connected to the connector 732. When the operation section 761 is operated, data indicative of contents of an operation performed with respect to the operation section 761 is provided to a microcomputer 94 of the angular velocity detection unit 9 via the connection cable 731, the connector 732, and the connector 97. The microcomputer 94 outputs the data, indicative of contents of an operation performed with respect to the operation section 761, to a communication section 75 via a plug 93 and the connector 73. In addition, the acceleration sensor 762 has the same sampling period as that of the acceleration sensor 701, and data indicative of acceleration detected by the acceleration sensor 762 is provided to the microcomputer 94 of the angular velocity detection unit 9 via the connection cable 731, the connector 732, and the connector 97. Then, the microcomputer 94 outputs the data, indicative of acceleration detected by the acceleration sensor 762, to the communication section 75 via the plug 93 and the connector 73.

Figure 19:
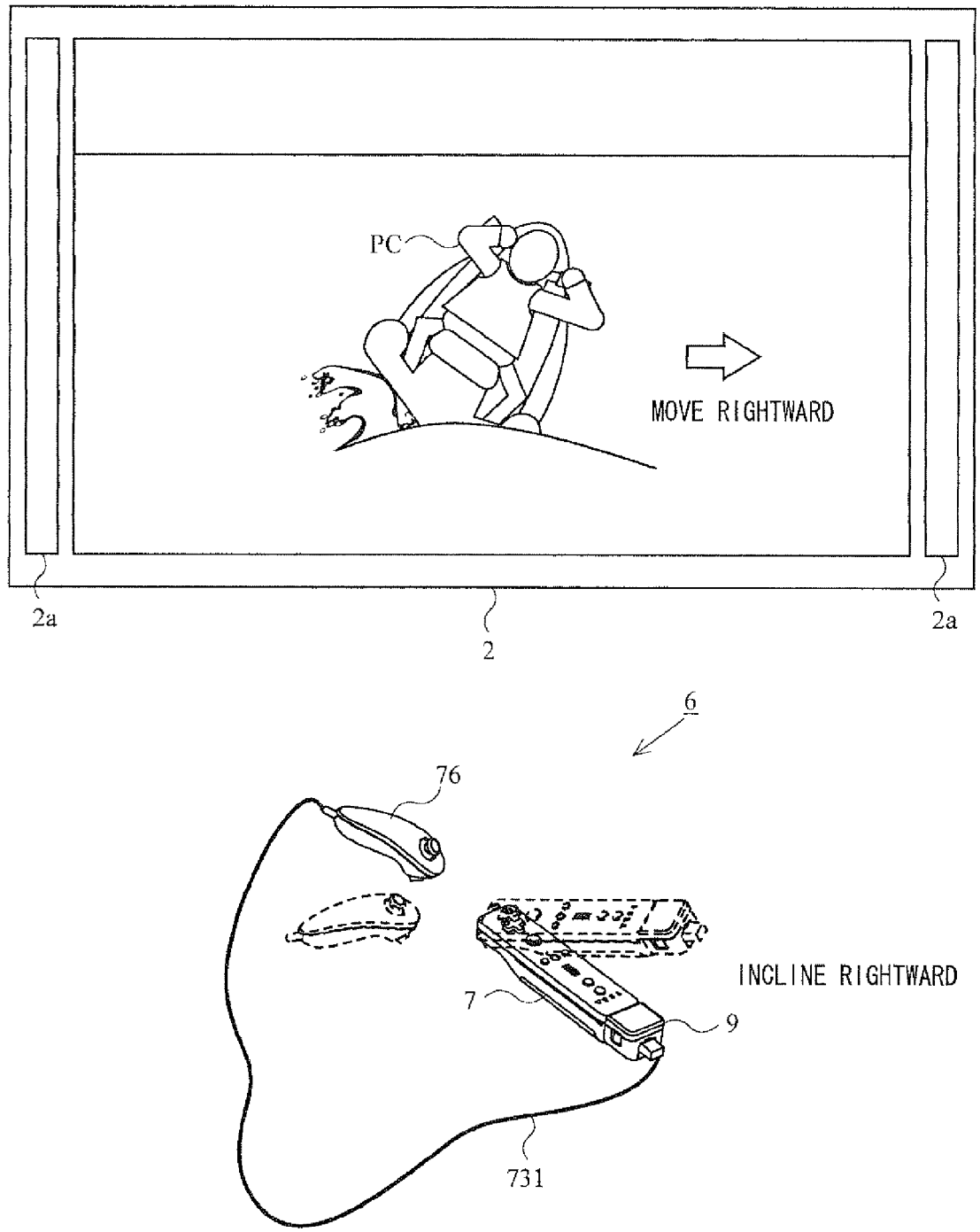
FIG. 19 shows an example of a game screen displayed on a monitor 2 when the input device 6 to which the subunit 76 is connected is operated so as to be inclined rightward.
Figure 20:
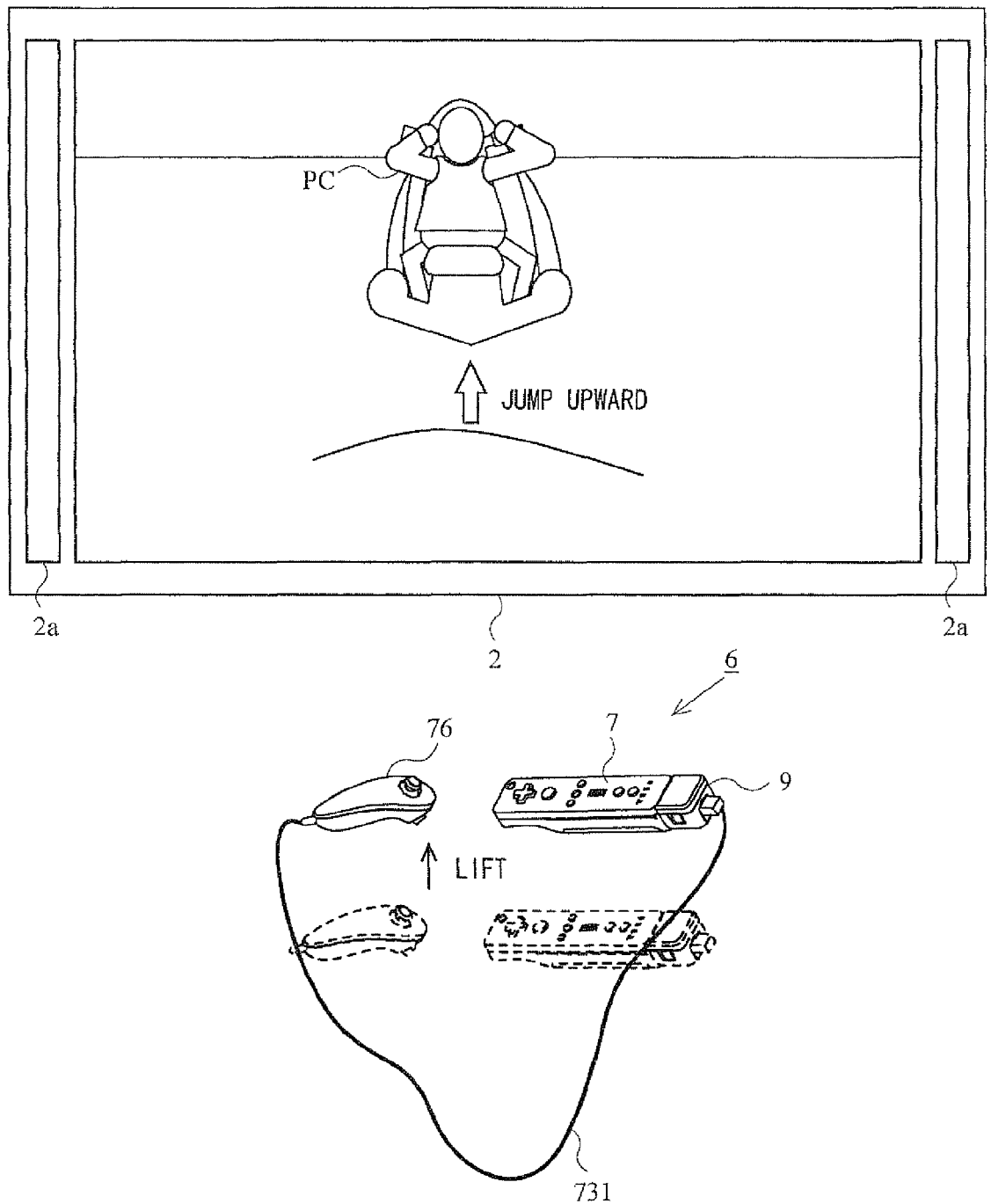
FIG. 20 shows an example of a game screen displayed on the monitor 2 when the input device 6 to which the subunit 76 is connected is operated so as to be moved in parallel upward.

With reference to FIGS. 19 and 20, the following will describe an outline of processing executed by the game apparatus body 5, prior to detailed description of the processing executed by the game apparatus body 5. FIG. 19 shows an example of a game screen displayed on a monitor 2 when the input device 6 to which the subunit 76 is connected is operated so as to be inclined rightward. FIG. 20 shows an example of a game screen displayed on the monitor 2 when the input device 6 to which the subunit 76 is connected is operated so as to be moved in parallel upward.

In FIGS. 19 and 20, a player character PC operating a personal watercraft (wet bike) in a virtual game space is displayed on the monitor 2. Here, the personal watercraft is a small craft that is operated by an operator and runs on the surface of water. Regarding the personal watercraft in the virtual game space shown in FIGS. 19 and 20, the personal watercraft operated by the player character PC can be caused to turn or jump by the player, who operates the input device 6, inclining or moving the input device 6 (the controller 7 and the subunit 76) in the same direction. Typically, the player holds the controller 7 with his or her right hand and the subunit 76 with his or her left hand, and operates them as if the player operated the handlebar of a personal watercraft with both hands.

Specifically, as shown in FIG. 19, when the player operates the controller 7 and the subunit 76 so as to incline the controller 7 and the subunit 76 rightward, the player character PC operates the personal watercraft so as to turn rightward on the water surface in the virtual game space. As shown in FIG. 20, when the player operates the controller 7 and the subunit 76 so as to move the controller 7 and the subunit 76 in parallel upward, the player character PC operates the personal watercraft so as to jump upward from the water surface in the virtual game space.

Figure 21:
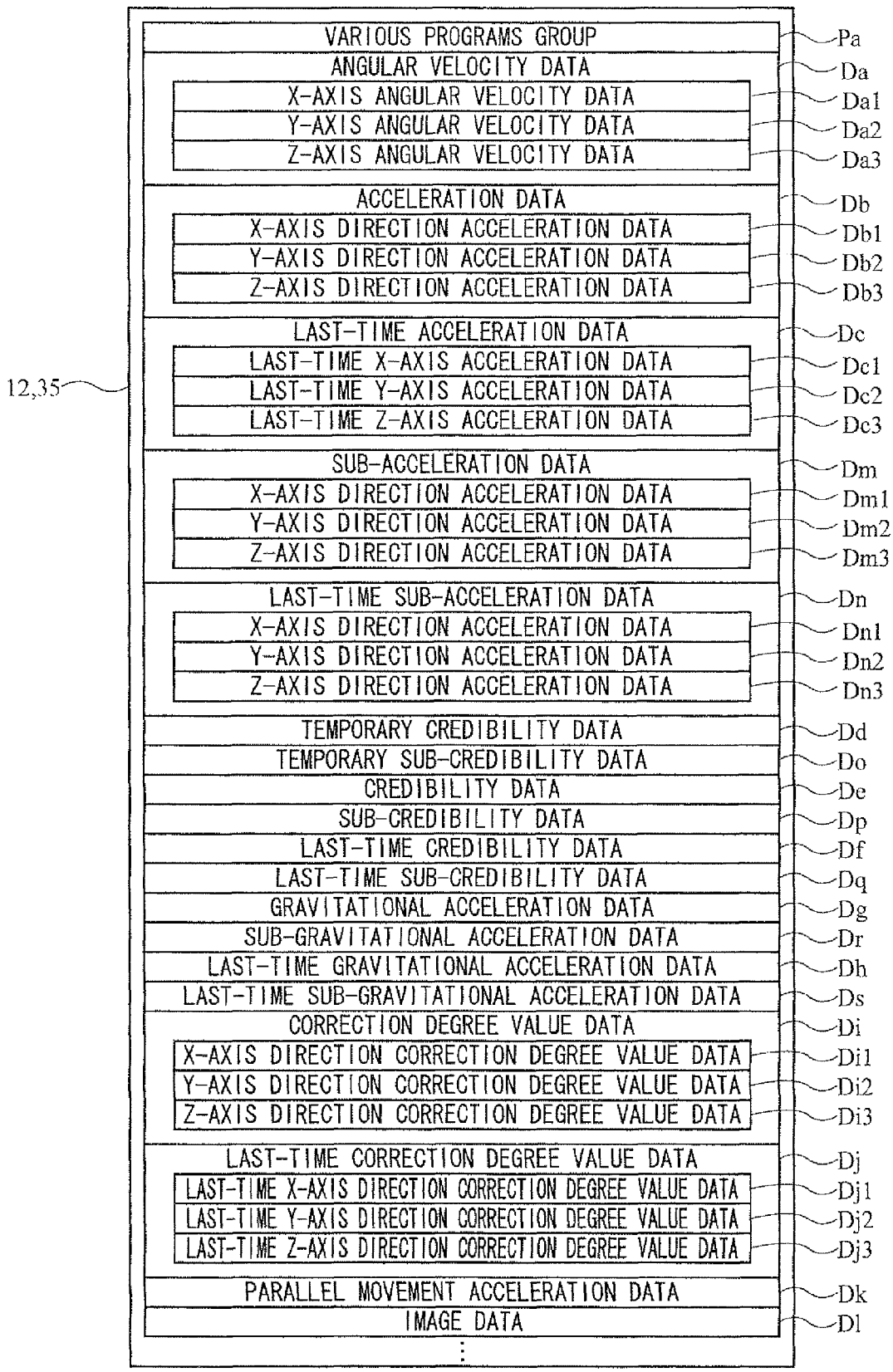
FIG. 21 shows an example of main data and programs that are stored in a main memory of a game apparatus body 5 in the second embodiment.

The following will describe in detail game processing executed in the game system 1. First, main data used in the game processing will be described with reference to FIG. 21. FIG. 21 shows an example of main data and programs that are stored in a main memory of the game apparatus body 5.

As shown in FIG. 21, in a data storage region of the main memory, sub-acceleration data Dm, last-time sub-acceleration data Dn, temporary sub-credibility data Do, sub-credibility data Dp, last-time sub-credibility data Dq, sub-gravitational acceleration data Dr, last-time sub-gravitational acceleration data Ds, and the like are stored in addition to angular velocity data Da, acceleration data Db, last-time acceleration data Dc, temporary credibility data Dd, credibility data De, last-time credibility data Df, gravitational acceleration data Dg, last-time gravitational acceleration data Dh, correction degree value data Di, last-time correction degree value data Dj, parallel movement acceleration data Dk, and image data Dl. In addition to the data shown in FIG. 21, data required for the game processing, such as image data of various objects appearing in a game and data indicative of various parameters of the objects, is stored in the main memory. Further, a various programs group Pa constituting the game program is stored in a program storage region of the main memory. At an appropriate timing after the power is applied to the game apparatus body 5, the various programs group Pa is partially or entirely read from an optical disc 4 or another storage medium and stored in the main memory.

The angular velocity data Da, the acceleration data Db, the last-time acceleration data Dc, the temporary credibility data Dd, the credibility data De, the last-time credibility data Df, the gravitational acceleration data Dg, the last-time gravitational acceleration data Dh, the correction degree value data Di, the last time correction degree value data Dj, the parallel movement acceleration data Dk, and the image data Dl, which are stored in the data storage region of the main memory, are the same as those described in the first embodiment. Thus, the detailed description thereof will be omitted. The following will describe the sub-acceleration data Dm, the last-time sub-acceleration data Dn, the temporary sub-credibility data Do, the sub-credibility data Dp, the last-time sub-credibility data Dq, the sub-gravitational acceleration data Dr, and the last-time sub-gravitational acceleration data Ds, which are added in the second embodiment.

The sub-acceleration data Dm is data indicative of acceleration generated in the subunit 76, and acceleration data (sub-acceleration data) included in a series of pieces of operation information transmitted as transmission data from the subunit 76 via the controller 7 is stored therein. The sub-acceleration data Dm includes X-axis direction acceleration data Dm1 indicative of acceleration asx detected by the acceleration sensor 762 with respect to an X-axis component, Y-axis direction acceleration data Dm2 indicative of acceleration asy detected by the acceleration sensor 762 with respect to a Y-axis component, and Z-axis direction acceleration data Dm3 indicative of acceleration asz detected by the acceleration sensor 762 with respect to a Z-axis component. The cycle of updating the sub-acceleration data Dm is the same as that of updating the above acceleration data Db, and hence the detailed description thereof will be omitted.

In the last-time sub-acceleration data Dn, the sub-acceleration data used in the last processing is stored. Specifically, the last-time sub-acceleration data Dn includes X-axis direction acceleration data Dn1 indicative of acceleration as0x of an X-axis component of the subunit 76, which is used in the last processing; Y-axis direction acceleration data Dn2 indicative of acceleration as0y of a Y-axis component of the subunit 76, which is used in the last processing; and Z-axis direction acceleration data Dn3 indicative of acceleration as0z of a Z-axis component of the subunit 76, which is used in the last processing.

In the temporary sub-credibility data Do, data (temporary sub-credibility ds) indicative of whether or not acceleration applied to the subunit 76 is credible as the gravitational acceleration when gravitational acceleration applied to the subunit 76 is inferred, is stored. In the sub-credibility data Dp, final credibility (sub-credibility ts) indicative of whether or not the acceleration applied to the subunit 76 is credible as the gravitational acceleration, is stored. In the last-time sub-credibility data Dq, data indicative of the final credibility (sub-credibility ts0) used in the last processing is stored.

In the sub-gravitational acceleration data Dr, data indicative of gravitational acceleration inferred to be applied to the subunit 76 is stored. Specifically, data indicative of a sub-gravitational acceleration vector gs indicating the magnitude and the direction of the gravitational acceleration inferred to be applied to the subunit 76, is stored in the sub-gravitational acceleration data Dr. In the last-time sub-gravitational acceleration data Ds, data indicative of a gravitational acceleration vector (sub-gravitational acceleration vector gs0) inferred to be applied to the subunit 76 in the last processing is stored.

Figure 22:
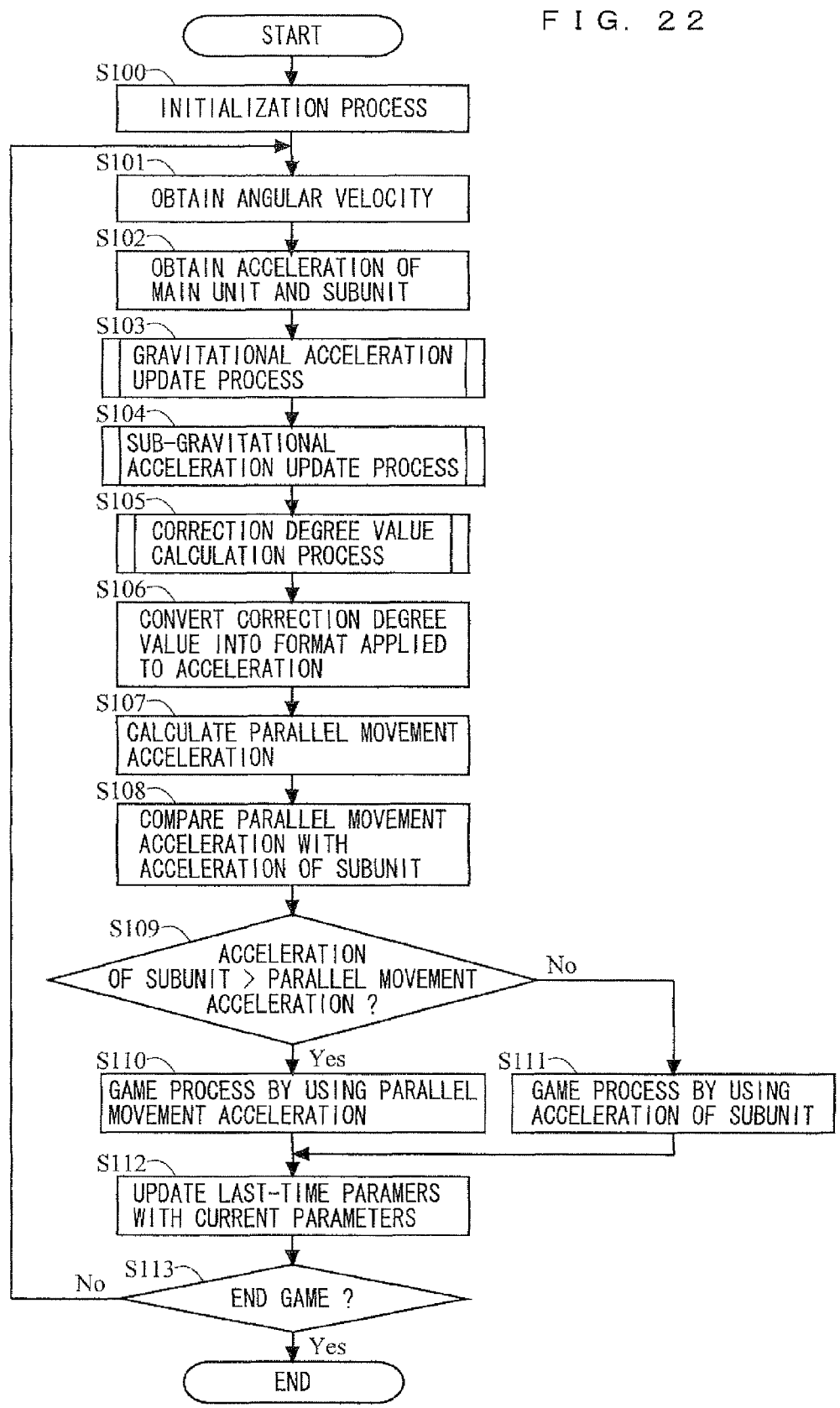
FIG. 22 is a flow chart showing an example of game processing executed by the game apparatus body 5 in the second embodiment.
Figure 23:
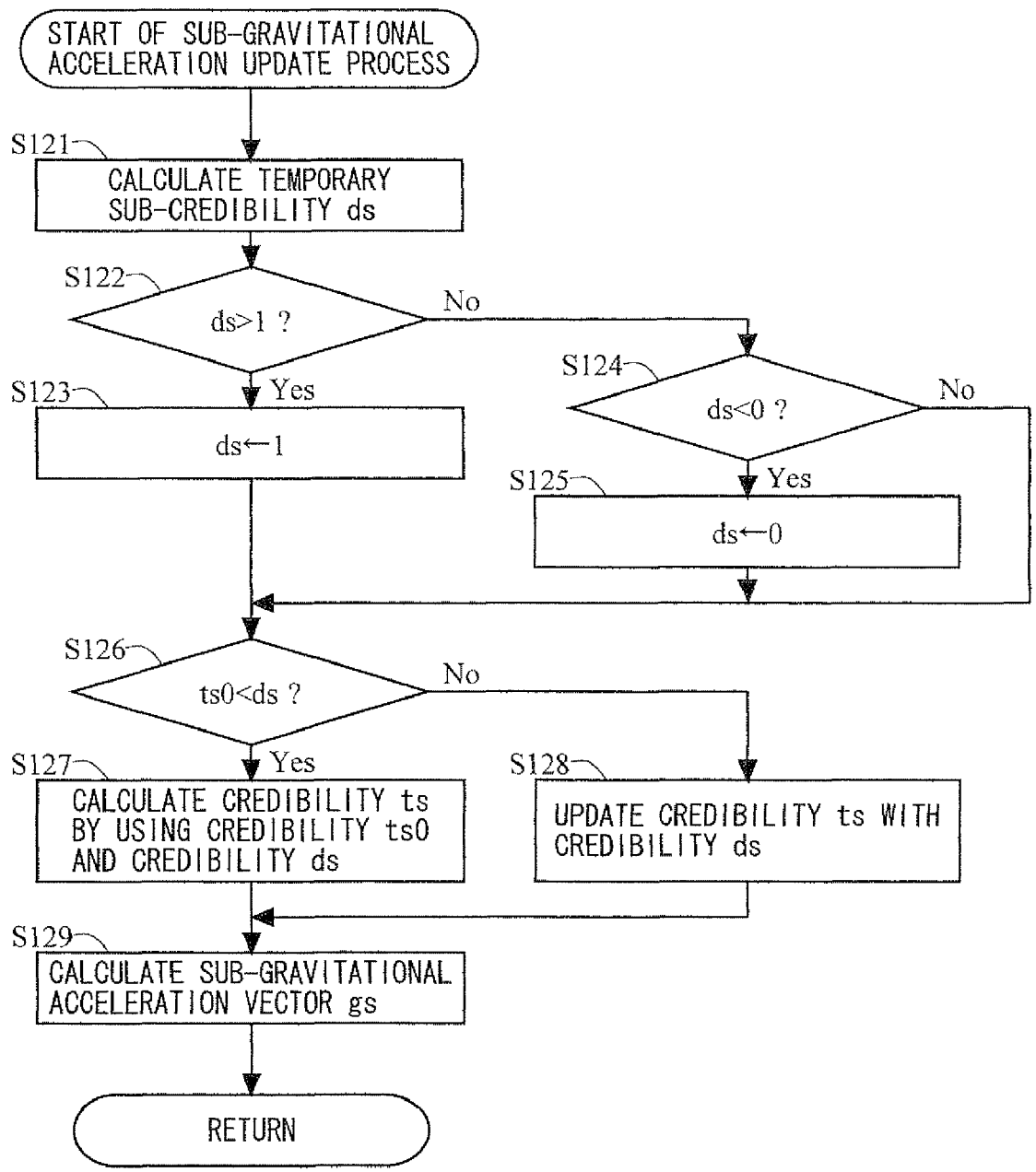
FIG. 23 is a flow chart of a subroutine showing an example of a sub-gravitational acceleration update process at step 104 in FIG. 22.

With reference to FIGS. 22 and 23, the following will describe in detail the game processing executed by the game apparatus body 5 in the second embodiment. FIG. 22 is a flow chart showing an example of the game processing executed by the game apparatus body 5 in the second embodiment. FIG. 23 is a flow chart of a subroutine showing an example of a sub-gravitational acceleration update process at step 104 in FIG. 22. In FIGS. 22 and 23, each step executed by the CPU 10 is abbreviated to "S".

Referring to FIG. 22, the CPU 10 executes an initialization process of the game processing (step 100), and proceeds the processing to the next step. For example, in the initialization process at step 100, the CPU 10 executes initialization of each parameter for executing the game processing thereafter. Specifically, the CPU 10 sets, to initial values (e.g. 0), respectively, values indicated by the data, which are stored in the angular velocity data Da, the acceleration data Db, the last-time acceleration data Dc, the temporary credibility data Dd, the credibility data De, the last-time credibility data Df, the gravitational acceleration data Dg, the last-time gravitational acceleration data Dh, the correction degree value data Di, the last-time correction degree value data Dj, the parallel movement acceleration data Dk, the sub-acceleration data Dm, the last-time sub-acceleration data Dn, the temporary sub-credibility data Do, the sub-credibility data Dp, the last-time sub-credibility data Dq, the sub-gravitational acceleration data Dr, and the last-time sub-gravitational acceleration data Ds.

Next, the CPU 10 obtains, from the input device 6, data indicative of angular velocities (step 101), and proceeds the processing to the next step. The process executed at step 101 is the same as the process at the above step 41, and hence the detailed description thereof will be omitted.

Next, the CPU 10 obtains, from the controller 7 and the subunit 76, data indicative of acceleration (step 102), and proceeds the processing to the next step. For example, the CPU 10 obtains operation information received from the input device 6 (controller 7), and stores, in the acceleration data Db, acceleration indicated by the latest acceleration data obtained from the acceleration sensor 701, similarly as at the above step 42. Further, the CPU 10 obtains operation information received from the input device 6 (controller 7), and stores, in the sub-acceleration data Dm, acceleration indicated by the latest acceleration data obtained from the acceleration sensor 762. Specifically, the CPU 10 updates the X-axis direction acceleration data Dm1 with acceleration asx indicated by X-axis direction acceleration data of the subunit 76 that is included in the latest operation information received from the subunit 76. In addition, the CPU 10 updates the Y-axis direction acceleration data Dm2 with acceleration asy indicated by Y-axis direction acceleration data of the subunit 76 that is included in the latest operation information. Further, the CPU 10 updates the Z-axis direction acceleration data Dm3 with acceleration asz indicated by Z-axis direction acceleration data of the subunit 76 that is included in the latest operation information.

Next, the CPU 10 executes a gravitational acceleration update process (step 103), and proceeds the processing to the next step. The gravitational acceleration update process executed at step 103 is the same as the gravitational acceleration update process executed at the above step 43, and hence the detailed description thereof will be omitted.

Next, the CPU 10 executes a sub-gravitational acceleration update process (step 104), and proceeds the processing to the next step. With reference to FIG. 23, the following will describe the sub-gravitational acceleration update process executed at step 104.

Referring to FIG. 23, the CPU 10 calculates temporary sub-credibility ds, updates the temporary sub-credibility data Do with the calculated temporary sub-credibility ds (step 121), and proceeds the processing to the next step. Here, in this sub-gravitational acceleration update process, a method is used in which the acceleration currently applied to the subunit 76 is inferred as the gravitational acceleration when the difference between the acceleration currently applied to the subunit 76 and the acceleration of the subunit 76 obtained in the last processing is equal to or smaller than a constant value, namely, when the change amount of acceleration is equal to or smaller than a threshold value. The temporary sub-credibility ds is a parameter that, during calculation, is temporarily indicative of how much extent the acceleration currently applied to the subunit 76 can be credited as the gravitational acceleration when the gravitational acceleration applied to the subunit 76 is inferred. For example, when temporary sub-credibility ds=1, it indicates that the acceleration currently applied to the subunit 76 is totally credible as the gravitational acceleration. On the other hand, when temporary sub-credibility ds=0, it indicates that the acceleration currently applied to the subunit 76 is not credible at all as the gravitational acceleration.

Specifically, similarly to the temporary credibility d, the temporary sub-credibility ds is calculated by the following mathematical formula.

$$ds=(|as-as0|-asd\text{min})/(asd\text{max}-asd\text{min}) \quad (5)$$

Here, as denotes the magnitude of the acceleration currently applied to the subunit 76 and is calculated by referring the sub-acceleration data Dm; as0 denotes the magnitude of the acceleration of the subunit 76 used in the last processing and is calculated by referring to the last-time sub-acceleration data Dn; asdmax is a predetermined constant, which is a value that causes the acceleration currently applied to the subunit 76 to be not credible at all as the gravitational acceleration when the difference between the acceleration magnitude as and the acceleration magnitude as0 is equal to or greater than the constant asdmax; asdmin is a predetermined constant, which is a value that causes the acceleration currently applied to the subunit 76 to be totally credible as the gravitational acceleration when the difference between the acceleration magnitude as and the acceleration magnitude as0 is equal to or smaller than the constant asdmin. Because the temporary sub-credibility ds is calculated by the above mathematical formula (5) as described above, the temporary sub-credibility ds approaches 1 when the change amount |as−as0| of the acceleration of the subunit 76 is smaller. Thus, the value of the temporary sub-credibility ds can indicate that the acceleration currently applied to the subunit 76 is credible as the gravitational acceleration. On the other hand, the temporary sub-credibility ds approaches 0 when the change amount |as−as0| of the acceleration of the subunit 76 is greater. Thus, the value of the temporary sub-credibility ds can indicate that the acceleration currently applied to the subunit 76 is not credible as the gravitational acceleration.

Next, the CPU 10 determines whether or not the temporary sub-credibility ds calculated at step 121 is greater than 1 (step 122). Then, when the temporary sub-credibility ds is greater than 1, the CPU 10 proceeds the processing to the next step 123. On the other hand, when the temporary sub-credibility ds is equal to or smaller than 1, the CPU 10 proceeds the processing to the next step 124.

At step 123, the CPU 10 sets the temporary sub-credibility ds to 1, updates the temporary sub-credibility data Do with the set temporary sub-credibility ds, and proceeds the processing to the next step 126. In other words, when the value of the temporary sub-credibility ds is greater than 1, the value is rounded down to 1.

On the other hand, when the temporary sub-credibility ds is equal to or smaller than 1, the CPU 10 determines at step 124 whether or not the temporary sub-credibility ds calculated at step 121 is smaller than 0. Then, when the temporary sub-credibility ds is smaller than 0, the CPU 10 proceeds the processing to the next step 125. On the other hand, when the temporary sub-credibility ds is equal to or greater than 0, the CPU 10 proceeds the processing to the next step 126.

At step 125, the CPU 10 sets the temporary sub-credibility ds to 0, updates the temporary sub-credibility data Do with the set temporary sub-credibility ds, and proceeds the processing to the next step 126. In other words, when the value of the temporary sub-credibility ds is smaller than 0, the value is rounded up to 0.

At step 126, the CPU 10 refers to the last-time sub-credibility data Dq and determines whether or not the temporary sub-credibility ds calculated at step 121 is greater than the sub-credibility ts0 calculated the last time. Then, when the temporary sub-credibility ds is greater than the sub-credibility ts0 calculated the last time (i.e. ts0<ds), the CPU 10 proceeds the processing to the next step 127. On the other hand, when the temporary sub-credibility ds is equal to or smaller than the sub-credibility ts0 calculated the last time (i.e. ds≦ts0), the CPU 10 proceeds the processing to the next step 128.

At step 127, the CPU 10 calculates final sub-credibility ts by using the last-time sub-credibility ts0 indicated by the last-time sub-credibility data Dq and the temporary sub-credibility ds calculated at step 121, and proceeds the processing to the next step 129. Specifically, the CPU 10 calculates the final sub-credibility ts by the following mathematical formula:

$$ts=ts0*Ts+(1-Ts)*ds \quad (6),$$

and updates the sub-credibility data Dp with the calculated sub-credibility ts. Here, Ts is a predetermined constant satisfying that 0<Ts<1. As is obvious from the above mathematical formula (6), the speed at which the sub-credibility ts is updated from the last-time sub-credibility ts0 can be adjusted in accordance with the magnitude of the constant Ts. The greater the magnitude of the constant Ts is, the slower the speed of change in the sub-credibility ts is.

On the other hand, at step 128, the CPU 10 updates the final sub-credibility ts with the temporary sub-credibility ds calculated at step 121, updates the sub-credibility data Dp with the updated final sub-credibility ts, and proceeds the processing to the next step 129.

As is obvious from the processes at step 126 to step 128, when the temporary sub-credibility ds is lower (smaller) than the sub-credibility ts0 calculated the last time, the temporary sub-credibility ds is immediately reflected to the final sub-credibility ts. On the other hand, when the temporary sub-credibility ds is higher (greater) than the sub-credibility ts0 calculated the last time, the temporary sub-credibility ds is not immediately reflected to the final sub-credibility ts, and the speed of change in the final sub-credibility ts becomes slow. Here, according to the characteristics of the acceleration sensor provided in the subunit 76, acceleration caused by inertia when a motion of the controller 7 is stopped changes so as to decrease gradually from the acceleration obtained the last time, and the difference of this acceleration does not become a great value. Thus, if the calculated temporary sub-credibility ds is immediately reflected to the final sub-credibility ts, the acceleration caused by the inertia may be handled as stable acceleration (gravitational acceleration). In order to avoid such false recognition, when the temporary sub-credibility ds changes so as to be higher than the sub-credibility ts0 calculated the last time, the final sub-credibility ts is updated so as to change gradually from the last-time sub-credibility ts0. On the other hand, when the temporary sub-credibility ds changes so as to be lower than the sub-credibility ts0 calculated the last-time, the temporary sub-credibility ds is immediately reflected to the sub-credibility ts.

At step 129, the CPU 10 calculates the gravitational acceleration based on the final sub-credibility ts indicated by the sub-credibility data Dp, and ends the processing of this sub-routine. For example, the CPU 10 calculates a sub-gravitational acceleration vector gs by using the sub-credibility ts stored in the sub-credibility data Dp and the acceleration asx, asy, and asz stored in the sub-acceleration data Dm, and updates the sub-gravitational acceleration data Dr with the calculated sub-gravitational acceleration vector gs. Specifically, the sub-gravitational acceleration vector gs is calculated by normalizing, to the length (e.g. 1) of the gravitational force, a vector calculated by the following mathematical formula.

$$gs = asn * ts + gs0 * (1 - Ts) \qquad (7)$$

Here, asn is a vector obtained by normalizing (e.g. normalizing to a length of 1) an acceleration vector (asx, asy, asz) currently generated in the subunit 76. Further, gs0 is a sub-gravitational acceleration vector gs calculated in the last processing, namely, a sub-gravitational acceleration vector gs0 stored in the last-time sub-gravitational acceleration data Ds. By the mathematical formula (7), the sub-gravitational acceleration vector gs becomes a vector obtained by linearly interpolating, at a rate of the sub-credibility ts, the current acceleration vector asn and the sub-gravitational acceleration vector gs0 calculated the last time.

Referring back to FIG. 22, after the sub-gravitational acceleration update process at step 104, the CPU 10 executes processes at step 105 to step 107, and proceeds the processing to the next step 108. The processes executed at step 105 to step 107 are the same as the processes at the above step 44 to step 46, and hence the detailed description thereof will be omitted.

At step 108, the CPU 10 compares parallel movement acceleration with acceleration generated in the subunit 76, and proceeds the processing to the next step. For example, the CPU 10 compares the magnitude of parallel movement acceleration calculated at step 107 (i.e. the magnitude of acceleration generated by parallel movement of the controller 7) with the magnitude of acceleration obtained by subtracting the gravitational acceleration from the acceleration generated in the subunit 76 (i.e. the magnitude of acceleration generated in the subunit 76 other than the gravitational acceleration). Specifically, the CPU 10 calculates, as the magnitude of the parallel movement acceleration, the magnitude of a parallel movement acceleration vector p indicated by the parallel movement acceleration data Dk. Further, the CPU 10 calculates, as the magnitude of the acceleration generated in the subunit 76 other than the gravitational acceleration, the magnitude of a vector obtained by subtracting the sub-gravitational acceleration vector gs0 indicated by the sub-gravitational acceleration data Dr from the acceleration vector (asx, asy, asz) that is indicated by the sub-acceleration data Dm and currently generated in the subunit 76.

Next, the CPU 10 determines whether or not the magnitude of the acceleration generated in the subunit 76 other than the gravitational acceleration is greater than the magnitude of the parallel movement acceleration (step 109). Then, when the magnitude of the acceleration generated in the subunit 76 other than the gravitational acceleration is greater than the magnitude of the parallel movement acceleration, the CPU 10 proceeds the processing to the next step 110. On the other hand, when the magnitude of the acceleration generated in the subunit 76 other than the gravitational acceleration is equal to or smaller than the magnitude of the parallel movement acceleration, the CPU 10 proceeds the processing to the next step 111.

At step 110, the CPU 10 executes a game process by using the parallel movement acceleration vector p indicated by the parallel movement acceleration data Dk and angular velocities ωx, ωy, and ωz indicated by the angular velocity data Da, and proceeds the processing to the next step 112. For example, the CPU 10 controls motion of the player character PC by using the parallel movement acceleration vector p and the angular velocities ωx, ωy, and ωz.

Specifically, the CPU 10 calculates a movement direction of the player character PC in accordance with the orientation of the input device 6 (controller 7). For example, when the angular velocities ωx, ωy, and ωz indicate that the input device 6 is inclined leftward or rightward, the personal watercraft operated by the player character PC is caused to turn in the direction in which the input device 6 is inclined, in accordance with the orientation (e.g. an inclination angle) of the input device 6 (see FIG. 19). Further, when the angular velocities ωx, ωy, and ωz indicate that the input device 6 is maintained horizontally, the personal watercraft operated by the player character PC is caused to run straight. The orientation (angle) of the input device 6 can be calculated by using the angular velocities ωx, ωy, and ωz, and the method for calculating the orientation (angle) of the input device 6 from the angular velocities ωx, ωy, and ωz may be any method.

Further, when the parallel movement acceleration vector p has a magnitude equal to or greater than a predetermined value and has a direction upward from the controller 7, the personal watercraft operated by the player character PC is caused to jump in accordance with the magnitude of the parallel movement acceleration vector p (see FIG. 20). The direction of the parallel movement acceleration vector p in the real space may be calculated by any method. In one example, the direction (the direction of the gravitational acceleration vector g) of the currently generated gravitational acceleration is regarded as the vertical direction in the real space, and the direction of the parallel movement acceleration vector p in the real space is calculated by using the vertical direction as a reference. In another example, the direction of the parallel movement acceleration vector p in the real space is calculated by using the orientation of the input device 6 as a reference, as described later.

Here, the game process at step 110 is executed when the magnitude of the acceleration generated in the subunit 76 other than the gravitational acceleration is greater than the magnitude of the parallel movement acceleration. Further, in the game process at step 110, the acceleration generated in the subunit 76 is not used for controlling motion of the player character PC. Thus, even when the player swings only the subunit 76, the player cannot operate the player character PC. In other words, for operating the player character PC, the player operating the input device 6 is required to perform an operation of moving the controller 7 as well as the subunit 76.

On the other hand, at step 111, the CPU 10 executes a game process by using the acceleration generated in the subunit 76 other than the gravitational acceleration and the angular velocities ωx, ωy, and ωz indicated by the angular velocity data Da, and proceeds the processing to the next step 112. For example, the CPU 10 controls motion of the player character PC by using the acceleration generated in the subunit 76 other than the gravitational acceleration and the angular velocities ωx, ωy, and ωz indicated by the angular velocity data Da.

Specifically, similarly as at step 110, the CPU 10 calculates a movement direction of the player character PC in accordance with the orientation (angular velocities ωx, ωy, and ωz) of the input device 6 (controller 7). Further, when the acceleration generated in the subunit 76 other than the gravitational acceleration has a magnitude equal to or greater than a predetermined value and is applied in a direction upward from the subunit 76, the CPU 10 causes the personal watercraft operated by the player character PC to jump in accordance with the magnitude of the acceleration (see FIG. 20). The direction, in the real space, of the acceleration generated in the subunit 76 other than the gravitational acceleration may be calculated by any method. In one example, the direction (the direction of the sub-gravitational acceleration vector gs) of the gravitational acceleration currently applied to the subunit 76 is regarded as the vertical direction in the real space, and the direction, in the real space, of the acceleration generated in the subunit 76 other than the gravitational acceleration is calculated by using the vertical direction as a reference.

Here, the game process at step 111 is executed when the magnitude of the acceleration generated in the subunit 76 other than the gravitational acceleration is equal to or smaller than the magnitude of the parallel movement acceleration. Further, in the game process at step 111, the acceleration generated in the controller 7 is not used for controlling motion of the player character PC. Thus, even when the player swings only the controller 7, the personal watercraft operated by the player character PC cannot be caused to jump. In other words, for causing the personal watercraft to jump, the player operating the input device 6 is required to perform an operation of moving the subunit 76 as well as the controller 7. As is obvious from the game process at step 110 and the game process at step 111, for operating the player character PC, the player operating the input device 6 cannot perform a desired operation by operating one of the controller 7 and the subunit 76. As a result, the player is required to perform an operation of moving both the controller 7 and the subunit 76.

In the above processing, the game processing is executed by using the acceleration obtained by subtracting a gravitational acceleration component from the acceleration generated in the subunit 76, and the acceleration used in the game processing includes an acceleration component generated by inclining the subunit 76. On the other hand, the acceleration generated in the controller 7 is used in the game processing in a state where the gravitational acceleration component and an acceleration component generated by inclining the controller 7 are subtracted from the acceleration generated in the controller 7. Thus, when the player performs the same operation with respect to the controller 7 and the subunit 76 while holding the controller 7 and the subunit 76, the game processing is always executed based on the acceleration obtained from the controller 7.

At step 112, the CPU 10 updates the last-time parameters with the parameters calculated in the processes at step 101 to step 108, and proceeds the processing to the next step. Specifically, similarly as at the above step 48, the CPU 10 updates the last-time acceleration data Dc, the last-time credibility data Df, the last-time gravitational acceleration data Dh, and the last-time correction degree value data Dj. Further, the CPU 10 updates the acceleration as0x, as0y, and as0z with the acceleration asx, asy, and asz indicated by the sub-acceleration data Dm, respectively, and updates the last-time sub-acceleration data Dn with the updated acceleration as0x, as0y, and as0z. The CPU 10 updates the last-time sub-credibility ts0 with the sub-credibility ts indicated by the sub-credibility data Dp, and updates the last-time sub-credibility data Dq with the updated sub-credibility ts0. Then, the CPU 10 updates the last-time sub-gravitational acceleration vector gs0 with the sub-gravitational acceleration vector gs indicated by the sub-gravitational acceleration data Dr, and updates the last-time sub-gravitational acceleration data Ds with the updated sub-gravitational acceleration vector gs0.

Next, the CPU 10 determines whether or not to end the game (step 113). The game is to be ended, for example, when conditions to make the game, for which the game process is executed at step 110 or 111, over are satisfied, or when the player has performed an operation for ending the game. When not ending the game, the CPU 10 returns to step 101 to repeat the processing. On the other hand, when ending the game, the CPU 10 ends the processing of the flow chart.

As described above, according to the game processing of the second embodiment, in the case where the input device 6 in which the controller 7 and the subunit 76 are connected to each other is used, for determining orientation and motion of the controller 7 by using acceleration applied to the controller 7 in each of the three axial directions, rotation of the entire input device 6 is determined by using angular velocities generated in the controller 7, and acceleration generated when the entire input device 6 is moved in parallel is obtained. Whereby, in the above game processing, the acceleration obtained by the parallel movement of the input device 6 can be determined instantaneously. Therefore, in the above game processing, parallel movement of the input device 6 in which the controller 7 and the subunit 76 are connected to each other, such as lifting the entire input device 6 and pushing the entire input device 6 forward, can be accurately recognized by using the acceleration obtained from the input device 6.

Further, according to the game processing of the second embodiment, in the case where the input device 6 in which the controller 7 and the subunit 76 are connected to each other is used, data indicative of the acceleration generated in the controller 7 and data indicative of the acceleration generated in the subunit 76 can be used. On the other hand, because the angular velocity detection unit 9 for detecting an angular velocity is provided only in the controller 7, the angular velocity generated in the subunit 76 cannot be detected directly. However, in the above game processing, the acceleration generated in the controller 7 and the acceleration generated in the subunit 76 are compared and analyzed, and any one of them is used in the game processing, whereby the acceleration generated when the entire input device 6 is moved in parallel can be obtained and used in the game processing. Further, the acceleration generated in the controller 7 and the acceleration generated in the subunit 76 are compared and analyzed, and the acceleration whose magnitude is smaller than the other is used in the game processing. Thus, the player cannot perform a desired operation by operating only one of the controller 7 and the subunit 76, and hence the player can be required to perform an operation of moving both the controller 7 and the subunit 76.

Here, in the processes at the above step 61 to step 67, the correction degree value f is updated by the different methods between the case when the correction degree value f is equal to or greater than the correction degree value f0 calculated the last time and the case when the correction degree value f is smaller than the correction degree value f0 calculated the last time. Specifically, when the correction degree value f is smaller than the correction degree value f0 calculated the last time, the correction degree value f is calculated by $$f \leftarrow f*S+(1-S)*f0,$$

where S is a predetermined constant satisfying that 0<S<1. Thus, when the correction degree value f is smaller than the correction degree value f0 calculated the last time, the speed of change in the correction degree value f becomes slow. Here, the case when the correction degree value f is smaller than the correction degree value f0 calculated the last time is the case when the rotation speed (angular velocity) of the entire controller 7 becomes slow. Further, when the correction degree value f is great, the acceleration generated in the controller 7 is regarded as including much acceleration generated by rotation of the controller 7, by the subsequent processing. On the other hand, when the player attempts to stop rotating the entire controller 7, the operation of the player for stopping the rotation of the controller 7 generates acceleration. Thus, the acceleration for stopping the rotation may remain even when the rotation of the controller 7 is stopped. As described above, by causing the speed of change in the correction degree value f to be slow, the acceleration generated when the rotation of the controller 7 is stopped is suppressed, and hence an acceleration component generated by parallel movement of the controller 7 can be recognized accurately.

However, in the case where the above effect is not desired, the correction degree value f may be updated by the same method regardless of the result of the comparison of the correction degree value f and the correction degree value f0 calculated the last time. For example, the value of the correction degree value f calculated through the above step 61 to step 65 may be always used as the correction degree value f. In this case, the processes at the above step 66 and step 67 are unnecessary, and the correction degree value f0 calculated the last time does not need to be stored in the main memory.

Further, when the input device 6 in which the controller 7 and the subunit 76 are connected to each other is used, the case where the angular velocity detection unit 9 is provided only in the controller 7 has been described. However, the present invention is applicable to the case where the form of providing the angular velocity detection unit 9 is different. In a first example, the angular velocity detection unit 9 is provided only in the subunit 76. In this case, in the game processing according to the above second embodiment, when the process using data obtained from the subunit 76 is substituted for the process using data obtained from the controller 7 and vise versa, the same game processing is possible. In a second example, two angular velocity detection units 9 are provided in the controller 7 and the subunit 76, respectively. In this case, in the game processing according to the above second embodiment, when the process using data obtained from the controller 7 is applied to a process for angular velocity data obtained from the subunit 76, the processes of correcting the acceleration obtained from the controller 7 and the acceleration obtained from the subunit 76 can be executed independently.

Further, the data (data indicative of contents of an operation performed with respect to the operation section 761, and data indicative of acceleration detected by the acceleration sensor 762) outputted from the subunit 76 is outputted to the controller 7 via the microcomputer 94 of the angular velocity detection unit 9, but may be outputted to the controller 7, not via the microcomputer 94. In this case, the data outputted from the subunit 76 is outputted to the communication section 75 via the connection cable 731, the connector 732, the connector 97, the plug 93, and the connector 73 (the route indicated by a dashed line in FIG. 18).

Further, in the above processing, a plurality of axes (X-axis, Y-axis, and Z-axis) for which acceleration is detected by the acceleration sensor 701 and a plurality of rotation axes (X-axis, Y-axis, and Z-axis) about which angular velocities are detected by the angular velocity detection unit 9 are the same, but may be different from each other. When angles indicative of the differences between the axes for which the acceleration is detected by the acceleration sensor 701 and the rotation axes about which the angular velocities are detected by the angular velocity detection unit 9 are determined in advance, coordinate conversion can be executed by using these angles. In one example, the present invention can be realized by coordinate-converting acceleration along the plurality of axes that is detected by the acceleration sensor 701, into acceleration along the above rotation axes using the above angles indicative of the differences. In another example, the present invention can be realized by coordinate-converting angular velocities about the plurality of rotation axes that are detected by the angular velocity detection unit 9, into angular velocities about the plurality of axes, for which the acceleration is detected by the acceleration sensor 701, using the above angles indicative of the differences. Further, in the above description, the number of axes for which the acceleration is detected by the acceleration sensor 701 and the number of rotation axes about which the angular velocities are detected by the angular velocity detection unit 9 are 3 (X-axis, Y-axis, and Z-axis), but each may be 1 or 2.

Further, in the above processing, at the above step 47, step 110, and step 111, the corrected acceleration is used in the game process. However, the present invention may be an information processing apparatus that outputs corrected acceleration to another apparatus, and an information processing program executed by this information processing apparatus. In this case, when the above step 47, step 110, and step 111 are changes to a step of outputting acceleration data to another apparatus and this outputted acceleration data is used as data indicative of acceleration, which is used in the game processes at the above step 47, step 110, and step 111, the present invention can be realized as an information processing program and an information processing apparatus that do not execute a game process.

In the above description, the process of inferring gravitational acceleration generated in the controller 7 and/or the subunit 76 is executed at the above step 43, step 103, and step 104. Specifically, in the above process of inferring gravitational acceleration, when the change amount (the difference between before and after sampling) of acceleration generated in the controller 7 and/or the subunit 76 is equal to or smaller than a constant value, namely, when the change in acceleration is small, this acceleration is inferred as the gravitational acceleration.

The method for inferring gravitational acceleration generated in the controller 7 and/or the subunit 76 may be another method. In one example, when the difference between the magnitude (the absolute value) of acceleration generated in the controller 7 and/or the subunit 76 and the magnitude (e.g. 1G) of the gravitational acceleration is within a predetermined value, namely, when this magnitude is close to the magnitude of the gravitational acceleration, this acceleration may be inferred as the gravitational acceleration. In another example, a vector following, with a predetermined time lag, an acceleration vector indicative of acceleration generated in the controller 7 and/or the subunit 76 may be calculated, and this vector may be inferred as a vector indicative of the gravitational acceleration.

Further, the angular velocity data to be stored in the angular velocity data Da may be subjected to predetermined correction before being stored. The following will describe an example of correcting the angular velocity data.

For example, an angular velocity v indicated by the angular velocity data outputted from the gyro-sensors 95 and 96 is primarily corrected by $$v \leftarrow v + (sum/ct - v)*a.$$

Here, ct denotes the number of successive data of angular velocities that are obtained by tracking back data buffers (not shown), in which angular velocities are stored, and determined to be within a stable range set by a lower limit s1 and an upper limit s2; and sum denotes the total value (total value sum) of the values in the data buffers that are determined to be within the above stable range. In other words, ct and sum are the number of data (the successive data number ct) and the total value (the total value sum), respectively, when successive data that are obtained by tracking back data buffers from the position of the data buffer, in which the angular velocity v is written, sequentially toward older data buffers and are included within the above stable range are obtained repeatedly (it is noted that an upper limit of the number of data to be searched is set). Further, a denotes a static state value, which is a numeric value that is in the range of 0 to 1 and approaches 1 when a period during which the change in motion of the gyro-sensors 95 and 96 is small (the gyro-sensors 95 and 96 are stable) is longer. The static state value a is normalized such that the static state value a becomes the maximum value of 1 when the successive data number ct is equal to the above upper limit, namely, when all the values of successive data whose number is equal to the upper limit and that are obtained by tracking back data buffers from the data buffer in which the angular velocity v is stored are within the above stable range.

Then, offset correction is executed by subtracting a zero point offset value (static-state output value) ofs from the primarily corrected angular velocity v. Here, the zero point offset value ofs is a value of data assumed to be indicated by the gyro-sensors 95 and 96 being static, and is set to a predetermined value unique to the device. However, the zero point offset value ofs is sequentially corrected and reset in accordance with the primarily corrected angular velocity v. Specifically, the zero point offset value ofs is sequentially corrected and reset by $$ofs \leftarrow ofs+(v-ofs)*a*C.$$

Here, C is a constant that is set, for example, to 0.01. Setting the constant C to a small value prevents the angular velocity v from being corrected in a short time to be an angular velocity (zero point) in the state of the input device 6 being static. Then, when a change in the angular velocity is small as when the gyro-sensors 95 and 96 are static, the zero point is corrected so as to approach its average.

Then, the primarily corrected angular velocity v is offset-corrected by using the zero point offset value ofs. For example, the primarily corrected angular velocity v is offset-corrected by $$v \leftarrow v-ofs.$$

Thus, the angular velocity v indicated by the angular velocity data outputted from the gyro-sensors 95 and 96 is corrected again in view of the zero point (static-state output value). Then, the angular velocity data Da is updated with the offset-corrected angular velocity v as appropriate. It is noted that the angular velocity data to be stored in the angular velocity data Da as appropriate may be angular velocity data that has been subjected to only the above offset correction without being subjected to the above primary correction. Further, the zero point offset value ofs may be a fixed value, and only the above offset correction may be executed.

Further, in the above embodiments, the process result data from the imaging information calculation section 74 provided in the controller 7 is not used. Thus, when the present invention is realized, the imaging information calculation section 74 does not have to be provided in the controller 7. In addition, the angular velocity detection unit 9 provided with the gyro-sensors 95 and 96 is detachably connected to the controller 7 in the above embodiments, but the gyro-sensors 95 and 96 may be provided in the controller 7.

Further, the case where the present invention is applied to a stationary game apparatus has been described above, but the present invention is also applicable to information processing apparatuses such as: general personal computers operated by using an input device provided with a gyro-sensor and an acceleration sensor; and the like. For example, such an information processing apparatus is used for various information processing based on an angular velocity and acceleration generated in the input device, such as calculation of orientation, motion, and the like of the input device in accordance with angular velocity data outputted from the gyro-sensor of the input device and acceleration data outputted from the acceleration sensor of the input device.

Further, the controller 7 (input device 6) and the game apparatus body 5 are connected to each other by wireless communication in the above description, but the controller 7 and the game apparatus body 5 may be electrically connected to each other via a cable. In this case, the cable connected to the controller 7 is connected to a connection terminal of the game apparatus body 5.

Further, in the above description, the communication section 75 is provided only in the controller 7, out of the controller 7 and the subunit 76. However, when the input device 6 in which the controller 7 and the subunit 76 are connected to each other is used, a communication section for wirelessly transmitting transmission data to the game apparatus body 5 may be provided in the subunit 76. Alternatively, the above communication section may be provided in each of the controller 7 and the subunit 76. For example, each of the communication sections provided in the controller 7 and the subunit 76 may wirelessly transmit transmission data to the game apparatus body 5, or transmission data may be wirelessly transmitted from the communication section of the subunit 76 to the controller 7 and received by the communication section 75 of the controller 7, and then the communication section 75 of the controller 7 may wirelessly transmit the transmission data of the subunit 76 as well as transmission data of the controller 7 to the game apparatus body 5. In these cases, the connection cable 731 electrically connecting the controller 7 and the subunit 76 is unnecessary.

It is understood that the shapes of the controller 7, the subunit 76, and the angular velocity detection unit 9, and the shapes, numbers, and installed positions of the operation sections 72 and 761 is merely an example, and the present embodiment can be realized with other shapes, numbers and installed positions. It is understood that the coefficients, the criteria values, the mathematical formulas, and the process order that are used in the above processing are merely an example, and the present embodiment can be realized with other values, other mathematical formulas, and another process order.

Further, the game program of the present embodiment may be supplied to the game apparatus body 5 not only via an external storage medium such as the optical disc 4, but also via a wired or wireless communication path. Further, the game program may be prestored in a non-volatile storage device provided within the game apparatus body 5. It is noted that an information storage medium for storing the game program may be a CD-ROM, DVD or other similar optical disc storage medium, or may be a non-volatile semiconductor memory.

The storage medium storing the information processing program and the information processing apparatus, according to the present embodiment, are useful as: an apparatus that is capable of determining motion of an input device by using data obtained from an acceleration sensor of the input device and executes predetermined processing by using data indicative of the motion and the like of the input device; and as a program executed by this apparatus, and are also useful as: an apparatus that outputs data indicative of motion and the like of an input device; and as a program executed by this apparatus.

While the embodiment presented herein has been described in detail, the foregoing description is in all aspects illustrative and not restrictive. It is understood that numerous other modifications and variations can be devised without departing from the scope of the embodiment. It is understood that the scope of the present embodiment is determined only by the claims. It is understood that those skilled in the art can implement the present embodiment in the equivalent range based on the description of the present embodiment and common technical knowledge, from the description of the specific embodiments of the present embodiment. It is understood that the contents of the patent, the patent application, and the document that are cited in the present specification are incorporated herein by reference, similarly as when the contents are specifically described in the present specification.

Further, it is understood that throughout the present specification, a singular form includes a concept of a plural form as long as no mention is made thereto. Thus, it is understood that an article or an adjective of a singular form (e.g. "a", "an", "the", and the like in the case of English) includes a concept of a plural form as long as no mention is made thereto. It is understood that terms used in the present specification each have a general meaning in the art as long as no mention is made thereto. Thus, unless defined particularly, all the technical terms used in the present specification have the same meanings as that understood generally by those skilled in the art to which the present embodiment pertains. When a term is in contradiction with its general meaning, the present specification (including definition) is prioritized.

What is claimed is:

1. A non-transitory computer-readable storage medium storing an information processing program executed by a computer of an information processing apparatus that obtains, from an input device including an acceleration sensor for detecting acceleration and an angular velocity sensor for detecting an angular velocity, acceleration data indicative of the acceleration and angular velocity data indicative of the angular velocity, the information processing program causing the computer to perform:
data obtaining for repeatedly obtaining the acceleration data and the angular velocity data; and
acceleration correction for correcting, based on the magnitude of the angular velocity indicated by the angular velocity data, the acceleration indicated by the acceleration data, wherein
the greater the magnitude of the angular velocity is, the acceleration indicated by the acceleration data is corrected by the acceleration correction by a greater amount.

2. The non-transitory computer-readable storage medium according to claim 1, wherein
the information processing program further causes the computer to perform executing a predetermined process by using the corrected acceleration.

3. The non-transitory computer-readable storage medium according to claim 1, wherein:
the acceleration correction includes correction degree value calculation for calculating a correction degree value such that the greater the magnitude of the angular velocity indicated by the angular velocity data is the greater the degree of correcting the acceleration is; and
the acceleration correction corrects, at a degree indicated by the correction degree value, the acceleration indicated by the acceleration data.

4. The non-transitory computer-readable storage medium according to claim 1, wherein:
the acceleration sensor detects acceleration generated in the directions of a plurality of axes set with respect to the input device, and outputs acceleration data indicative of the acceleration;
the angular velocity sensor detects angular velocities about a plurality of axes set with respect to the input device, and outputs angular velocity data indicative of the angular velocities; and
the acceleration correction corrects, based on the magnitudes of the angular velocities about the plurality of axes that are indicated by the angular velocity data, the acceleration in the directions of the plurality of axes that are indicated by the acceleration data.

5. The non-transitory computer-readable storage medium according to claim 1, wherein:
the information processing program further causes the computer to perform gravitational acceleration calculation for calculating, based on the acceleration indicated by the acceleration data, gravitational acceleration inferred to be generated in the input device; and
the acceleration correction corrects acceleration obtained by subtracting, from the acceleration indicated by the acceleration data, the gravitational acceleration calculated by the gravitational acceleration calculation.

6. The non-transitory computer-readable storage medium according to claim 2, wherein:
the executing a predetermined process includes:
a first process for executing, as a part of the predetermined process, a first process in accordance with rotation of the input device that is obtained based on the angular velocity indicated by the angular velocity data; and
a second process for executing, as a part of the predetermined process, a second process in accordance with movement of the input device that is obtained based on the acceleration corrected by the acceleration correction.

7. The non-transitory computer-readable storage medium according to claim 2, wherein:
the input device includes:
a first unit that includes the acceleration sensor and the angular velocity sensor; and
a second unit that includes another acceleration sensor different from the acceleration sensor and is provided independently of the first unit; and
the executing a predetermined process compares the magnitude of the acceleration corrected by the acceleration correction with the magnitude of acceleration indicated by acceleration data outputted from the another acceleration sensor, and executes the predetermined process by using acceleration whose magnitude is smaller than that of the other.

8. The non-transitory computer-readable storage medium according to claim 3, wherein:
the acceleration correction further includes:
correction degree value determination for determining whether or not a calculated correction degree value in current processing is smaller than a correction degree value used in last processing; and
correction degree value updating for, when the correction degree value determination determines that the calculated correction degree value in the current processing is smaller than the correction degree value used in the last processing, changing the calculated correction degree value in the current processing, so as to at least approach the correction degree value used in the last processing, and updating a correction degree value to be used in the current processing with the changed correction degree value.

9. The non-transitory computer-readable storage medium according to claim 3, wherein:

the acceleration correction further includes:

correction degree value determination for determining whether or not a calculated correction degree value in current processing is smaller than a correction degree value used in last processing;

correction degree value updating for, when the correction degree value determination determines that the calculated correction degree value in the current processing is smaller than the correction degree value used in the last processing, changing the correction degree value used in the last processing, so as to at least approach the calculated correction degree value in the current processing, and updating a correction degree value to be used in the current processing with the changed correction degree value.

10. The non-transitory computer-readable storage medium according to claim 4, wherein:

the plurality of axes with the directions in which the acceleration is detected by the acceleration sensor and the plurality of axes that are rotation axes about which the angular velocities are detected by the angular velocity sensor are set with respect to the input device so as to be the same; and when correcting acceleration in the direction of a first axis included in the plurality of axes, the acceleration correction corrects this acceleration based on the magnitude of an angular velocity about an axis different from the first axis included in the plurality of axes.

11. The non-transitory computer-readable storage medium according to claim 6, wherein:

the executing a predetermined process inclines, in accordance with a rotation amount of the input device, an object appearing in a virtual world in a direction in which the input device rotates, and displays the object on a display device; and the executing a predetermined process moves, in accordance with a movement amount of the input device, the object in a direction in which the input device moves, and displays the object on the display device.

12. The non-transitory computer-readable storage medium according to claim 8, wherein the correction degree value updating changes the calculated correction degree value in the current processing, so as to approach the correction degree value used in the last processing at a predetermined rate or by a predetermined amount, and updates the correction degree value to be used in the current processing with the changed correction degree value.

13. The non-transitory computer-readable storage medium according to claim 8, wherein when the correction degree value determination determines that the calculated correction degree value in the current processing is greater than the correction degree value used in the last processing, the correction degree value updating updates the correction degree value to be used in the current processing with the calculated correction degree value in the current processing.

14. The non-transitory computer-readable storage medium according to claim 9, wherein the correction degree value updating changes the correction degree value used in the last processing, so as to approach the calculated correction degree value in the current processing at a predetermined rate or by a predetermined amount, and updates the correction degree value to be used in the current processing with the changed correction degree value.

15. The non-transitory computer-readable storage medium according to claim 10, wherein when correcting the acceleration in the direction of the first axis included in the plurality of axes, the acceleration correction corrects this acceleration based on a value obtained by summing the magnitudes of all angular velocities about axes different from the first axis included in the plurality of axes.

16. The non-transitory computer-readable storage medium according to claim 10, wherein:

the plurality of axes includes the first axis, a second axis, and a third axis that are mutually perpendicular to each other; and when correcting the acceleration in the direction of the first axis, the acceleration correction corrects the acceleration in the direction of the first axis based on the magnitude of the angular velocity about the second axis and the magnitude of the angular velocity about the third axis.

17. The non-transitory computer-readable storage medium according to claim 16, wherein:

the acceleration correction includes correction degree value calculation for calculating, for each of the first to third axes, a correction degree value that causes a degree of correcting the acceleration to be greater when the magnitudes of the angular velocities about the first to third axes that are indicated by the angular velocity data are greater; and when correcting the acceleration in the direction of the first axis, the acceleration correction corrects the acceleration in the direction of the first axis at a degree indicated by a value obtained by summing the correction degree value for the second axis and the correction degree value for the third axis.

18. An information processing apparatus that obtains, from an input device including an acceleration sensor for detecting acceleration and an angular velocity sensor for detecting an angular velocity, acceleration data indicative of the acceleration and angular velocity data indicative of the angular velocity, the information processing apparatus comprising:

a data obtaining unit for repeatedly obtaining the acceleration data and the angular velocity data; and an acceleration correction unit for correcting, based on the magnitude of the angular velocity indicated by the angular velocity data, the acceleration indicated by the acceleration data, wherein the greater the magnitude of the angular velocity is, the acceleration indicated by the acceleration data is corrected by the acceleration correction unit by a greater amount.

19. The information processing apparatus according to claim 18, further comprising a process unit for executing a predetermined process by using the acceleration corrected by the acceleration correction unit.

20. A method for obtaining, from an input device including an acceleration sensor for detecting acceleration and an angular velocity sensor for detecting an angular velocity, acceleration data indicative of the acceleration and angular velocity data indicative of the angular velocity, the method including:

repeatedly obtaining the acceleration data and the angular velocity data; and correcting, using one or more computer processors, based on the magnitude of the angular velocity indicated by the angular velocity data, the acceleration indicated by the acceleration data, wherein the greater the magnitude of the angular velocity is, the acceleration indicated by the acceleration data is corrected by a greater amount.

21. An information processing system that obtains, from an input device including an acceleration sensor for detecting acceleration and an angular velocity sensor for detecting an angular velocity, acceleration data indicative of the acceleration and angular velocity data indicative of the angular velocity, the information processing system comprising:

a data obtaining unit for repeatedly obtaining the acceleration data and the angular velocity data; and an acceleration correction unit for correcting, based on the magnitude of the angular velocity indicated by the angular velocity data, the acceleration indicated by the acceleration data, wherein the greater the magnitude of the angular velocity is, the acceleration indicated by the acceleration data is corrected by the acceleration correction unit by a greater amount.

* * * * *